(12) United States Patent
Arazaki

(10) Patent No.: US 7,898,687 B2
(45) Date of Patent: Mar. 1, 2011

(54) PRINTER, PRINTER CONTROL PROGRAM, PRINTER CONTROL METHOD, IMAGE PROCESSING DEVICE, IMAGE PROCESSING PROGRAM, IMAGE PROCESSING METHOD, AND STORAGE MEDIUM STORING THE PROGRAM THEREIN

(75) Inventor: Shinichi Arazaki, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 748 days.

(21) Appl. No.: 11/998,775

(22) Filed: Nov. 30, 2007

(65) Prior Publication Data
US 2009/0174887 A1 Jul. 9, 2009

(30) Foreign Application Priority Data
Dec. 1, 2006 (JP) ............................. 2006-325267

(51) Int. Cl.
*G06F 15/00* (2006.01)
*G06K 1/00* (2006.01)
*G06K 15/10* (2006.01)

(52) U.S. Cl. ........................................ 358/1.5; 358/1.8

(58) Field of Classification Search .................. 358/1.1, 358/1.2, 1.5, 1.3, 1.6, 1.12, 1.18
See application file for complete search history.

(56) References Cited

U.S. PATENT DOCUMENTS
7,397,584 B2 * 7/2008 Harrington ................. 358/3.28

FOREIGN PATENT DOCUMENTS

| JP | 2003-170557 | 6/2003 |
| JP | 2004-106470 | 4/2004 |
| JP | 2004-106474 | 4/2004 |
| JP | 2004-345155 | 12/2004 |

* cited by examiner

*Primary Examiner*—Douglas Q Tran
(74) *Attorney, Agent, or Firm*—Nutter McClennen & Fish LLP; John J. Penny, Jr.

(57) ABSTRACT

The printer includes a print head having nozzles that are arranged in a plurality of lines and that form dots by discharging ink onto a medium used for printing. The printer prints out an image on the medium by one scanning operation using the print head. The printer includes a printing image data acquisition device, an N-level processing device, a dot forming information generating device, a print position information modification device, and a printing device.

13 Claims, 33 Drawing Sheets

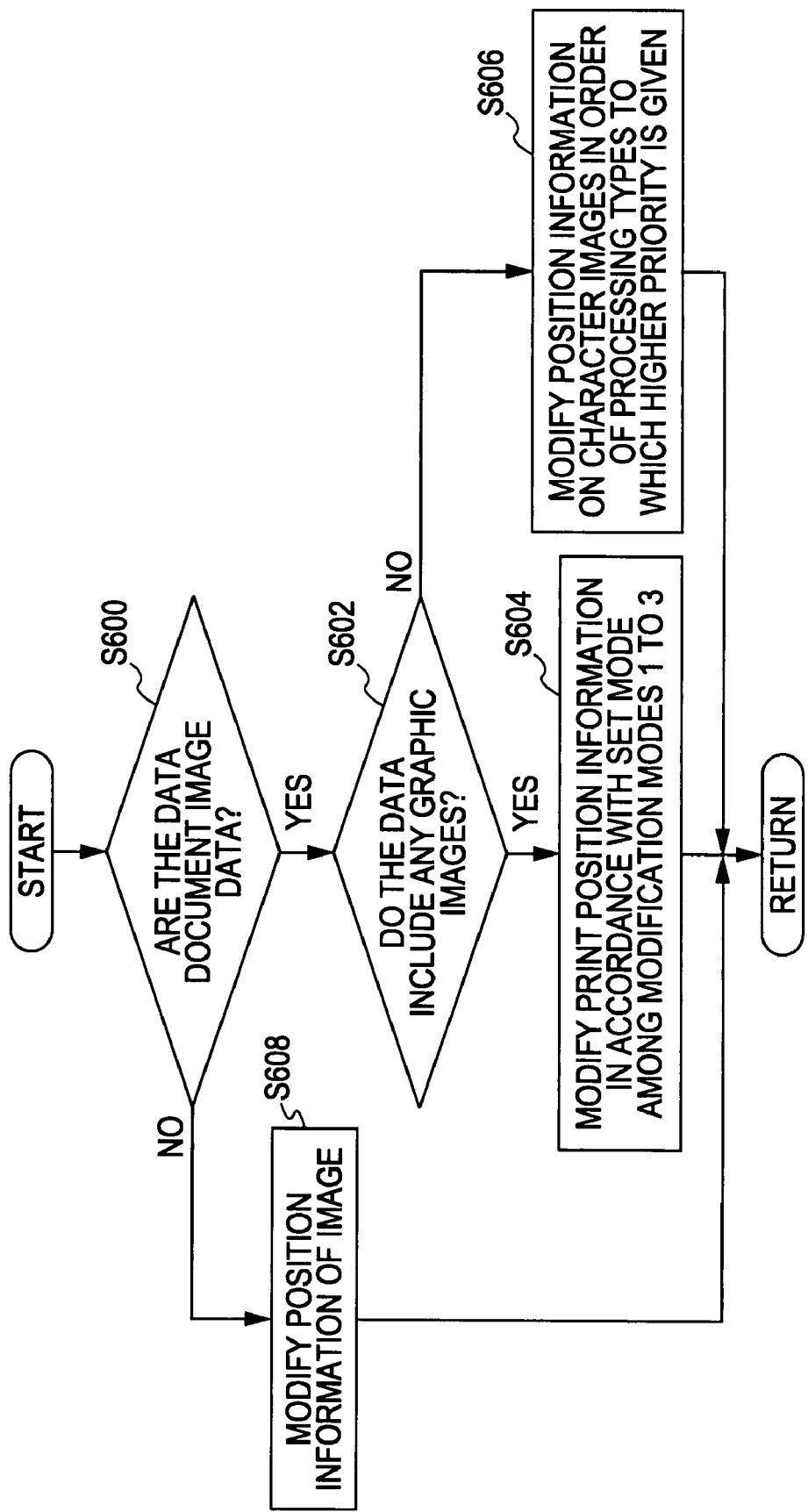

BEFORE SHIFTING

カーニングの位置を操作することによって、印刷する文字の位置を意識的に調整する。これによって、連続する縦方向のノズルの位置が変動して、使わないノズルを少なくすることができる。
　また、ドット数を計測して、積極的に印字するドット数を制御することも可能になる。

AFTER SHIFTING

DOCUMENT INCLUDING GRAPHIC IMAGE

カーニングの位置を操作することによって、印刷する文字の位置を意識的に調整する。
これによって、連続する縦方向のノズルの位置が変動して、使わないノズルを少なくすることができる。
　また、ドット数を計測して、積極的に印字するドット数を制御することも可能になる。

PROJECTION INFORMATION OF GRAPHIC PORTION

POSITION 1

カーニングの位置を操作することによって、印刷する文字の位置を意識的に調整する。
これによって、連続する縦方向のノズルの位置が変動して、使わないノズルを少なくすることができる。
また、ドット数を計測して、積極的に印字するドット数を制御することも可能になる。

POSITION 2

カーニングの位置を操作することによって、印刷する文字の位置を意識的に調整する。
これによって、連続する縦方向のノズルの位置が変動して、使わないノズルを少なくすることができる。
また、ドット数を計測して、積極的に印字するドット数を制御することも可能になる。

カーニングの位置を操作することによって、印刷する文字の位置を意識的に調整する。これによって、連続する縦方向のノズルの位置が変動して、使わないノズルを少なくすることができる。
　また、ドット数を計測して、積極的に印字するドット数を制御することも可能になる。

ORIGINAL DATA

200

カーニングの位置を操作することによって、印刷する文字の位置を意識的に調整する。
　これによって、連続する縦方向のノズルの位置が変動して、使わないノズルを少なくすることができる。
　また、ドット数を計測して、積極的に印字するドット数を制御することも可能になる。

REDUCED LINE SPACING

カーニングの位置を操作することによって、印刷する文字の位置を意識的に調整する。
　これによって、連続する縦方向のノズルの位置が変動して、使わないノズルを少なくすることができる。
　また、ドット数を計測して、積極的に印字するドット数を制御することも可能になる。

PRINTER, PRINTER CONTROL PROGRAM, PRINTER CONTROL METHOD, IMAGE PROCESSING DEVICE, IMAGE PROCESSING PROGRAM, IMAGE PROCESSING METHOD, AND STORAGE MEDIUM STORING THE PROGRAM THEREIN

BACKGROUND

1. Technical Field

The present invention relates to a printer that prints out an image by discharging ink from nozzles and, more particularly, to a printer, a printer control program, a printer control method, an image processing device, an image processing program, an image processing method, and a storage medium storing the program therein, suitable for preventing clogging of ink filled in nozzles that are not used during printing process.

2. Related Art

In an existing ink jet printer that prints out an image by discharging ink from nozzles, a process (which is called flushing, or the like) is performed to discharge ink from all the nozzles at a constant period of time during printing process. In this manner, ink is prevented from clogging in the nozzles that are not used for printing. A flushing technology is, for example, described as an ink jet recording apparatus in Japanese Unexamined Patent Application Publication No. 2004-106470 and described as a printer in Japanese Unexamined Patent Application Publication No. 2004-345155.

The ink jet recording apparatus described in JP-A-2004-106470 is provided with a head movement driving portion that reciprocally moves a line ink jet printer head, which performs a single-pass recording mode, in an array direction of its nozzles, that is, in a main scanning direction, and then executes a head movement process in which the head movement driving portion is controllably driven to move the ink jet printer head in the array direction of the nozzles and a nozzle position changing process in which, in a direction opposite to the head movement direction at a pitch corresponding to the amount of shift of the ink jet printer head at this time, the positions of the nozzles, which discharge ink droplets, are shifted in the ink jet printer head as a whole. In this manner, the positions of the nozzles, which discharge ink droplets, have been shifted in the ink jet printer head as a whole, so that nozzles that do not discharge ink are reduced, and, hence, it is less likely to cause an ink discharge defect in the nozzles.

On the other hand, the printer described in JP-A-2004-345155 is configured so that a printer driver includes a counter that, when a group of recording elements that form a recording head of the printer is separated into a given number of separated recording element groups, accumulates the number of pixels recorded by each recording element group and an information transmitting device that transfers the recorded pixel number information, accumulated by the counter, to the printer. In this manner, by checking a print duty of each portion of the recording head, it is possible to perform a further detailed cleaning operation. Thus, the reliability of image quality is improved.

However, in the existing art described in JP-A-2004-106470, an exclusive mechanism is required for shifting the nozzles, so that there is a possibility that inconvenience, such as an increase in cost and/or an increased size of apparatus, occurs. On the other hand, in the existing art described in JP-A-2004-345155, it is only necessary to perform cleaning at desired portions, so that useless ink discharge can be prevented without requiring an exclusive mechanism. However, there is still a room for improvement in terms of performing cleaning in addition to a printing process.

SUMMARY

An advantage of some aspects of at least one embodiment of the invention is that it provides a printer, a printer control program, a printer control method, an image processing device, an image processing program, an image processing method, and a storage medium that stores the program, suitable for preventing clogging of ink in nozzles that have not been used during a printing process.

First Aspect

A first aspect of at least one embodiment of the invention provides a printer. The printer includes a print head having nozzles that are arranged in a plurality of lines and that form dots by discharging ink onto a medium used for printing. The printer prints out an image on the medium by one scanning operation using the print head. The printer includes a printing image data acquisition device, an N-level processing device, a dot forming information generating device, a print position information modification device, and a printing device. The printing image data acquisition device acquires printing image data that include image information of the image and information regarding a print position of the image. The N-level processing device converts printing image data that include image information having the number of addressable luminance levels M (M is natural number and M≧2) into printing image data that include image information having the number of addressable luminance levels N (N is natural number, and M≧N≧2). The dot forming information generating device generates, on the basis of the printing image data, dot forming information that is information indicating a state of dots, formed by nozzles that constitute the print head, with respect to the printing image data. The print position information modification device modifies, on the basis of the dot forming information, print position information that is information regarding the print position in the printing image data so that all or substantially all the nozzles that constitute the print head form a predetermined number of dots or more at every predetermined print timing during a period when printing is continuously performed. The printing device prints out an image on the medium using the print head on the basis of the printing image data having the number of addressable luminance levels N.

With this configuration, printing image data that include image information of the image and information regarding a print position of the image may be acquired using the printing image data acquisition device, printing image data that include image information having the number of addressable luminance levels M (M is natural number and M≧2) may be converted into printing image data that include image information having the number of addressable luminance levels N (N is natural number and M≧N≧2) using the N-level processing device, dot forming information that is information indicating a state of dots formed by the nozzles that constitute the print head may be generated with respect to the printing image data on the basis of the printing image data using the dot forming information generating device, print position information that is information regarding the print position in the printing image data may be modified so that all or substantially all the nozzles that constitute the print head form a predetermined number of dots or more at predetermined print timing during a period when printing is continuously performed on the basis of the dot forming information using the print position information modification device, and an image may be printed on the medium using the print head on the basis of the printing image data having the number of addressable luminance levels N using the printing device.

Thus, during a period when printing is continuously performed on a plurality of mediums, for example, print position information in the printing image data are modified so that all or substantially all the nozzles form a predetermined number of dots or more, each time printing is performed onto successive two media, by printing onto a first medium and by printing onto a second medium. Thus, it is possible to prevent ink in all or substantially all the nozzles that constitute the print head from getting dry. Hence, it is advantageous in that the operation to prevent ink in the nozzles from getting dry can reduce the amount of ink consumed or remove the operation itself.

In addition, print position information may be modified on the basis of the state of dots formed, so that it is possible to modify the print position information of required portions so that nozzles that form relatively small number of dots are appropriately used. In this manner, it is advantageous in that, with minimum necessary modification, it is possible to prevent ink in all or substantially all the nozzles that constitute the print head from getting dry.

Particularly, when the present aspect is applied to a printer that performs flushing operation by which ink is discharged periodically from all the nozzles in order to prevent ink filled in the nozzles from getting dry, it is possible to reduce the number of flushing operations, the number of nozzles used for flushing operation, or the like, without providing any special mechanisms. Furthermore, flushing operation need not be performed during printing process, so that it is possible to prevent clogging of ink without reducing a print speed. Moreover, in the configuration in which ink is discharged periodically from only the nozzles that are not used as described in JP-A-2004-345155 as well, by applying the present aspect, it is possible to reduce the number of times the flushing operation is executed.

Here, the above described printing image data correspond to document image data formed of character information, image information, palette information of characters and images, position information of text and images, or the like, and image data formed of information that includes images only. In addition, the printing image data may be the one after rendering the document image data or the image data, or may be image data having the number of addressable luminance levels N ($M \geq N \geq 2$) that are converted from image data having the number of addressable luminance levels M ($M \geq 2$). Further, the document image data include, in addition to document image data that are created by a word processor, or the like, document image data that are generated using page description language, such as PostScript, document image data that are created using XPS (XML Paper Specification), or the like. The same applies to the following aspects that relate to a printer control program, aspects that relate to a printer control method, aspects that relate to an image processing device, aspects that relate to an image processing program, aspects that relate to an image processing method, aspects that relate to a computer readable storage medium storing the above program, and exemplary embodiments described later.

In addition, the printing image data acquisition device, for example, acquires printing image data that are input from an optical reading device, such as a scanner device, or passively or actively acquires printing image data stored in an external device through a network, such as LAN or WAN, or acquires printing image data from a recording medium, such as a CD-ROM or a DVD-ROM, through a drive, such as a CD drive or a DVD drive, installed in the printer, or acquires printing image data stored in a storage device that is installed in an image processing device. That is, the above acquisition at least includes inputting, obtaining, receiving and reading. The same applies to the following aspects that relate to a printer control program, aspects that relate to a printer control method, aspects that relate to an image processing device, aspects that relate to an image processing program, aspects that relate to an image processing method, aspects that relate to a computer readable storage medium storing the above program, and exemplary embodiments described later.

The print position information, when it is document image data, corresponds to character size, image size, character position, image position, character spacing, line spacing, margin, or the like, and, when it is image data other than a document image or rendered image data, corresponds to coordinate information of pixels, or the like. In addition, the print position information, when converted into the image data having the number of addressable luminance levels N, corresponds to dot forming position (coordinate position) information, or the like. The same applies to the following aspects that relate to a printer control program, aspects that relate to a printer control method, aspects that relate to an image processing device, aspects that relate to an image processing program, aspects that relate to an image processing method, aspects that relate to a computer readable storage medium storing the above program, and exemplary embodiments described later.

In addition, the above described dot indicates an area formed by ink that is discharged from one or plurality of nozzles and is adhered on a printing medium. Moreover, an area of "dot" is not "zero". The dot, of course, has a certain size (area) and, in addition, dots may have various sizes. However, dots formed by discharging ink do not always become a perfect circle. For example, when dots are formed in a shape other than perfect circle, such as ellipse, its average diameter is used as a dot diameter, or an equivalent dot of a perfect circle having the same area as an area of a dot formed by discharging a certain amount of ink is assumed, and the diameter of the equivalent dot is used as a dot diameter. The same applies to the following aspects that relate to a printer control program, aspects that relate to a printer control method, aspects that relate to an image processing device, aspects that relate to an image processing program, aspects that relate to an image processing method, aspects that relate to a computer readable storage medium storing the above program, and exemplary embodiments described later.

In addition, "printing of an image is continuously performed" corresponds to, for example, when printing is continuously performed at constant time intervals, or when printing is performed continuously at intervals that fall within a predetermined range of time. The same applies to the following aspects that relate to a printer control program, aspects that relate to a printer control method, aspects that relate to an image processing device, aspects that relate to an image processing program, aspects that relate to an image processing method, aspects that relate to a computer readable storage medium storing the above program, and exemplary embodiments described later.

Second Aspect

Furthermore, the printer according to the second aspect may be configured so that, in the printer of the first aspect, the predetermined print timing is timing at which nozzles that constitute the print head do not produce clogging of ink. With this configuration, for example, by modifying the print position information so as to, for example, form a sufficient number of dots for running down ink filled in the nozzles at timing that does not cause clogging of ink, it is possible to prevent the occurrence of clogging of ink without additionally performing ink discharge operation (for example, flushing operation, or the like) for not having ink get dry during a period when printing is continuously performed. In this manner, it is advantageous in that useless waste of ink may be suppressed.

Third Aspect

Furthermore, the printer according to the third aspect may be configured so that, in the printer of the first or second aspect, the dot forming information generating device calculates the number of dots formed by the nozzles that constitute the print head on the basis of the printing image data on which rendering has been executed, and generates the dot forming information on the basis of the calculated result. With this configuration, the number of dots formed by the nozzles before and after the print position information is modified may be properly recognized, so that it is possible to appropriately modify the print position information. In this manner, it is advantageous in that, with minimum necessary modification and more reliable manner, it is possible to prevent ink filled in all or substantially all the nozzles that constitute the print head from getting dry.

Fourth Aspect

Moreover, the printer according to the fourth aspect may be configured so that, in the printer of any one of the first to third aspects, when the printing image data have image information having the number of addressable luminance levels N, the print position information modification device modifies coordinate position information of the dots, as the print position information, in the image information having the number of addressable luminance levels N. With this configuration, because print position information in the printing image data may be modified after the positions of dots formed have been determined, it is advantageous in that the print position may be easily and more appropriately changed.

Fifth Aspect

In addition, the printer according to the fifth aspect may be configured so that, in the printer of any one of the first to fourth aspects, when the printing image data include information of a document image, the dot forming information generation device generates dot forming information of nozzles that print out character images of character string among the nozzles used for printing for each character string that constitutes the document image, and the print position information modification device modifies the print position information for each character string on the basis of the dot forming information of each character string. With this configuration, because the print position information may be modified in units of character string in a document image, it is advantageous in that the print position information may be more appropriately modified.

Sixth Aspect

Furthermore, the printer according to the sixth aspect may be configured so that, in the printer of any one of the first to fifth aspects, when the printing image data include information of a document image, the print position information modification device modifies at least one of coordinate position information, size information and character spacing information, as the print position information, of character images that constitute the document image.

With this configuration, it is advantageous in that, on the basis of at least one of coordinate position information, size information and character spacing information, in the printing image data, of characters that constitute a document image, modification process required for using all or substantially all the nozzles of the print head within a predetermined printing period may be easily and appropriately executed. Here, the above character spacing information corresponds to the width of character in the column direction, the width of character in the line direction, or the like. For example, when the nozzle array direction is the same as the line direction, the amount of shift is calculated using the width of character in the column direction (column spacing), while, on the other hand, when the nozzle array direction is the same direction as the column direction, the amount of shift is calculated using the width of character in the line direction (line spacing). The same applies to the following aspects that relate to a printer control program, aspects that relate to a printer control method, aspects that relate to an image processing device, aspects that relate to an image processing program, aspects that relate to an image processing method, aspects that relate to a computer readable storage medium storing the above program, and exemplary embodiments described later.

Seventh Aspect

In addition, the printer according to the seventh aspect may be configured so that, in the printer of any one of the first to sixth aspects, the print position information modification device modifies the print position information so that the print position of the image is changed in the nozzle array direction of the print head. With this configuration, it is advantageous in that, by changing the print position of the entire image in the nozzle array direction, it is possible to easily and reliably use nozzles, which have not been used before the change in position, are used after the change in position.

Eighth Aspect

Moreover, the printer according to the eighth aspect may be configured so that, in the printer of any one of the first to seventh aspects, when the printing image data include a document image and image information other than the document image, the print position information modification device modifies print position information of the image information other than the document image, prior to the document image.

With this configuration, by modifying print position information corresponding to an image other than a document image only, it is possible to prevent ink filled in all or substantially all the nozzles that constitute the print head from getting dry. In this manner, because large modification of position modification information corresponding to a document image is prevented, it is advantageous in that useless waste of ink may be suppressed while not losing a balance as a whole.

Ninth Aspect

Moreover, the printer according to the ninth aspect may be configured so that, in the printer of any one of the first to eight aspects, when the image is continuously printed on the multiple media, the print position information modification device modifies the print position information in the printing image data in units of printing operation, that is, in units of printing operation on the single medium or in units of printing operation on the multiple media.

With this configuration, because information regarding the print position in the printing image data may be modified so that the print position of an image is modified every time a single medium or multiple media are printed, it is possible to unify the content of modification in units of a single page or in units of multiple pages. In this manner, it is advantageous in that useless ink waste may be reduced, while reducing deterioration in appearance of the printed result due to modification of print position information.

Tenth Aspect

Further, the printer according to the tenth aspect may be configured so that, in the printer of any one of the first to eighth aspects, when the image is continuously printed on the multiple media, the print position information modification device modifies the print position information in the printing image data corresponding to the multiple media so that modification of the multiple media is performed over the multiple media by the amount of modification required for all or substantially all the nozzles that constitute the print head to form a predetermined number of dots at every predetermined print timing during a period when printing is continuously printed.

With this configuration, for example, shifting of an image corresponding to the total amount of change of print position may be performed separately over multiple media. That is, the total amount of shift is not achieved by a single medium at one time, but shifting of the total amount of shift is performed separately by portions over multiple media. In this manner, it is possible to make the change in print position in a single medium be minute, so that the change in print position is hardly recognized. Thus, it is advantageous in that useless ink waste may be reduced, while reducing deterioration in appearance of the printed result due to modification of print position information.

Eleventh Aspect

Moreover, the printer according to the eleventh aspect may be configured so that, in the printer of any one of the first to eighth aspects, the print position information modification device modifies image size of the printing image data on the basis of the printing width of the print head and the print area width on the medium, and modifies the print position information in the modified printing image data.

With this configuration, for example, even when the printing width of the print head is equal to the print area width on the medium, it is possible to change the print position by reducing an image. That is, in accordance with the relationship between the printing width of the print head and the print area width on the medium, an image may be adjusted to an appropriate size, so that it is advantageous in that useless ink waste may be reduced more reliably.

Twelfth Aspect

A twelfth aspect of at least one embodiment of the invention provides a printer control program. The printer control program is used for controlling a printer including a print head having nozzles that are arranged in a plurality of lines and that form dots by discharging ink onto a medium used for printing. The printer prints out an image on the medium using the print head. The printer control program, executable on a computer, includes instructions for acquiring printing image data that include image information of the image and information regarding a print position of the image, executing N-level process to convert the printing image data that include image information having the number of addressable luminance levels M (M is natural number and $M \geq 2$) into printing image data that include image information having the number of addressable luminance levels N (N is natural number, and $M \geq N \geq 2$), generating dot forming information, on the basis of the printing image data, that is information indicating a state of dots, formed by nozzles that constitute the print head, with respect to the printing image data, modifying print position information, on the basis of the dot forming information, that is information regarding the print position in the printing image data so that all or substantially all the nozzles that constitute the print head form a predetermined number of dots or more at every predetermined print timing during a period when printing is continuously performed, and performing printing an image on the medium using the print head on the basis of the printing image data having the number of addressable luminance levels N.

With this configuration, when the program is read by the computer and, in accordance with the read program, the computer executes a process, the same function and advantageous effects as in the case of the printer of the first aspect are obtained. Almost all the printers, such as ink jet printers, which are now commercially available, are provided with a computer system formed of a central processing unit (CPU), a storage device (RAM, ROM), an input/output device, or the like, are able to implement the above described processes using the computer system through software, so that it is possible to economically and easily implement the processes in comparison with a case where the above processes are implemented by creating exclusive hardware. Furthermore, by rewriting portion of the program, it is possible to easily upgrade the software for functional modifications and/or improvements.

Thirteenth Aspect

Furthermore, the printer control program according to the thirteenth aspect may be configured so that, in the printer control program of the twelfth aspect, the predetermined print timing is timing at which nozzles that constitute the print head do not produce clogging of ink. With this configuration, when the program is read by the computer and, in accordance with the read program, the computer executes a process, the same function and advantageous effects as in the case of the printer of the second aspect are obtained.

Fourteenth Aspect

Furthermore, the printer control program according to the fourteenth aspect may be configured so that, in the printer control program of the twelfth or thirteenth aspect, when the dot forming information is generated, the number of dots formed by the nozzles that constitute the print head is calculated on the basis of the printing image data on which rendering has been executed, and the dot forming information is generated on the basis of the calculated result. With this configuration, when the program is read by the computer and, in accordance with the read program, the computer executes a process, the same function and advantageous effects as in the case of the printer of the third aspect are obtained.

Fifteenth Aspect

Moreover, the printer control program according to the fifteenth aspect may be configured so that, in the printer control program of any one of the twelfth to fourteenth aspects, when the printing image data have image information having the number of addressable luminance levels N, coordinate position information of the dots, as the print position information, in the image information having the number of addressable luminance levels N is modified when the print position information is modified. With this configuration, when the program is read by the computer and, in accordance with the read program, the computer executes a process, the same function and advantageous effects as in the case of the printer of the fourth aspect are obtained.

Sixteenth Aspect

In addition, the printer control program according to the sixteenth aspect may be configured so that, in the printer control program of any one of the twelfth to fifteenth aspects, when the printing image data include information of a document image, dot forming information of nozzles that print out character images of character string is generated among the nozzles used for printing for each character string that constitutes the document image when the dot forming information is generated, and the print position information for each character string is modified on the basis of the dot forming information of each character string when the print position information is modified. With this configuration, when the program is read by the computer and, in accordance with the read program, the computer executes a process, the same function and advantageous effects as in the case of the printer of the fifth aspect are obtained.

Seventeenth Aspect

Furthermore, the printer control program according to the seventeenth aspect may be configured so that, in the printer control program of any one of the twelfth to sixteenth aspects, when the printing image data include information of a document image, at least one of coordinate position information, size information and character spacing information, as the print position information, of character images that constitute the document image is modified when the print position information is modified. With this configuration, when the program is read by the computer and, in accordance with the read program, the computer executes a process, the same function and advantageous effects as in the case of the printer of the sixth aspect are obtained.

Eighteenth Aspect

In addition, the printer control program according to the eighteenth aspect may be configured so that, in the printer control program of any one of the twelfth to seventeenth aspects, when the print position information is modified, the print position information is modified so that the print position of the image is changed in the nozzle array direction of the print head. With this configuration, when the program is read by the computer and, in accordance with the read program, the computer executes a process, the same function and advantageous effects as in the case of the printer of the seventh aspect are obtained.

Nineteenth Aspect

Moreover, the printer control program according to the nineteenth aspect may be configured so that, in the printer control program of any one of the twelfth to eighteenth aspects, when the printing image data include a document image and image information other than the document image, print position information of the image information other than the document image is modified prior to the document image, when the print position information is modified. With this configuration, when the program is read by the computer and, in accordance with the read program, the computer executes a process, the same function and advantageous effects as in the case of the printer of the eighth aspect are obtained.

Twentieth Aspect

Moreover, the printer control program according to the twentieth aspect may be configured so that, in the printer control program of any one of the twelfth to nineteenth aspects, when the image is continuously printed on the multiple media, the print position information in the printing image data is modified in units of printing operation, that is, in units of printing operation on the single medium or in units of printing operation on the multiple media when the print position information is modified. With this configuration, when the program is read by the computer and, in accordance with the read program, the computer executes a process, the same function and advantageous effects as in the case of the printer of the ninth aspect are obtained.

Twenty-first Aspect

Further, the printer control program according to the twenty-first aspect may be configured so that, in the printer control program of any one of the twelfth to nineteenth aspects, when the image is continuously printed on the multiple media, the print position information in the printing image data corresponding to the multiple media is modified, when the print position information is modified, so that modification of the multiple media is performed over the multiple media by the amount of modification required for all or substantially all the nozzles that constitute the print head to form a predetermined number of dots at every predetermined print timing during a period when printing is continuously printed. With this configuration, when the program is read by the computer and, in accordance with the read program, the computer executes a process, the same function and advantageous effects as in the case of the printer of the tenth aspect are obtained.

Twenty-second Aspect

Moreover, the printer control program according to the twenty-second aspect may be configured so that, in the printer control program of any one of the twelfth to twenty-first aspects, when the print position information is modified, image size of the printing image data is modified on the basis of the printing width of the print head and the print area width on the medium, and the print position information in the modified printing image data is modified. With this configuration, when the program is read by the computer and, in accordance with the read program, the computer executes a process, the same function and advantageous effects as in the case of the printer of the eleventh aspect are obtained.

Twenty-third Aspect

A twenty-third aspect of at least one embodiment of the invention provides a computer readable storage medium that stores the printer control program according to any one of the twelfth to twenty-second aspects. In this manner, it is possible to easily and reliably offer a consumer, such as a user, with the printer control program according to any one of the twelfth to twenty-second aspects through a computer readable storage medium, such as a CD-ROM, a DVD-ROM, an FD, or a semiconductor chip.

Twenty-Fourth Aspect

A twenty-fourth aspect of at least one embodiment of the invention provides a printer control method. The printer control method is used for controlling a printer including a print head having nozzles that are arranged in a plurality of lines and that form dots by discharging ink onto a medium used for printing. The printer prints out an image on the medium using the print head. The printer control method includes acquiring printing image data that include image information of the image and information regarding a print position of the image, executing N-level process to convert the printing image data that include image information having the number of addressable luminance levels M (M is natural number and $M \geq 2$) into printing image data that include image information having the number of addressable luminance levels N (N is natural number, and $M \geq N \geq 2$), generating dot forming information, on the basis of the printing image data, that is information indicating a state of dots, formed by nozzles that constitute the print head, with respect to the printing image data, modifying print position information, on the basis of the dot forming information, that is information regarding the print position in the printing image data so that all or substantially all the nozzles that constitute the print head form a predetermined number of dots or more at every predetermined print timing during a period when printing is continuously performed, and performing printing an image on the medium using the print head on the basis of the printing image data having the number of addressable luminance levels N. In this manner, the same function and advantageous effects as those of the printer of the first aspect are obtained.

Twenty-fifth Aspect

Furthermore, the printer control method according to the twenty-fifth aspect may be configured so that, in the printer control method of the twenty-fourth aspect, the predetermined print timing is timing at which nozzles that constitute the print head do not produce clogging of ink. In this manner, the same function and advantageous effects as those of the printer of the second aspect are obtained.

Twenty-sixth Aspect

Furthermore, the printer control method according to the twenty-sixth aspect may be configured so that, in the printer control method of the twenty-fourth or twenty-fifth aspect, when the dot forming information is generated, the number of dots formed by the nozzles that constitute the print head is calculated on the basis of the printing image data on which rendering has been executed, and the dot forming information is generated on the basis of the calculated result. In this manner, the same function and advantageous effects as those of the printer of the third aspect are obtained.

Twenty-seventh Aspect

Moreover, the printer control method according to the twenty-seventh aspect may be configured so that, in the printer control method of any one of the twenty-fourth to twenty-sixth aspects, when the printing image data have image information having the number of addressable luminance levels N, coordinate position information of the dots, as the print position information, in the image information having the number of addressable luminance levels N is modified when the print position information is modified. In this manner, the same function and advantageous effects as those of the printer of the fourth aspect are obtained.

Twenty-Eighth Aspect

In addition, the printer control method according to the twenty-eighth aspect may be configured so that, in the printer control method of any one of the twenty-fourth to twenty-seventh aspects, when the printing image data include information of a document image, dot forming information of nozzles that print out character images of character string is generated in the nozzles used for printing for each character string that constitutes the document image when the dot forming information is generated, and the print position information for each character string is modified on the basis of the dot forming information of each character string when the print position information is modified. In this manner, the same function and advantageous effects as those of the printer of the fifth aspect are obtained.

Twenty-ninth Aspect

Furthermore, the printer control method according to the twenty-ninth aspect may be configured so that, in the printer control method of any one of the twenty-fourth to twenty-eighth aspects, when the printing image data include information of a document image, at least one of coordinate position information, size information and character spacing information, as the print position information, of character images that constitute the document image is modified when the print position information is modified. In this manner, the same function and advantageous effects as those of the printer of the sixth aspect are obtained.

Thirtieth Aspect

In addition, the printer control method according to the thirtieth aspect may be configured so that, in the printer control method of any one of the twenty-fourth to twenty-ninth aspects, when the print position information is modified, the print position information is modified so that the print position of the image is changed in the nozzle array direction of the print head. In this manner, the same function and advantageous effects as those of the printer of the seventh aspect are obtained.

Thirty-first Aspect

Moreover, the printer control method according to the thirty-first aspect may be configured so that, in the printer control method of any one of the twenty-fourth to thirtieth aspects, when the printing image data include a document image and image information other than the document image, print position information of the image information other than the document image is modified prior to the document image when the print position information is modified. In this manner, the same function and advantageous effects as those of the printer of the eighth aspect are obtained.

Thirty-second Aspect

Moreover, the printer control method according to the thirty-second aspect may be configured so that, in the printer control method of any one of the twenty-fourth to thirty-first aspects, when the image is continuously printed on the multiple media, the print position information in the printing image data is modified in units of printing operation, that is, in units of printing operation on the single medium or in units of printing operation on the multiple media when the print position information is modified. In this manner, the same function and advantageous effects as those of the printer of the ninth aspect are obtained.

Thirty-third Aspect

Further, the printer control method according to the thirty-third aspect may be configured so that, in the printer control method of any one of the twenty-fourth to thirty-first aspects, when the image is continuously printed on the multiple media, the print position information in the printing image data corresponding to the multiple media is modified, when the print position information is modified, so that modification of the multiple media is performed over the multiple media by the amount of modification required for all or substantially all the nozzles that constitute the print head to form a predetermined number of dots at every predetermined print timing during a period when printing is continuously printed. In this manner, the same function and advantageous effects as those of the printer of the tenth aspect are obtained.

Thirty-Fourth Aspect

Moreover, the printer control method according to the thirty-fourth aspect may be configured so that, in the printer control method of any one of the twenty-fourth to thirty-third aspects, when the print position information is modified, image size of the printing image data is modified on the basis of the printing width of the print head and the print area width on the medium, and the print position information in the modified printing image data is modified. In this manner, the same function and advantageous effects as those of the printer of the eleventh aspect are obtained.

Thirty-fifth Aspect

A thirty-fifth aspect of at least one embodiment of the invention provides an image processing device. The image processing device executes image processing on printing image data used in a printer including a print head having nozzles that are arranged in a plurality of lines and that form dots by discharging ink onto a medium used for printing. The printer prints out an image on the medium using the print head. The image processing device includes a printing image data acquisition device, an N-level processing device, a dot forming information generating device, and a print position information modification device. The printing image data acquisition device acquires printing image data that include image information of the image and information regarding a print position of the image. The N-level processing device converts the printing image data that include image information having the number of addressable luminance levels M (M is natural number and M≧2) into printing image data that include image information having the number of addressable luminance levels N (N is natural number, and M≧N≧2). The dot forming information generating device generates, on the basis of the printing image data, dot forming information that is information indicating a state of dots, formed by nozzles that constitute the print head, with respect to the printing image data. The print position information modification device modifies, on the basis of the dot forming information, print position information that is information regarding the print position in the printing image data so that all or substantially all the nozzles that constitute the print head form a predetermined number of dots or more at every predetermined print timing during a period when printing is continuously performed.

With this configuration, printing image data that include image information of the image and information regarding a print position of the image may be acquired using the printing image data acquisition device, the printing image data that include image information having the number of addressable luminance levels M (M is natural number and M≧2) may be converted into printing image data that include image information having the number of addressable luminance levels N (N is natural number and M≧N≧2) using the N-level processing device, dot forming information that is information indicating a state of dots formed by the nozzles that constitute the print head may be generated with respect to the printing image data on the basis of the printing image data using the dot forming information generating device, and print position information that is information regarding the print position in the printing image data may be modified so that all or substantially all the nozzles that constitute the print head form a predetermined number of dots or more at predetermined print timing during a period when printing is continuously performed on the basis of the dot forming information using the print position information modification device.

Thus, during a period when printing is continuously performed on multiple media, for example, print position information in the printing image data is modified so that all or substantially all the nozzles form a predetermined number of dots or more, each time when printing is performed onto successive two media, by printing onto a first medium and by printing onto a second medium, so that it is possible to generate printing image data that can prevent ink in all or substantially all the nozzles that constitute the print head from getting dry. By performing printing using the above printing image data, it is advantageous in that the operation to prevent ink filled in the nozzles from getting dry can reduce the amount of ink consumed or remove the operation itself.

In addition, print position information may be modified on the basis of the state of dots formed, so that it is possible to modify the print position information of required portions so that nozzles that form relatively small number of dots are appropriately used. In this manner, it is advantageous in that, with minimum necessary modification, it is possible to generate printing image data that can prevent ink filled in all or substantially all the nozzles that constitute the print head from getting dry.

Particularly, when the present aspect is applied to a printer that performs flushing operation by which ink is discharged periodically from all the nozzles in order to prevent ink filled in the nozzles from getting dry, it is possible to reduce the number of flushing operations, the number of nozzles used for flushing operation, or the like, without providing any special mechanisms. Moreover, in the configuration in which ink is discharged periodically from only the nozzles that are not used, as described in JP-A-2004-345155 as well, by applying the present aspect, it is possible to reduce the number of times the flushing operation is executed.

Thirty-sixth Aspect

Furthermore, the image processing device according to the thirty-sixth aspect may be configured so that, in the image processing device of the thirty-fifth aspect, the predetermined print timing is timing at which nozzles that constitute the print head do not produce clogging of ink. With this configuration, for example, by modifying the print position information so as to, for example, form a sufficient number of dots for running down ink filled in the nozzles at timing that does not cause clogging of ink, it is possible to generate printing image data that can prevent the occurrence of clogging of ink without additionally performing ink discharge operation (for example, flushing operation, or the like) for not having ink get dry during a period when printing is continuously performed. In this manner, it is advantageous in that useless waste of ink may be suppressed.

Thirty-seventh Aspect

Furthermore, the image processing device according to the thirty-seventh aspect may be configured so that, in the image processing device of the thirty-fifth or thirty-sixth aspect, the dot forming information generating device calculates the number of dots formed by the nozzles that constitute the print head on the basis of the printing image data on which rendering has been executed, and generates the dot forming information on the basis of the calculated result.

With this configuration, the number of dots formed by the nozzles before and after the print position information is modified may be properly recognized, so that it is possible to appropriately modify the print position information. In this manner, it is advantageous in that, with minimum necessary modification and more reliable manner, it is possible to generate printing image data that can prevent ink in all or substantially all the nozzles that constitute the print head from getting dry.

Thirty-eighth Aspect

Moreover, the image processing device according to the thirty-eighth aspect may be configured so that, in the image processing device of any one of the thirty-fifth to thirty-seventh aspects, when the printing image data have image information having the number of addressable luminance levels N, the print position information modification device modifies coordinate position information of the dots, as the print position information, in the image information having the number of addressable luminance levels N. With this configuration, because the print position information of printing image data may be modified after the positions of dots formed have been determined, it is advantageous in that it is possible to generate printing image data that can easily and more appropriately change the print position.

Thirty-ninth Aspect

In addition, the image processing device according to the thirty-ninth aspect may be configured so that, in the image processing device of any one of the thirty-fifth to thirty-eighth aspects, when the printing image data include information of a document image, the dot forming information generation device generates dot forming information of nozzles that print out character images of character string among the nozzles used for printing for each character string that constitutes the document image, and the print position information modification device modifies the print position information for each character string on the basis of the dot forming information of each character string. With this configuration, because print position information may be modified in units of character string in a document image, it is advantageous in that the print position information may be more appropriately modified.

Fortieth Aspect

Furthermore, the image processing device according to the fortieth aspect may be configured so that, in the image processing device of any one of the thirty-fifth to thirty-ninth aspects, when the printing image data include information of a document image, the print position information modification device modifies at least one of coordinate position information, size information and character spacing information, as the print position information, of character images that constitute the document image. With this configuration, it is advantageous in that, on the basis of at least one of coordinate position information, size information and character spacing information, in the printing image data, of characters that constitute a document image, modification process required for using all or substantially all the nozzles of the print head within a predetermined printing period may be easily and appropriately executed.

Forty-first Aspect

In addition, the image processing device according to the forty-first aspect may be configured so that, in the image processing device of any one of the thirty-fifth to fortieth aspects, the print position information modification device modifies the print position information so that the print position of the image is changed in the nozzle array direction of the print head. With this configuration, it is advantageous in that, by changing the print position of the entire image in the nozzle array direction, it is possible to generate printing image data that can easily and reliably use nozzles, which are not used before the position modification, are used after the position modification.

Forty-second Aspect

Moreover, the image processing device according to the forty-second aspect may be configured so that, in the image processing device of any one of the thirty-fifth to forty-first aspects, when the printing image data include a document image and image information other than the document image, the print position information modification device modifies print position information of the image information other than the document image, prior to the document image.

With this configuration, by modifying print position information corresponding to an image other than a document image only, it is possible to prevent ink filled in all or substantially all the nozzles that constitute the print head from getting dry. In this manner, because large modification of print position information corresponding to a document image is prevented, it is advantageous in that it is possible to generate printing image data that can suppress useless waste of ink while not losing a balance as a whole.

Forty-third Aspect

Moreover, the image processing device according to the forty-third aspect may be configured so that, in the image processing device of any one of the thirty-fifth to forty-second aspects, when the image is continuously printed on the multiple media, the print position information modification device modifies the print position information in the printing image data in units of printing operation, that is, in units of printing operation on the single medium or in units of printing operation on the multiple media.

With this configuration, because information regarding the print position in the printing image data may be modified so that the print position of an image is changed every time a single medium or multiple media are printed, it is possible to generate printing image data that can unify the content of modification in units of a single page or in units of multiple pages. In this manner, it is advantageous in that useless ink waste may be reduced, while reducing deterioration in appearance of the printed result due to modification of print position information.

Forty-fourth Aspect

Further, the image processing device according to the forty-fourth aspect may be configured so that, in the image processing device of any one of the thirty-fifth to forty-second aspects, when the image is continuously printed on the multiple media, the print position information modification device modifies the print position information in the printing image data corresponding to the multiple media so that modification of the multiple media is performed over the multiple media by the amount of modification required for all or substantially all the nozzles that constitute the print head to form a predetermined number of dots at every predetermined print timing during a period when printing is continuously printed.

With this configuration, for example, it is possible to generate printing image data that can perform shifting of an image corresponding to the total amount of change of print position separately over multiple media. That is, the total amount of shift is not achieved by a single medium at one time, but shifting of the total amount of shift is performed separately by portions over multiple media. In this manner, it is possible to make the change in print position in a single medium be minute, so that the change in print position is hardly recognized. Thus, it is advantageous in that useless ink waste may be reduced, while reducing deterioration in appearance of the printed result due to modification of print position information.

Forty-fifth Aspect

Moreover, the image processing device according to the forty-fifth aspect may be configured so that, in the image processing device of any one of the thirty-fifth to forty-fourth aspects, the print position information modification device modifies image size of the printing image data on the basis of the printing width of the print head and the print area width on the medium and modifies the print position information in the modified printing image data.

With this configuration, for example, even when the printing width of the print head is equal to the print area width on the medium, it is possible to change the print position by reducing an image. That is, in accordance with the relationship between the printing width of the print head and the print area width on the medium, an image may be adjusted to an appropriate size, so that it is advantageous in that it is possible to generate printing image data that can reduce useless ink waste more reliably.

Forty-sixth Aspect

A forty-sixth aspect of at least one embodiment of the invention provides an image processing program. The image processing program executes image processing on printing image data used in a printer including a print head having nozzles that are arranged in a plurality of lines and that form dots by discharging ink onto a medium used for printing. The printer prints out an image on the medium using the print head. The image processing program, executable on a computer, includes instructions for acquiring printing image data that include image information of the image and information regarding a print position of the image, executing N-level process to convert the printing image data that include image information having the number of addressable luminance levels M (M is natural number and M≧2) into printing image data that include image information having the number of addressable luminance levels N (N is natural number, and M≧N≧2), generating dot forming information, on the basis of the printing image data, that is information indicating a state of dots, formed by nozzles that constitute the print head, with respect to the printing image data, and modifying print position information, on the basis of the dot forming information, that is information regarding the print position in the printing image data so that all or substantially all the nozzles that constitute the print head form a predetermined number of dots or more at every predetermined print timing during a period when printing is continuously performed. With this configuration, when the program is read by the computer and, in accordance with the read program, the computer executes a process, the same function and advantageous effects as in the case of the image processing device of the thirty-fifth aspect are obtained.

Forty-seventh Aspect

Furthermore, the image processing program according to the forty-seventh aspect may be configured so that, in the image processing program of the forty-sixth aspect, the predetermined print timing is timing at which nozzles that constitute the print head do not produce clogging of ink. With this configuration, when the program is read by the computer and, in accordance with the read program, the computer executes a process, the same function and advantageous effects as in the case of the image processing device of the thirty-sixth aspect are obtained.

Forty-eighth Aspect

Furthermore, the image processing program according to the forty-eighth aspect may be configured so that, in the image processing program of the forty-sixth or forty-seventh aspect, when the dot forming information is generated, the number of dots formed by the nozzles that constitute the print head is calculated on the basis of the printing image data on which rendering has been executed, and the dot forming information is generated on the basis of the calculated result. With this configuration, when the program is read by the computer and, in accordance with the read program, the computer executes a process, the same function and advantageous effects as in the case of the image processing device of the thirty-seventh aspect are obtained.

Forty-ninth Aspect

Moreover, the image processing program according to the forty-ninth aspect may be configured so that, in the image processing program of any one of the forty-sixth to forty-eighth aspects, when the printing image data have image information having the number of addressable luminance levels N, coordinate position information of the dots, as the print position information, in the image information having the number of addressable luminance levels N is modified, when the print position information is modified. With this configuration, when the program is read by the computer and, in accordance with the read program, the computer executes a process, the same function and advantageous effects as in the case of the image processing device of the thirty-eighth aspect are obtained.

Fiftieth Aspect

In addition, the image processing program according to the fiftieth aspect may be configured so that, in the image processing program of any one of the forty-sixth to forty-eighth aspects, when the printing image data include information of a document image, dot forming information of nozzles that print out character images of character string is generated among the nozzles used for printing for each character string that constitutes the document image when the dot forming information is generated, and the print position information for each character string is modified on the basis of the dot forming information of each character string when the print position information is modified. With this configuration, when the program is read by the computer and, in accordance with the read program, the computer executes a process, the same function and advantageous effects as in the case of the image processing device of the thirty-ninth aspect are obtained.

Fifty-first Aspect

Furthermore, the image processing program according to the fifty-first aspect may be configured so that, in the image processing program of any one of the forty-sixth to fiftieth aspects, when the printing image data include information of a document image, at least one of coordinate position information, size information and character spacing information, as the print position information, of character images that constitute the document image is modified, when the print position information is modified. With this configuration, when the program is read by the computer and, in accordance with the read program, the computer executes a process, the same function and advantageous effects as in the case of the image processing device of the fortieth aspect are obtained.

Fifty-second Aspect

In addition, the image processing program according to the fifty-second aspect may be configured so that, in the image processing program of any one of the forty-sixth to fifty-first aspects, when the print position information is modified, the print position information is modified so that the print position of the image is changed in the nozzle array direction of the print head. With this configuration, when the program is read by the computer and, in accordance with the read program, the computer executes a process, the same function and advantageous effects as in the case of the image processing device of the forty-first aspect are obtained.

Fifty-third Aspect

Moreover, the image processing program according to the fifty-third aspect may be configured so that, in the image processing program of any one of the forty-sixth to fifty-second aspects, when the printing image data include a document image and image information other than the document image, print position information of the image information other than the document image is modified prior to the document image, when the print position information is modified. With this configuration, when the program is read by the computer and, in accordance with the read program, the computer executes a process, the same function and advantageous effects as in the case of the image processing device of the forty-second aspect are obtained.

Fifty-fourth Aspect

Moreover, the image processing program according to the fifty-fourth aspect may be configured so that, in the image processing program of any one of the forty-sixth to fifty-third aspects, when the image is continuously printed on the multiple media, the print position information is modified in the printing image data in units of printing operation, that is, in units of printing operation on the single medium or in units of printing operation on the multiple media when the print position information is modified. With this configuration, when the program is read by the computer and, in accordance with the read program, the computer executes a process, the same function and advantageous effects as in the case of the image processing device of the forty-third aspect are obtained.

Fifty-Fifth Aspect

Further, the image processing program according to the fifty-fifth aspect may be configured so that, in the image processing program of any one of the forty-sixth to fifty-third aspects, when the image is continuously printed on the multiple media, the print position information in the printing image data corresponding to the multiple media is modified, when the print position information is modified, so that modification of the multiple media is performed over the multiple media by the amount of modification required for all or substantially all the nozzles that constitute the print head to form a predetermined number of dots at every predetermined print timing during a period when printing is continuously printed. With this configuration, when the program is read by the computer and, in accordance with the read program, the computer executes a process, the same function and advantageous effects as in the case of the image processing device of the forty-fourth aspect are obtained.

Fifty-sixth Aspect

Moreover, the image processing program according to the fifty-sixth aspect may be configured so that, in the image processing program of any one of the forty-sixth to fifty-fifth aspects, when the print position information is modified, image size of the printing image data is modified on the basis of the printing width of the print head and the print area width on the medium, and the print position information in the modified printing image data is modified. With this configuration, when the program is read by the computer and, in accordance with the read program, the computer executes a process, the same function and advantageous effects as in the case of the image processing device of the forty-fifth aspect are obtained.

Fifty-seventh Aspect

A fifty-seventh aspect of at least one embodiment of the invention provides a computer readable storage medium that stores the image processing program according to any one of the forty-sixth to fifty-sixth aspects. In this manner, it is possible to easily and reliably offer a consumer, such as a user, with the image processing program according to any one of the forty-sixth to fifty-sixth aspects through a computer readable storage medium, such as a CD-ROM, a DVD-ROM, an FD, or a semiconductor chip.

Fifty-Eighth Aspect

A fifty-eighth aspect of at least one embodiment of the invention provides an image processing method. The image processing method executes image processing on printing image data used in a printer including a print head having nozzles that are arranged in a plurality of lines and that form dots by discharging ink onto a medium used for printing. The printer prints out an image on the medium using the print head. The image processing method includes acquiring printing image data that include image information of the image and information regarding a print position of the image, executing N-level process to convert the printing image data that include image information having the number of addressable luminance levels M (M is natural number and M≧2) into printing image data that include image information having the number of addressable luminance levels N (N is natural number, and M≧N≧2), generating dot forming information, on the basis of the printing image data, that is information indicating a state of dots, formed by nozzles that constitute the print head, with respect to the printing image data, and modifying print position information, on the basis of the dot forming information, that is information regarding the print position in the printing image data so that all or substantially all the nozzles that constitute the print head form a predetermined number of dots or more at every predetermined print timing during a period when printing is continuously performed. In this manner, the same function and advantageous effects as those of the image processing device of the thirty-fifth aspect are obtained.

Fifty-ninth Aspect

Furthermore, the image processing method according to the fifty-ninth aspect may be configured so that, in the image processing method of the fifty-eighth aspect, the predetermined print timing is timing at which nozzles that constitute the print head do not produce clogging of ink. In this manner, the same function and advantageous effects as those of the image processing device of the thirty-sixth aspect are obtained.

Sixtieth Aspect

Furthermore, the image processing method according to the sixtieth aspect may be configured so that, in the image processing method of the fifty-eighth or fifty-ninth aspect, when the dot forming information is generated, the number of dots formed by the nozzles that constitute the print head is calculated on the basis of the printing image data on which rendering has been executed, and the dot forming information is generated on the basis of the calculated result. In this manner, the same function and advantageous effects as those of the image processing device of the thirty-seventh aspect are obtained.

Sixty-first Aspect

Moreover, the image processing method according to the sixty-first aspect may be configured so that, in the image processing method of any one of the fifty-eighth to sixtieth aspects, when the printing image data have image information having the number of addressable luminance levels N, coordinate position information of the dots, as the print position information, in the image information having the number of addressable luminance levels N is modified, when the print position information is modified. In this manner, the same function and advantageous effects as those of the image processing device of the thirty-eighth aspect are obtained.

Sixty-second Aspect

In addition, the image processing method according to the sixty-second aspect may be configured so that, in the image processing method of any one of the fifty-eighth to sixty-first aspects, when the printing image data include information of a document image, dot forming information of nozzles that print out character images of character string is generated among the nozzles used for printing for each character string that constitutes the document image when the dot forming information is generated, and the print position information for each character string is modified on the basis of the dot forming information of each character string, when the print position information is modified. In this manner, the same function and advantageous effects as those of the image processing device of the thirty-ninth aspect are obtained.

Sixty-third Aspect

Furthermore, the image processing method according to the sixty-third aspect may be configured so that, in the image processing method of any one of the fifty-eighth to sixty-second aspects, when the printing image data include information of a document image, at least one of coordinate position information, size information and character spacing information, as the print position information, of character images that constitute the document image is modified, when the print position information is modified. In this manner, the same function and advantageous effects as those of the image processing device of the fortieth aspect are obtained.

Sixty-fourth Aspect

In addition, the image processing method according to the sixty-fourth aspect may be configured so that, in the image processing method of any one of the fifty-eighth to sixty-third aspects, when the print position information is modified, the print position information is modified so that the print position of the image is changed in the nozzle array direction of the print head. In this manner, the same function and advantageous effects as those of the image processing device of the forty-first aspect are obtained.

Sixty-Fifth Aspect

Moreover, the image processing method according to the sixty-fifth aspect may be configured so that, in the image processing method of any one of the fifty-eighth to sixty-fourth aspects, when the printing image data include a document image and image information other than the document image, print position information of the image information other than the document image is modified prior to the document image, when the print position information is modified. In this manner, the same function and advantageous effects as those of the image processing device of the forty-second aspect are obtained.

Sixty-sixth Aspect

Moreover, the image processing method according to the sixty-sixth aspect may be configured so that, in the image processing method of any one of the fifty-eighth to sixty-fifth aspects, when the image is continuously printed on the multiple media, the print position information is modified in the printing image data in units of printing operation, that is, in units of printing operation on the single medium or in units of printing operation on the multiple media, when the print position information is modified. In this manner, the same function and advantageous effects as those of the image processing device of the forty-third aspect are obtained.

Sixty-seventh Aspect

Further, the image processing method according to the sixty-seventh aspect may be configured so that, in the image processing method of any one of the fifty-eighth to sixty-fifth aspects, when the image is continuously printed on the multiple media, the print position information in the printing image data corresponding to the multiple media is modified, when the print position information is modified, so that modification of the multiple media is performed over the multiple media by the amount of modification required for all or substantially all the nozzles that constitute the print head to form a predetermined number of dots at every predetermined print timing during a period when printing is continuously printed. In this manner, the same function and advantageous effects as those of the image processing device of the forty-fourth aspect are obtained.

Sixty-eighth Aspect

Moreover, the image processing method according to the sixty-eighth aspect may be configured so that, in the image processing method of any one of the fifty-eighth to sixty-seventh aspects, when the print position information is modified, image size of the printing image data is modified on the basis of the printing width of the print head and the print area width on the medium, and the print position information in the modified printing image data is modified. In this manner, the same function and advantageous effects as those of the image processing device of the thirty-fifth aspect are obtained.

BRIEF DESCRIPTION OF THE DRAWINGS

The invention will be described with reference to the accompanying drawings, wherein like numbers reference like elements.

FIG. 9 is a flowchart that shows a print position information modification process executed in the print position information modification unit.

FIG. 16A is a view that shows a printed result of original printing image data. FIG. 16B and FIG. 16C are views that show a printed result after the print position information of FIG. 16A is modified.

FIG. 18A and FIG. 18B are views that illustrate a print position modification method for a document image.

FIG. 20 is a view that shows printed results before and after a modification process is executed to shift a start position of each line in a document image.

FIG. 24C is a view that shows the result of total of the projection information shown in FIG. 25A and FIG. 25B in each nozzle.

FIG. 34A to FIG. 34C are views that illustrate a reduction process of an image when BiCubic method is used.

DESCRIPTION OF EXEMPLARY EMBODIMENTS

Figure 1:
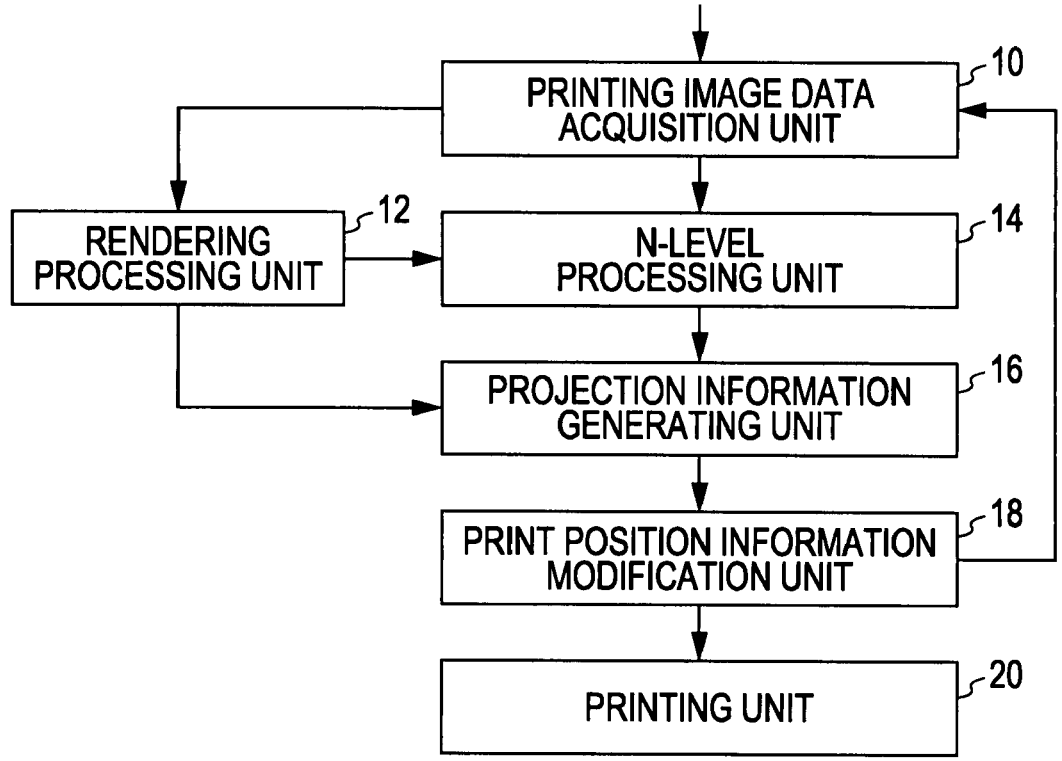
FIG. 1 is a block diagram that shows the configuration of a printer according to an embodiment of the invention.

Hereinafter, an embodiment of the invention will be described with reference to the accompanying drawings. FIG. 1 to FIG. 34 are views that show an embodiment of a printer, a printer control program, a printer control method, an image processing device, an image processing program, an image processing method, and a storage medium that stores the program, according to the invention. First, the configuration of the printer according to the embodiment of the invention will be described with reference to FIG. 1. FIG. 1 is a block diagram that shows the configuration of the printer 100 according to the embodiment of the invention.

As shown in FIG. 1, the printer 100 includes a printing image data acquisition unit 10, a rendering processing unit 12, an N-level processing unit 14, a projection information generating unit 16, a print position information modification unit 18, and a printing unit 20. The printing image data acquisition unit 10 acquires printing image data. The rendering processing unit 12 executes rendering process on the printing image data that include image information generated through page description language, or the like. The N-level processing unit 14 executes N-level process on the printing image data. The projection information generating unit 16 generates projection information on the basis of the printing image data on which the N-level process has been executed. The print position information modification unit 18 modifies information of a print position (hereinafter, referred to as print position information) of an image corresponding to the printing image data on the basis of the projection information. The printing unit 20 prints out an image on the basis of the printing image data on which the N-level processing has been executed.

The printing image data acquisition unit 10 is configured to provide a function to acquire printing image data that include the image information and print setting information of a printing image, transmitted from a printing instruction device (not shown), such as a personal computer (PC) or a printer server, connected to the printer 100, through a network, and a function to acquire printing image data transmitted from the print position information modification unit 18. Furthermore, the printing image data acquisition unit 10 is also configured to provide a function to determine whether rendering process needs to be executed on the acquired printing image data, and, when the image data are such document image data that need rendering processing, outputs the image data to the rendering processing unit 12 and, when the image data are such bitmap data that do not need rendering processing, outputs the image data to the N-level processing unit 14.

Here, the image information, when it is a document image, includes information of the font type of characters and palette in addition to information, such as coordinates of characters, size of characters, and character spacing. A normal image (an image other than a document image) includes pixel luminance information and pixel coordinates information. In addition, the print setting information includes information regarding print setting, such as the number of copies, pages, print paper size, and layout printing. The rendering processing unit 12 is configured to provide a function to make a picture (bitmap image) through calculation (hereinafter, this process is termed as rendering process) on information regarding an object or a graphic image, given as numeric data, when the image information included in the printing image data is document image data that are created using page description language, such as PostScript.

Note that, when the image information included in the printing image data is already bitmap image data or image data on which N-level process (halftone process) has been executed, no rendering process is required. When the image information included in the printing image data is data represented by the number of addressable luminance levels M (for example, CMYK data having 256 addressable luminance levels), the N-level processing unit 14 is configured to provide a function to execute N-level process in which the image information having the number of addressable luminance levels M is converted into image information having the number of addressable luminance levels N. Here, the N-level process is executed through a known method, such as a method using dither matrix or an error diffusion method.

The projection information generating unit 16 is configured to provide a function to, on the basis of the image information on which N-level process has been executed and which is included in the printing image data, count the number of dots in each image line and generate projection information on the basis of the counted result. Here, the projection information is information that indicates the total number of dots in each image line in a print target image. From the projection information, the number of dots to be formed by each nozzle may be obtained.

The print position information modification unit 18 is configured to provide a function to change information regarding a print position in printing image data so that, on the basis of the projection information and the print setting information, for printing image data with which multiple pages or multiple copies are printed, all (or most possible number of) the nozzles of the print head 200, which will be described later, form a prescribed number of dots in every predetermined period of time.

Specifically, when printing is performed in units of page or in units of copy, information regarding a print position in the printing image data (information of a coordinate position of an image, or the like) is changed so that all the nozzles of the print head 200 form a prescribed number of dots. Moreover, the print position information modification unit 18 is configured to provide a function to execute a process to reduce the print area width on image information of the printing image data on the basis of information of printing width of the print head 200, which will be described later, and printing image data, when the print area width is greater than the printing width. Thus, the printer 100 has information regarding the printing width of the print head 200 in a storage device 70, or the like.

Furthermore, in the present embodiment, the print position information modification unit 18, when document image data include both character images and an image other then character images (hereinafter, termed as graphic image), is able to set a modification mode 1 in which modification of print position information of a graphic image has priority, a modification mode 2 in which modification of print position information of character images has priority, and a modification mode 3 in which modification of print position information of a graphic image is prohibited.

In addition, in the present embodiment, the print position information modification unit 18, when the printing image data are document image data, executes a process to modify the print position information using first to fourth print position information modification methods. Further, the first to fourth print position information modification methods have priority in order of the first to fourth methods. That is, the first print position information modification method has the highest priority, and the fourth print position information modification method has the lowest priority. On the basis of this priority level, the process to modify print position information is executed using respective methods in order from the method having a higher priority to the method having a lower priority.

Here, the first print position information modification method is a method in which, in every line (character string) in which Chinese character is present at the head, the start position of the line is shifted in a direction that is the same direction as the nozzle array direction. In addition, the second print position information modification method is a method in which print position information is modified so as to increase character size of the entire document image. Moreover, the third print position information modification method is a method in which, in every line (character string) of a document image, in which the number of characters is a setting number or below, print position information is modified so as to increase character spacing. Furthermore, the fourth print position information modification method is a method in which print position information is modified so as to line feed immediately before the last one character (preceding line feed) in every line (character string) in which the number of Chinese characters is a setting number or above and also to adjust character spacing between the current line and the next line.

Figure 3:
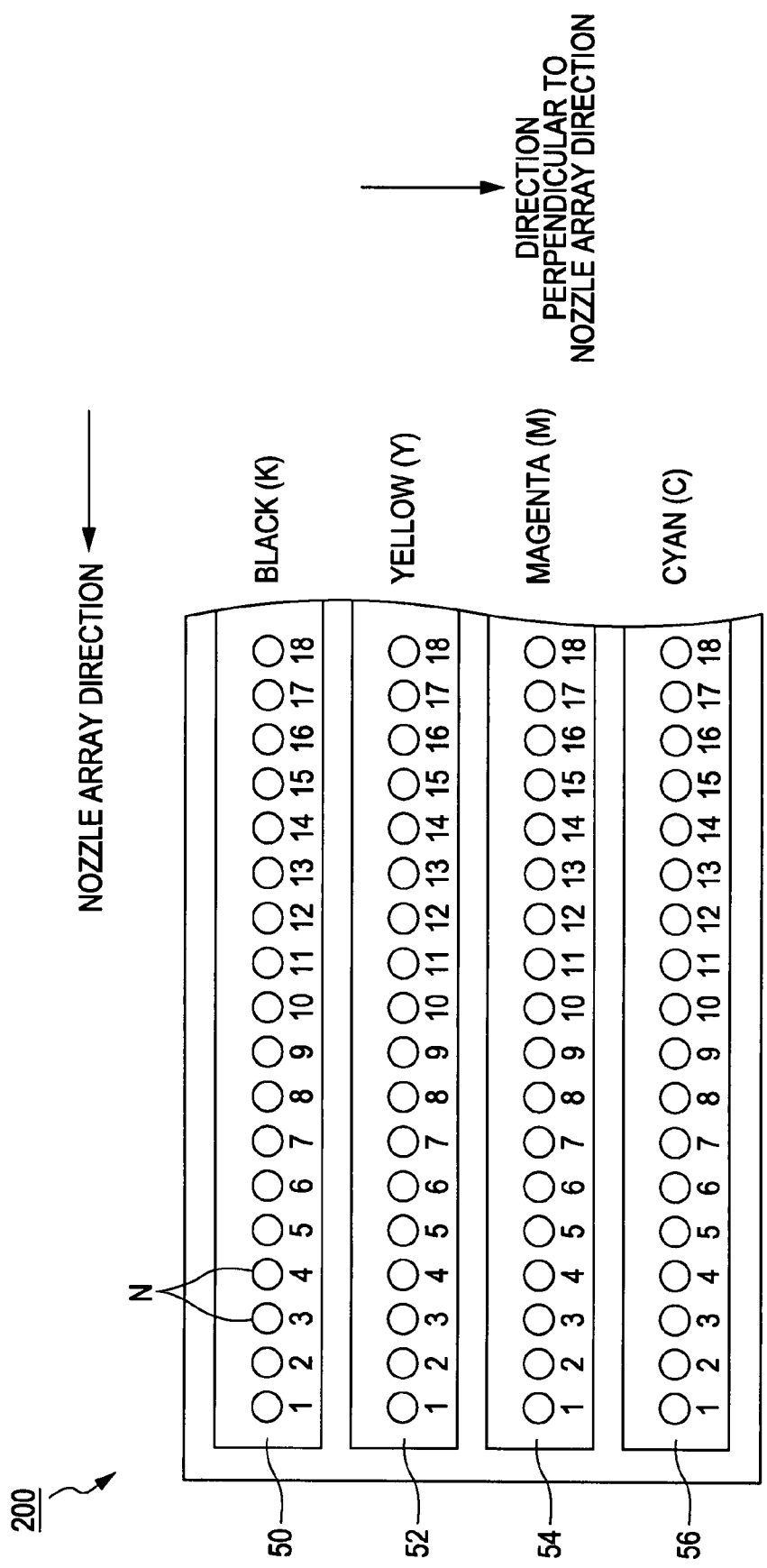
FIG. 3 is a partially enlarged bottom view that shows the structure of a print head.

Also, in the present embodiment, the print position information modification unit 18 executes modification of print position information on the graphic image so that the entire image is shifted in the nozzle array direction. For example, coordinate information of each pixel is modified in conformity with the arrangement of nozzles or the entire graphic image is enlarged. Here, the print head 200 applied to the aspect of the invention will be described. FIG. 3 is a partially enlarged bottom view that shows the structure of the print head 200.

As shown in FIG. 3, the print head 200 has a longitudinal structure extending in a paper width direction of print paper used in a so-called line head ink jet printer. The print head 200 is formed so that four nozzle modules 50, 52, 54, 56 are integrally arranged so as to form multi-lines and overlap in a print direction (a direction perpendicular to the nozzle array direction; strictly speaking, a dot print direction of nozzles). The black nozzle module 50 includes a plurality of nozzles N (eighteen in the drawing) that exclusively discharge black (K) ink and are arranged in a straight line. The yellow nozzle module 52 includes a plurality of nozzles N that exclusively discharge yellow (Y) ink and are arranged in a straight line along the same direction. The magenta nozzle module 54 includes a plurality of nozzles N that exclusively discharge magenta (M) ink and are arranged in a straight line along the same direction. The cyan nozzle module 56 includes a plurality of nozzles N that exclusively discharge cyan (C) ink and are arranged in a straight line along the same direction. Note that, when a print head is designed for monochrome printing, only black (K) may be used, or, when a print head is designed for an image with high image quality, six color ink or seven color ink that further includes light magenta, light cyan, or the like, may be used.

In addition, the above configured print head 200 prints circular dots on a white print sheet of paper by discharging ink, which is supplied into ink chambers (not shown) that are respectively provided for nozzles N1, N2, N3, through the nozzles N1, N2, N3, . . . , using piezoelectric elements, such as piezoactuators (not shown), which are provided for the respective ink chambers. Moreover, the nozzle N1, N2, N3, . . . , of the print head 200 are able to print dots having different sizes by adjusting the amount of ink discharged from the ink chambers by controlling electric voltage applied to the piezoelectric elements among multiple levels.

Referring back to FIG. 1, the printing unit 20 is an ink jet printer such that a predetermined image formed of multiple dots is formed by a single scanning operation over a medium (hereinafter, referred to as printing medium) used for printing by ejecting dot-like ink droplets from the nozzle modules 50, 52, 54, 56, which are formed in the print head 200, while moving either the medium (for example, print paper, or the like) used for printing or the print head 200 or both. In addition to the above described print head 200, the printing unit 20 further includes a print head feeding mechanism (in the case of multi-pass type) (not shown) that reciprocally moves the print head 200 above a printing medium in the width direction of the printing medium, a paper feed mechanism (not shown) used for moving the printing medium, a print controller mechanism (not shown) that controls ink discharged from the print head 200 on the basis of the print data, and the like.

Figure 2:
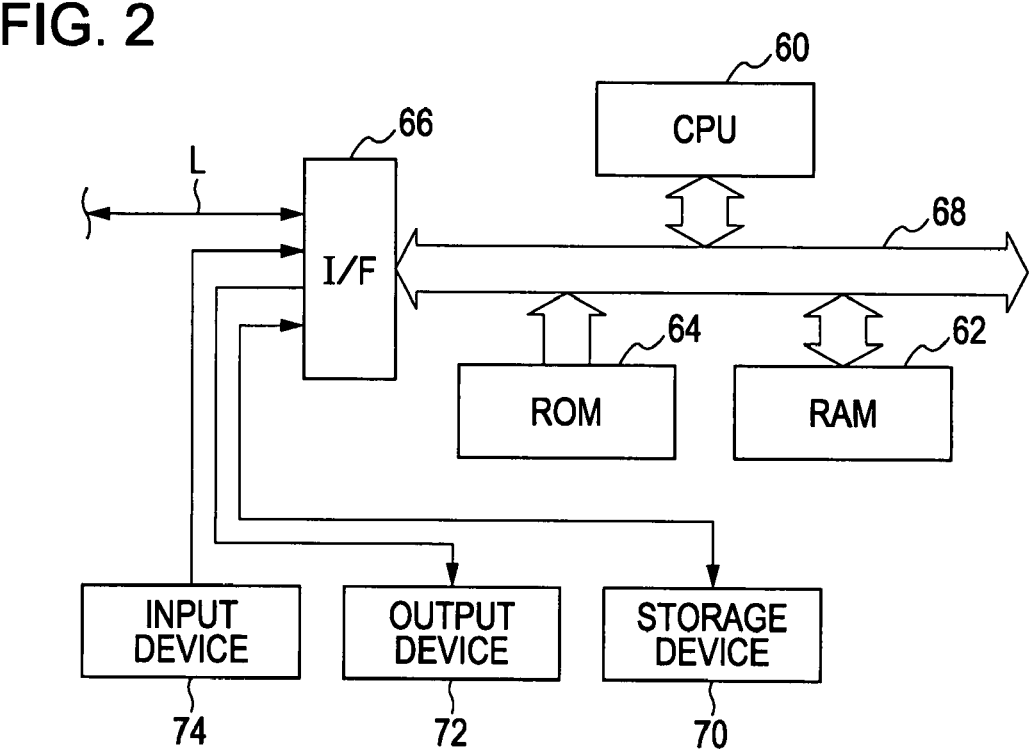
FIG. 2 is a hardware configuration view of the printer according to the embodiment of the invention.

Furthermore, the printer 100 is provided with a computer system for implementing various controls for printing, the printing image data acquisition unit 10, the rendering processing unit 12, the N-level processing unit 14, the projection information generating unit 16, the print position information modification unit 18, the printing unit 20, and the like, on computer software. As shown in FIG. 2, the hardware configuration of the printer 100 connects, using various internal and external buses 68 formed of a PCI (Peripheral Component Interconnect) bus, and the like, a CPU (Central Processing Unit) 60 that executes various controls and processes for printing, a RAM (Random Access Memory) 62 that constitutes a main storage device (Main Storage), a ROM (Read Only Memory) 64 that is a read only storage device. The hardware configuration also connects an external storage device (Secondary Storage) 70, such as HDD (Hard Disk Drive), an output device 72, such as the printing unit 20, a CRT, or an LCD monitor, an input device 74, such as an operation panel, a mouse, a keyboard, or a scanner, and a network L for communication with a printing instruction device (not shown), or the like, through an input/output interface (I/F) 66 to the buses 68.

Then, when the power is turned on, a system program of BIOS, or the like, stored in the ROM 64, or the like, loads various exclusive computer programs, which are stored in the ROM 64 in advance, onto the RAM 62. In accordance with the instructions described in the programs loaded onto the RAM 62, the CPU 60 uses various resources to execute predetermined control and process, thus implementing the above described functions through the software.

Note that the various exclusive computer programs are not limited to the ones stored in the ROM 64; the programs may be the ones installed in the storage device 70 through a storage medium, such as a CD-ROM, a DVD-ROM, a flexible disk (FD), or may be the ones that are installed in the storage device 70 through a communication network, such as internet, and then loaded onto the RAM 62. Next, the flow of a printing process in the above configured printer 100 will be described with reference to FIG. 4. Here, FIG. 4 is a flowchart that shows a printing process executed in the printer 100.

Figure 4:
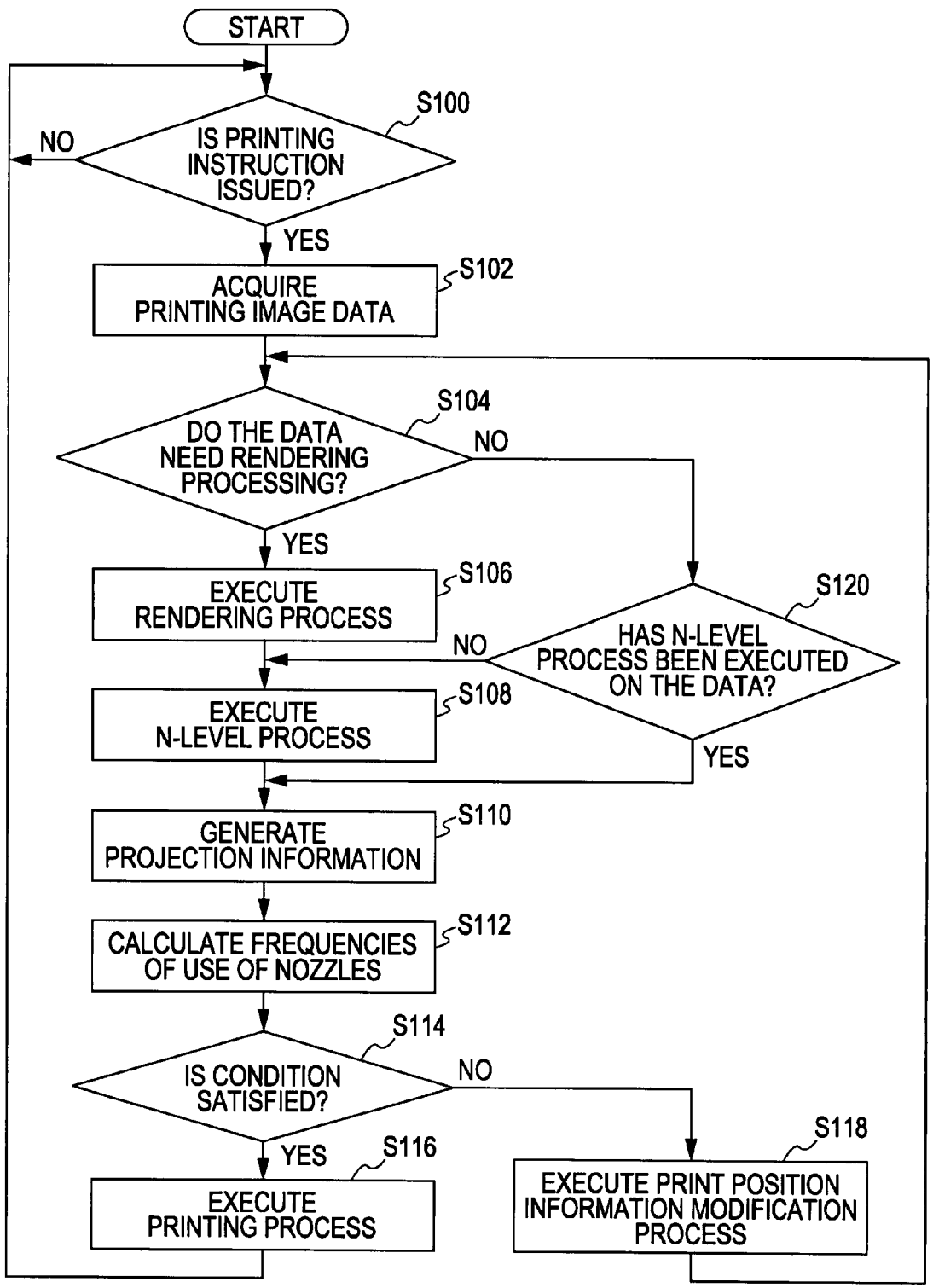
FIG. 4 is a flowchart that shows a printing process executed in the printer.

The printing process, as shown in FIG. 4, first proceeds to step S100, and the printing image data acquisition unit 10 determines whether a printing instruction is issued from a printing instruction terminal, or the like (not shown), such as a personal computer. When it is determined that a printing instruction is issued (Yes), the process proceeds to step S102. When a negative determination is made (No), the process repeats a determination process until a printing instruction is issued. When the process proceeds to step S102, the printing image data acquisition unit 10 acquires printing image data that are sent together with a printing instruction from the printing instruction terminal or printing image data sent from the print position information modification unit 18, and then the process proceeds to step S104.

In step S104, the printing image data acquisition unit 10 determines whether rendering process needs to be executed on the printing image data on the basis of image information and print setting information, which are included in the printing image data acquired in step S102. When it is determined that the rendering process needs to be executed (Yes), the process proceeds to step S106. When a negative determination is made (No), the process proceeds to step S124.

When the process proceeds to step S106, the rendering processing unit 12 executes rendering process on the printing image data that need rendering processing (for example, the printing image data that include document image information, which is created using page description language) to produce image data, and the process proceeds to step S108. Hereinafter, the image information (data), which is obtained after rendering has been executed on the printing image data including the document image information created by page description language, is termed as document image data.

In step S108, the N-level processing unit 14 executes N-level process on the image information (document image data, or image data other than the document image data) having the number of addressable luminance levels M included in the printing image data, and then the process proceeds to step S110. For example, using dither matrix stored in the storage device 70, the image data having the number of addressable luminance levels M are converted into image data having the number of addressable luminance levels N. In step S110, the projection information generating unit 16 generates projection information on the basis of the printing image data on which N-level processing has been executed, and outputs the generated projection information to the print position information modification unit 18. Then, the process proceeds to step S112.

In step S112, the print position information modification unit 18 calculates the frequency of use of each nozzle (hereinafter, referred to as frequency of nozzle usage) of the print head 200 on the basis of the projection information, and then the process proceeds to step S114. In step S114, the print position information modification unit 18 determines whether the frequencies of use of all nozzles satisfy a condition on the basis of the frequencies of nozzle usage that are calculated in step S112. When it is determined that the condition is satisfied (Yes), the printing image data, on which the N-level process has been executed, that satisfy the condition are output to the printing unit 20 and then the process proceeds to step S116. When a negative determination is made (No), the process proceeds to step S118.

When the process proceeds to step S116, the printing unit 20 drives the print head 200 to print out an image corresponding to the printing image data on a printing medium on the basis of the printing image data on which N-level process has been executed, and then the process proceeds to step S100. On the other hand, when the process proceeds to step S118, the print position information modification unit 18 executes modification process on print position information and generates printing image data of which the print position information is modified. Then, the print position information modification unit 18 outputs the generated printing image data to the printing image data acquisition unit 10, and then the process proceeds to step S104.

Furthermore, in step S104, when it is determined that no rendering process is required for the printing image data (for example, bitmap data) and the process has proceeded to step S120, the N-level processing unit 14 determines whether N-level process has been executed on the printing image data. When it is determined that the N-level process has been executed on the data (Yes), the process proceeds to step S110. When a negative determination is made (No), the process proceeds to step S108.

Figure 5:
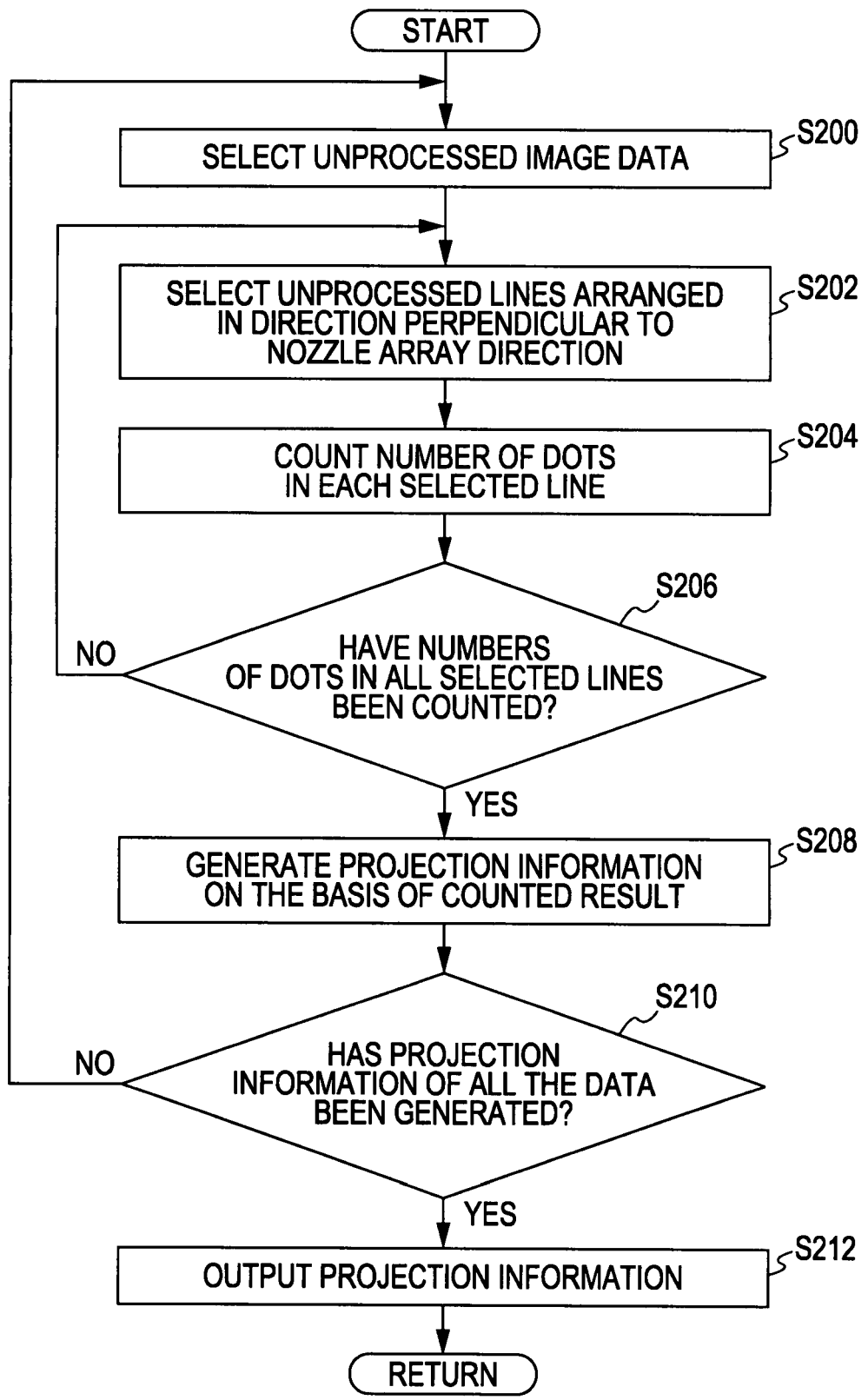
FIG. 5 is a flowchart that shows a projection information generating process executed in a projection information generating unit.

Next, the flow of a projection information generating process executed in step S110 will be described with reference to FIG. 5. Here, FIG. 5 is a flowchart that shows a projection information generating process executed in the projection information generating unit 16. In step S110, as the projection information generating process is executed, as shown in FIG. 5, the process first proceeds to step S200. The projection information generating unit 16 selects image data, on which projection information has not been generated, from the printing image data on which the N-level process has been executed, and then the process proceeds to step S202. For example, when the data are document image data, unprocessed one page image data are selected.

In step S202, the projection information generating unit 16 selects unprocessed image lines arranged in a direction perpendicular to the nozzle array direction from the image data selected in step S200, and then the process proceeds to step S204. In step S204, the projection information generating unit 16 counts the number of dots in the image line selected in step S202 and stores information regarding the counted number of dots in the RAM 62 or the storage device 70 in correspondence with the image lines, and then the process proceeds to step S206. For example, the information is stored in correspondence with line numbers of the image lines.

In step S206, the projection information generating unit 16 determines whether the numbers of dots in all image lines in the image data selected in step S200 have been counted. When it is determined that the numbers of dots in all image lines have been counted (Yes), the process proceeds to step S208. When a negative determination is made (No), the process proceeds to step S202. When the process proceeds to step S208, the projection information generating unit 16 generates projection information on the basis of the counted number of dots in each image line of the counted image data and stores the generated projection information in the RAM 62 or the storage device 70, and then the process proceeds to step S210.

In step S210, the projection information generating unit 16 determines whether projection information of all the image data in the printing image data has been generated. When it is determined that the projection information of all the image data has been generated (Yes), the process proceeds to step S212. When a negative determination is made (No), the process proceeds to step S200. When the process proceeds to step S212, the projection information generating unit 16 outputs all the projection information generated for the printing image data to the print position information modification unit 18, and then a series of processes ends and the process returns to the original process.

Figure 6:
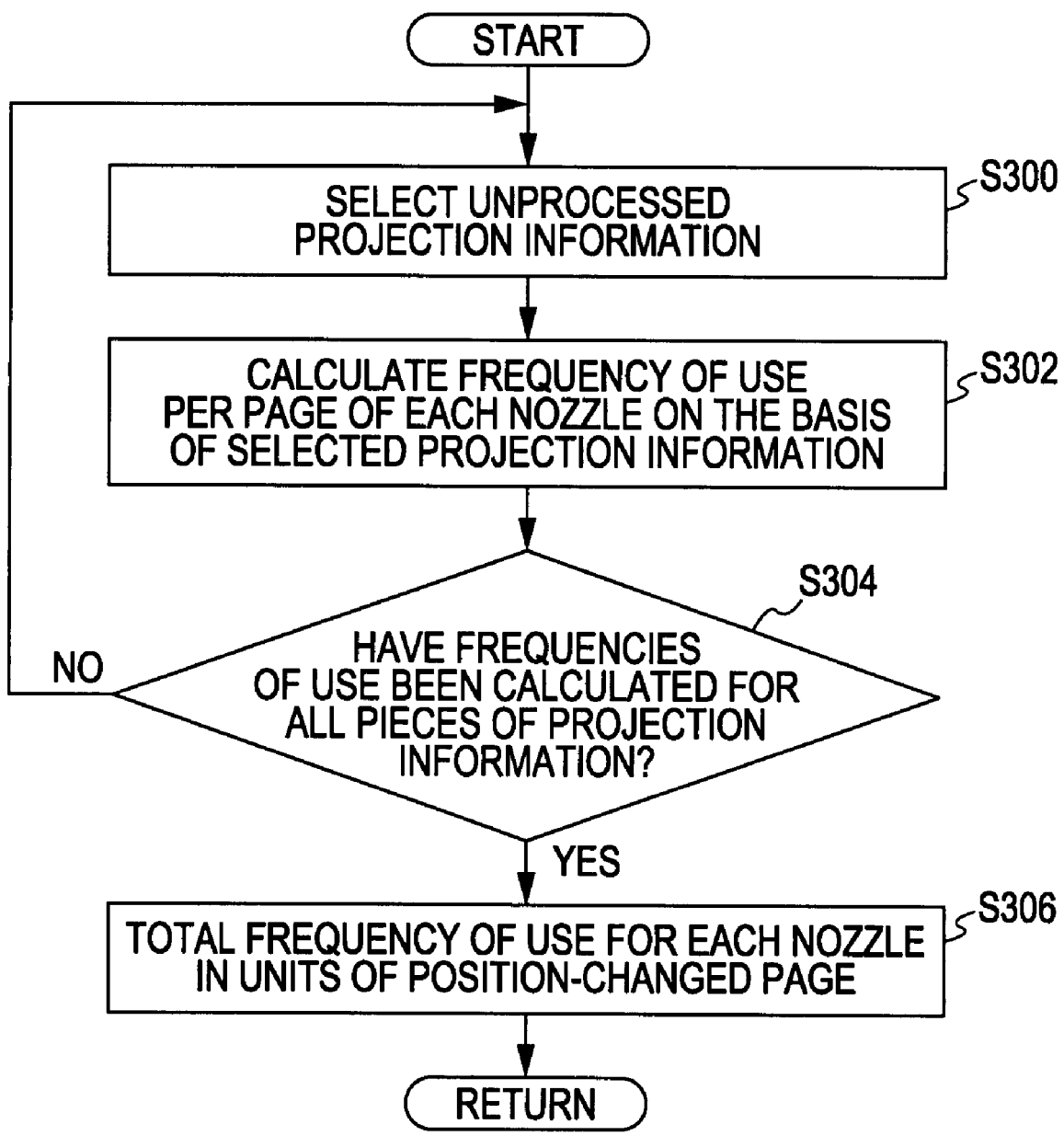
FIG. 6 is a flowchart that shows a calculation process of the frequency of use of nozzles, executed in a print position information modification unit.

Next, the flow of a calculation process of the frequency of nozzle usage, executed in step S112, will be described with reference to FIG. 6. Here, FIG. 6 is a flowchart that shows a calculation process of the frequency of nozzle usage, executed in the print position information modification unit 18. In step S112, as the calculation process of the frequency of nozzle usage is executed, as shown in FIG. 6, the process first proceeds to step S300. The print position information modification unit 18 selects the projection information, on which the calculation process of the frequency of nozzle usage is not executed, from the projection information generated for the processing target printing image data, and then the process proceeds to step S302.

In step S302, the print position information modification unit 18 calculates the number of dots formed by each nozzle in units of page on the basis of the projection information selected in step S300 and the information of each nozzle of the print head 200, and then the process proceeds to step S304. In step S304, the print position information modification unit 18 determines whether the calculation process of the frequency of nozzle usage has been executed on all pieces of projection information for the processing target printing image data. When it is determined that the calculation process of the frequency of nozzle usage has been executed (Yes), the process proceeds to step S306. When a negative determination is made (No), the process proceeds to step S300.

When the process proceeds to step S306, the print position information modification unit 18 totals the number of dots formed in each nozzle in units of position changing pages, and calculates the frequency of use of each nozzle in units of position changing pages in the processing target printing image data, and then a series of processes ends and the process returns to the original process. However, before modification of print position information, the process is executed by setting the units of position changing pages to one page.

Here, the units of position changing pages is a unit of number of pages by which all the nozzles form a prescribed number of dots in a predetermined period of time. For example, when the units of position changing pages is two pages, it means that the modification process of position changing information is executed so that a prescribed number of dots are formed by all the nozzles in a predetermined period of time by printing two pages. Next, the flow of a condition determination process executed in step S114 will be described with reference to FIG. 7. Here, FIG. 7 is a flowchart that shows a condition determination process executed in the print position information modification unit 18.

Figures 7, 7A:
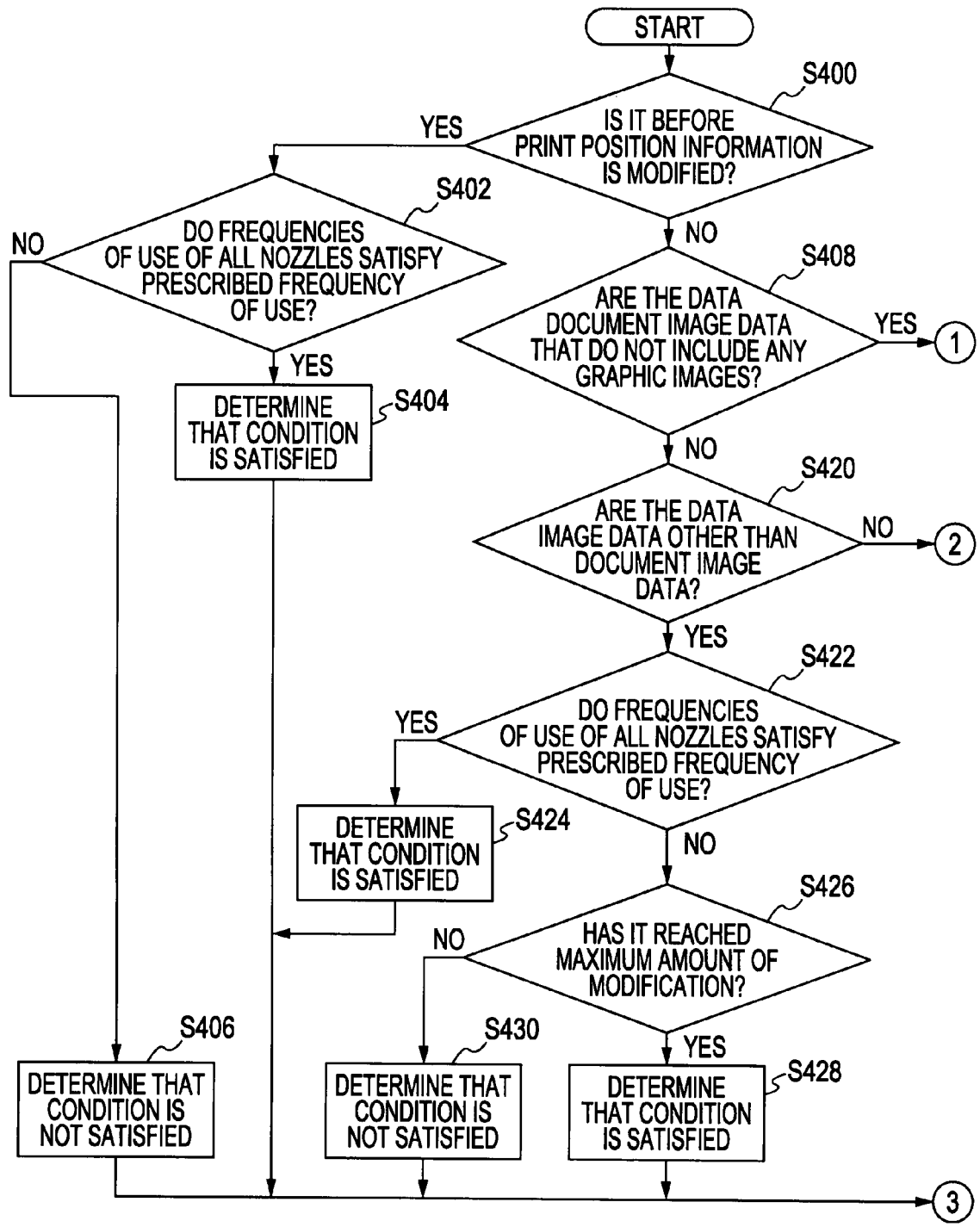
FIG. 7 is a flowchart that shows a condition determination process executed in the print position information modification unit.
Figure 7B:
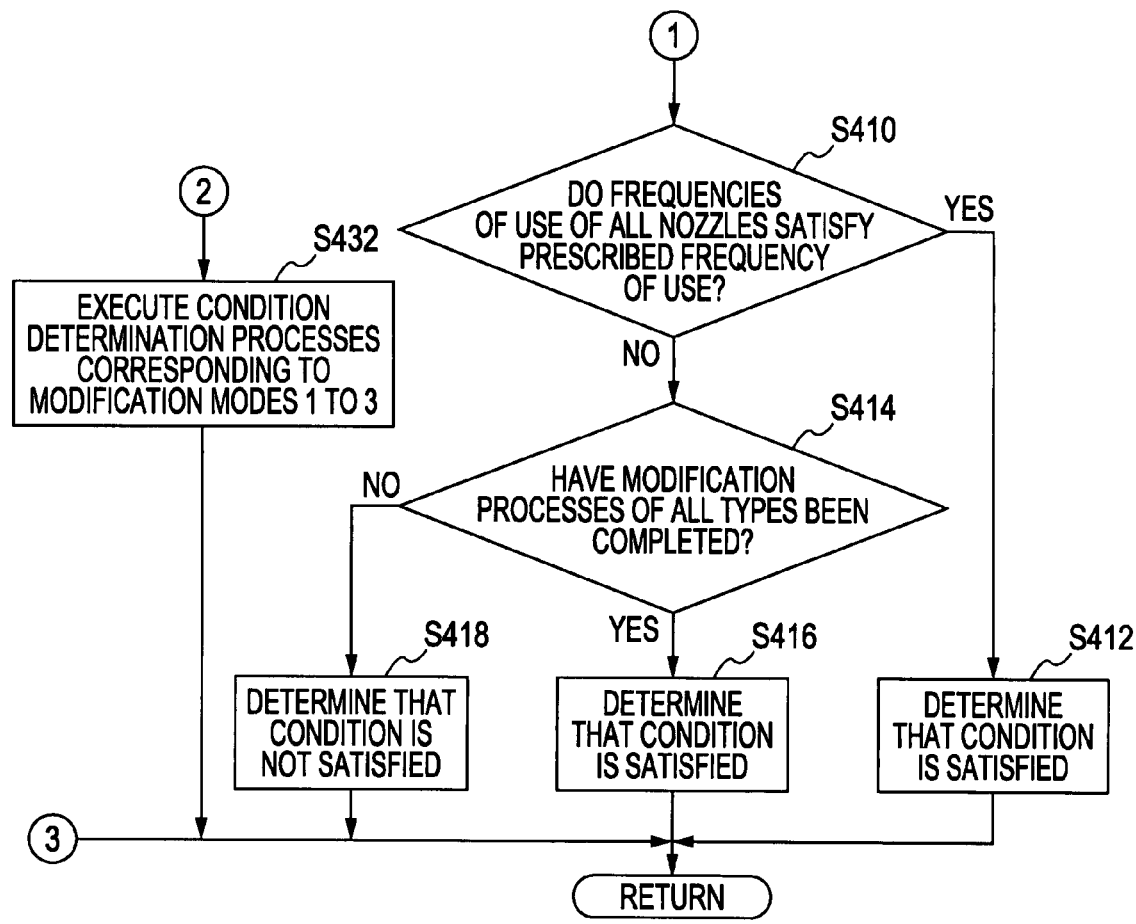

In step S114, as the condition determination process is executed, as shown in FIG. 7, the process first proceeds to step S400. The print position information modification unit 18 determines whether the processing target printing image data are data before modification of print position information. When it is determined that the printing image data are data before modification (Yes), the process proceeds to step S402. When a negative determination is made (No), the process proceeds to step S408.

When the process proceeds to step S402, the print position information modification unit 18 determines whether the frequencies of use of all the nozzles in the print head 200 satisfy a prescribed frequency of use on the basis of the frequency of nozzle usage for the processing target printing image data. When the frequencies of use of all the nozzles satisfy the prescribed frequency of use (Yes), the process proceeds to step S404. When a negative determination is made (No), the process proceeds to step S406.

When the process proceeds to step S404, the print position information modification unit 18 determines that the condition is satisfied, and then a series of processes ends and the process returns to the original process. On the other hand, when the process proceeds to step S406, the print position information modification unit 18 determines that the condition is not satisfied, and then a series of processes ends and the process returns to the original process. In addition, in step S400, when the print position information has been modified and the process then proceeds to step S408, the print position information modification unit 18 determines whether the processing target printing image data are document image data that do not include a graphic image. When it is determined that the printing image data are document image data that do not include a graphic image (Yes), the process proceeds to step S410. When a negative determination is made (No), the process proceeds to step S420.

When the process proceeds to step S410, the print position information modification unit 18 determines whether the frequencies of use of all the nozzles in the print head 200 satisfy a prescribed frequency of use on the basis of the frequency of nozzle usage for the processing target printing image data. When the frequencies of use of all the nozzles satisfy the prescribed frequency of use (Yes), the process proceeds to step S412. When a negative determination is made (No), the process proceeds to step S414.

When the process proceeds to step S412, the print position information modification unit 18 determines that the condition is satisfied, and then a series of processes ends and the process returns to the original process. On the other hand, when the process proceeds to step S414, the print position information modification unit 18 determines whether modification processes of all types have been completed for character image data. When the modification processes have been completed (Yes), the process proceeds to step S416. When a negative determination is made (No), the process proceeds to step S418.

When the process proceeds to step S416, the print position information modification unit 18 determines that the condition is satisfied, and then a series of processes ends and the process returns to the original process. In addition, in step S408, when the processing target printing image data are not document image data that do not include a graphic image and the process then proceeds to step S420, the print position information modification unit 18 determines whether the processing target printing image data are image data other than document image data. When it is determined that the printing image data are image data other than document image data (Yes), the process proceeds to step S422. When a negative determination is made (No), the process proceeds to step S432.

When the process proceeds to step S422, the print position information modification unit 18 determines whether the frequencies of use of all the nozzles in the print head 200 satisfy a prescribed frequency of use on the basis of the frequency of nozzle usage for the processing target printing image data. When the frequencies of use of all the nozzles satisfy the prescribed frequency of use (Yes), the process proceeds to step S424. When a negative determination is made (No), the process proceeds to step S426.

When the process proceeds to step S424, the print position information modification unit 18 determines that the condition is satisfied, and then a series of processes ends and the process returns to the original process. On the other hand, when the process proceeds to step S426, the print position information modification unit 18 determines whether the amount of modification in print position of an image has reached the maximum amount of modification. When the amount of modification in print position has reached the maximum amount of modification (Yes), the process proceeds to step S428. When a negative determination is made (No), the process proceeds to step S430.

When the process proceeds to step S428, the print position information modification unit 18 determines that the condition is satisfied, and then a series of processes ends and the process returns to the original process. On the other hand, when the process proceeds to step S430, the print position information modification unit 18 determines that the condition is not satisfied, and then a series of processes ends and the process returns to the original process. In addition, in step S420, when the processing target printing image data are document image data that include a graphic image and the process then proceeds to step S432, the condition determination process corresponding to a setting mode from among the modification modes 1 to 3 is executed, and then a series of processes ends and the process returns to the original process.

Figures 8, 8A:
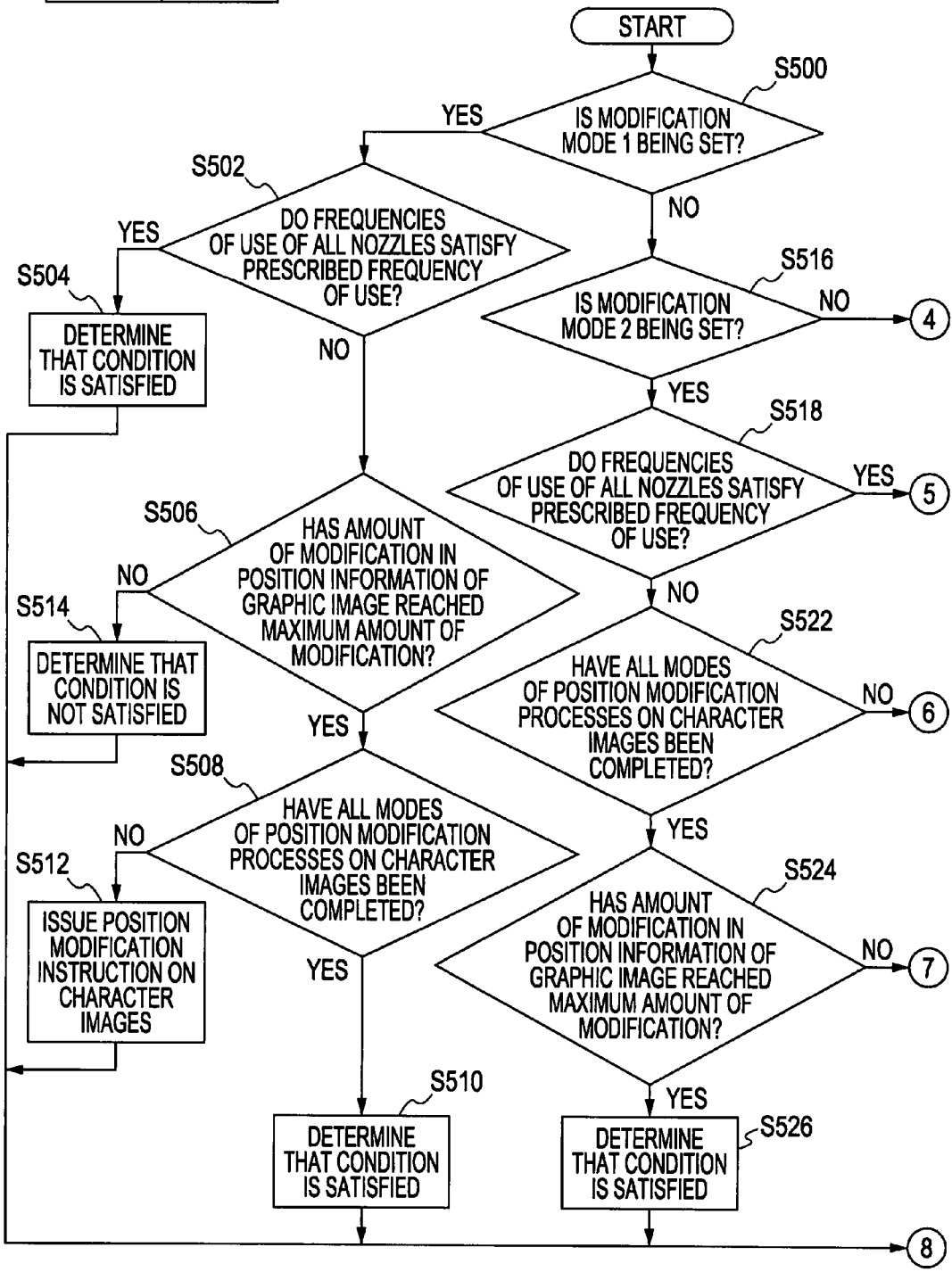
FIG. 8 is a flowchart that shows condition determination processes of modification modes 1 to 3, executed in the print position information modification unit.
Figure 8B:
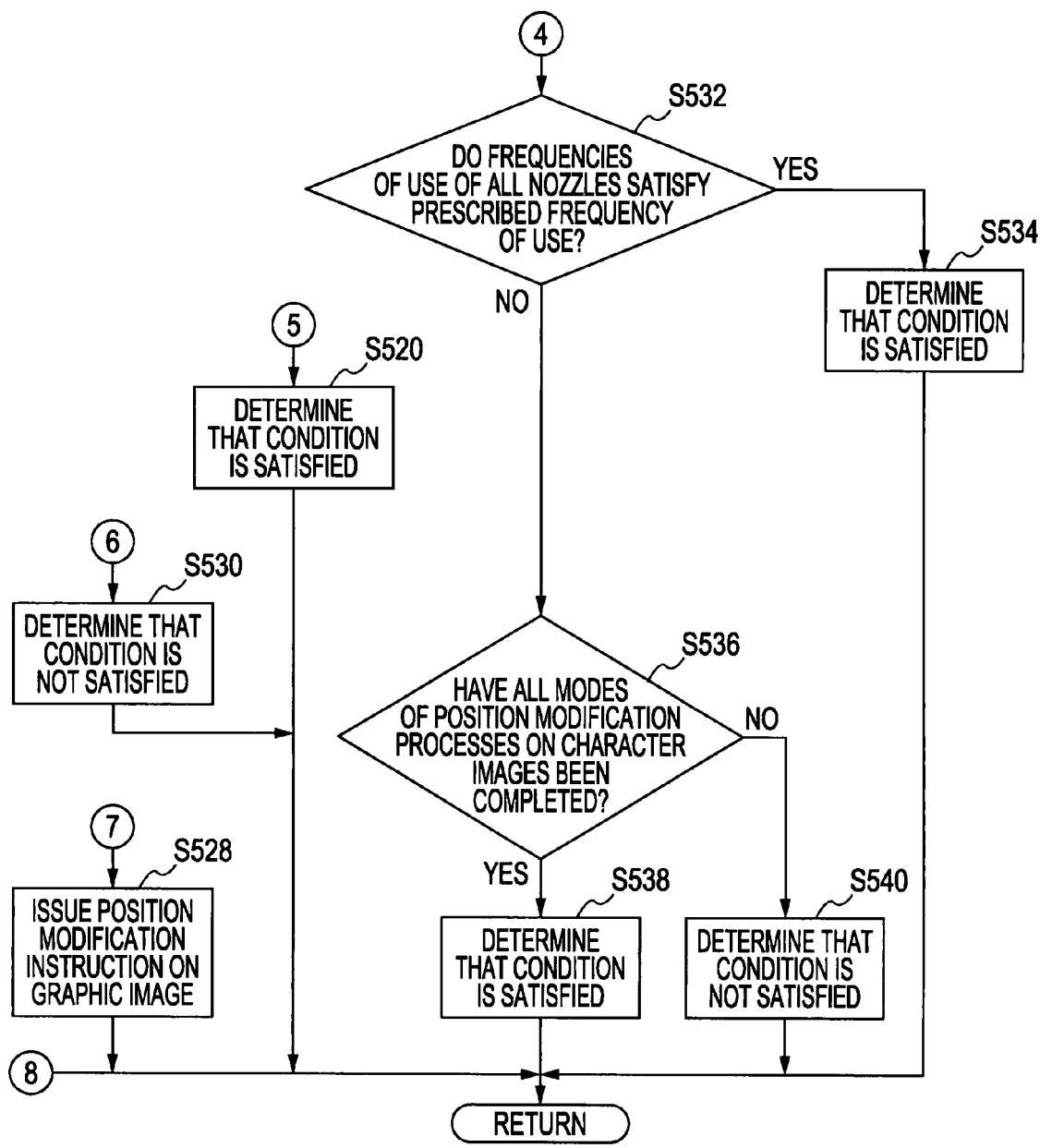

Next, the flow of condition determination processes of the modification modes 1 to 3, executed in step S432, will be described with reference to FIG. 8. Here, FIG. 8 is a flowchart that shows the condition determination processes of the modification modes 1 to 3, executed in the print position information modification unit 18. In step S432, as the condition determination process of any one of the modification modes 1 to 3 is executed, as shown in FIG. 8, the process first proceeds to step S500. The print position information modification unit 18 determines whether the modification mode 1 is set. When it is determined that the modification mode 1 is set (Yes), the process proceeds to step S502. When a negative determination is made (No), the process proceeds to step S514.

When the process proceeds to step S502, the print position information modification unit 18 determines whether the frequencies of use of all the nozzles in the print head 200 satisfy a prescribed frequency of use on the basis of the frequency of nozzle usage for the processing target printing image data. When the frequencies of use of all the nozzles satisfy the prescribed frequency of use (Yes), the process proceeds to step S504. When a negative determination is made (No), the process proceeds to step S506.

When the process proceeds to step S504, the print position information modification unit 18 determines that the condition is satisfied, and then a series of processes ends and the process returns to the original process. On the other hand, when the process proceeds to step S506, the print position information modification unit 18 determines whether the amount of modification in print position of a graphic image has reached the maximum amount of modification. When the amount of modification in print position has reached the maximum amount of modification (Yes), the process proceeds to step S508. When a negative determination is made (No), the process proceeds to step S514.

On the other hand, when the process proceeds to step S508, the print position information modification unit 18 determines whether modification processes of all types have been completed for character image data. When the modification processes have been completed (Yes), the process proceeds to step S510. When a negative determination is made (No), the process proceeds to step S512. When the process proceeds to step S510, the print position information modification unit 18 determines that the condition is satisfied, and then a series of processes ends and the process returns to the original process.

On the other hand, when the process proceeds to step S512, the print position information modification unit 18 determines that the condition is not satisfied and issues an instruction to modify print position information of the character image data, and then a series of processes ends and the process returns to the original process. In addition, in step S506, when the amount of modification in print position of a graphic image has not reached the maximum amount of modification and the process then proceeds to step S514, the print position information modification unit 18 determines that the condition is not satisfied, and then a series of processes ends and the process returns to the original process.

Furthermore, in step S500, when the modification mode 1 is not set and the process then proceeds to step S516, the print position information modification unit 18 determines whether the modification mode 2 is set. When it is determined that the modification mode 2 is set (Yes), the process proceeds to step S518. When a negative determination is made (No), the process proceeds to step S532. When the process proceeds to step S518, the print position information modification unit 18 determines whether the frequencies of use of all the nozzles in the print head 200 satisfy a prescribed frequency of use on the basis of the frequency of nozzle usage for the processing target printing image data. When the frequencies of use of all the nozzles satisfy the prescribed frequency of use (Yes), the process proceeds to step S520. When a negative determination is made (No), the process proceeds to step S522.

When the process proceeds to step S520, the print position information modification unit 18 determines that the condition is satisfied, and then a series of processes ends and the process returns to the original process. On the other hand, when the process proceeds to step S522, the print position information modification unit 18 determines whether modification processes of all types have been completed for character image data. When the modification processes have been completed (Yes), the process proceeds to step S524. When a negative determination is made (No), the process proceeds to step S526.

On the other hand, when the process proceeds to step S524, the print position information modification unit 18 determines whether the amount of modification in print position of a graphic image has reached the maximum amount of modification. When the amount of modification in print position has reached the maximum amount of modification (Yes), the process proceeds to step S526. When a negative determination is made (No), the process proceeds to step S528. When the process proceeds to step S526, the print position information modification unit 18 determines that the condition is satisfied, and then a series of processes ends and the process returns to the original process.

On the other hand, when the process proceeds to step S528, the print position information modification unit 18 determines that the condition is not satisfied and issues an instruction to modify print position information of the graphic image data, and then a series of processes ends and the process returns to the original process. In addition, in step S522, when the processes of all types to modify print position information of the character image data have not been completed and the process then proceeds to step S530, the print position information modification unit 18 determines that the condition is not satisfied, and then a series of processes ends and the process returns to the original process.

Furthermore, in step S516, when the modification mode 2 is not set and the process then proceeds to step S532, the print position information modification unit 18 determines whether the frequencies of use of all the nozzles in the print head 200 satisfy a prescribed frequency of use on the basis of the frequency of nozzle usage for the processing target printing image data. When the frequencies of use of all the nozzles satisfy the prescribed frequency of use (Yes), the process proceeds to step S534. When a negative determination is made (No), the process proceeds to step S536.

When the process proceeds to step S534, the print position information modification unit 18 determines that the condition is satisfied, and then a series of processes ends and the process returns to the original process. On the other hand, when the process proceeds to step S536, the print position information modification unit 18 determines whether modification processes of all types have been completed for character image data. When the modification processes have been completed (Yes), the process proceeds to step S538. When a negative determination is made (No), the process proceeds to step S540.

When the process proceeds to step S538, the print position information modification unit 18 determines that the condition is satisfied, and then a series of processes ends and the process returns to the original process. On the other hand, when the process proceeds to step S540, the print position information modification unit 18 determines that the condition is not satisfied, and then a series of processes ends and the process returns to the original process. Next, the flow of a print position information modification process executed in step S118 will be described with reference to FIG. 9. FIG. 9 is a flowchart that shows the print position information modification process executed in the print position information modification unit 18.

In step S118, as the print position information modification process is executed, as shown in FIG. 9, the process first proceeds to step S600. The print position information modification unit 18 determines whether the processing target printing image data are document image data. When it is determined that the processing target printing image data are document image data (Yes), the process proceeds to step S602. When a negative determination is made (No), the process proceeds to step S608.

When the process proceeds to step S602, the print position information modification unit 18 determines whether the processing target document image data include a graphic image. When it is determined that the document image data include a graphic image (Yes), the process proceeds to step S604. When a negative determination is made (No), the process proceeds to step S606. when the process then proceeds to step S604, the print position information modification unit 18 executes the process to modify print position information in the printing image data in accordance with a setting mode from among the modification modes 1 to 3, and then a series of processes ends and the process returns to the original process.

On the other hand, when the process proceeds to step S606, the print position information modification unit 18 selects an unprocessed modification processing method having the highest priority from among multiple types of print position information modification processing methods for character images and, in accordance with the selected modification processing method, modifies print position information in the printing image data, and then a series of processes ends and the process returns to the original process. Moreover, in step S600, when the processing target printing image data are not document image data and the process then proceeds to step S608, the print position information modification unit 18 modifies the position information of an image in the printing image data, and then a series of processes ends and the process returns to the original process.

Figure 10:
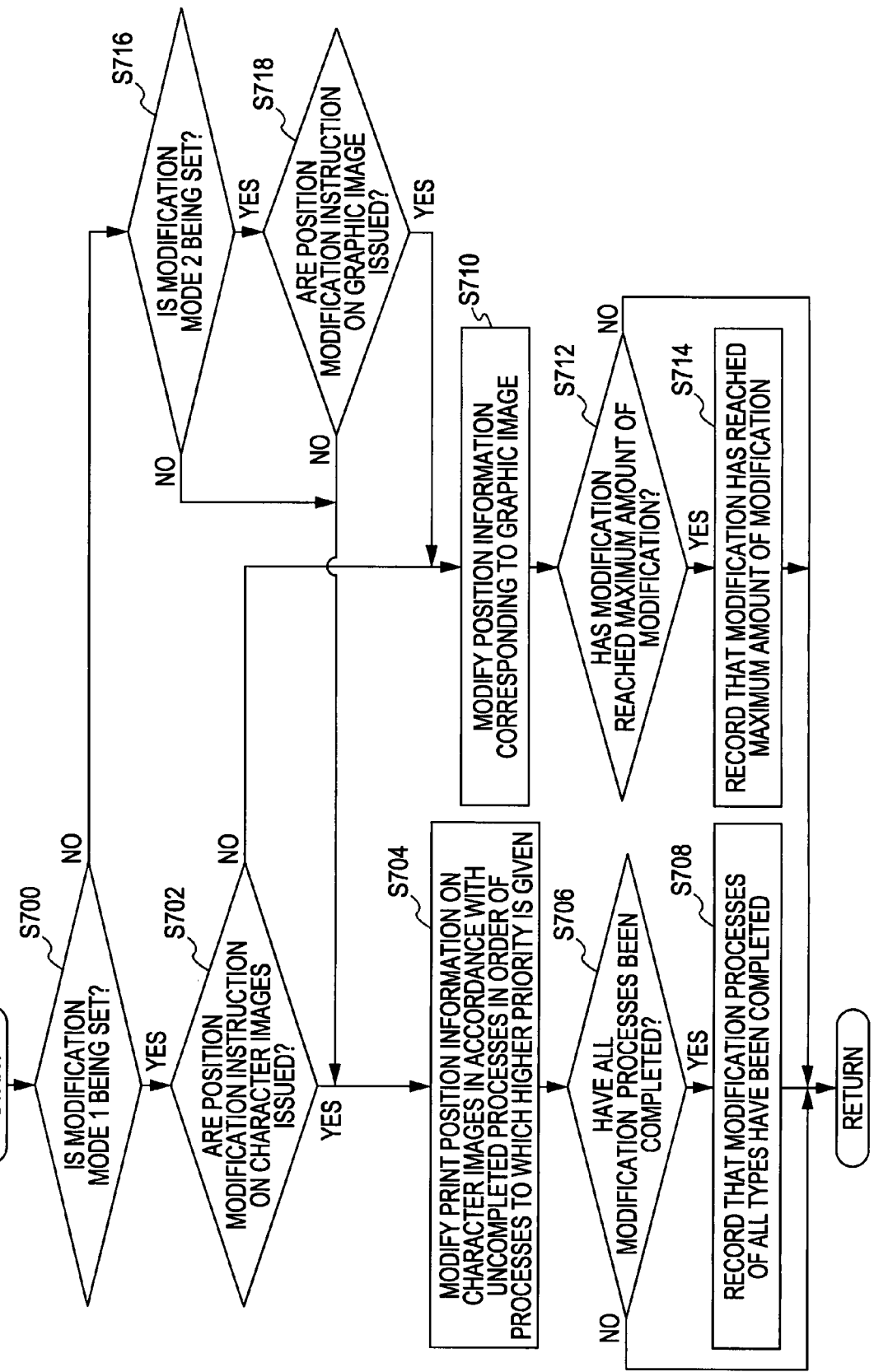
FIG. 10 is a flowchart that shows a print position information modification process in modification modes 1 to 3, executed in the print position information modification unit.

Next, the flow of print position information modification process in accordance with the modification modes 1 to 3, executed in step S604, will be described with reference to FIG. 10. FIG. 10 is a flowchart that shows the print position information modification process in the modification modes 1 to 3, executed in the print position information modification unit 18. In step S604, as the print position information modification process of any one of the modification modes 1 to 3 is executed, as shown in FIG. 10, the process first proceeds to step S700. The print position information modification unit 18 determines whether the modification mode 1 is set. When it is determined that the modification mode 1 is set (Yes), the process proceeds to step S702. When a negative determination is made (No), the process proceeds to step S716.

When the process proceeds to step S702, the print position information modification unit 18 determines whether an instruction to modify the print position information of character images is issued. When it is determined that the modification instruction is issued (Yes), the process proceeds to step S704. When a negative determination is made (No), the process proceeds to step S710. When the process proceeds to step S704, the print position information modification unit 18 selects an unprocessed modification processing method having the highest priority from among multiple types of print position information modification processing methods for character images and, in accordance with the selected modification processing method, modifies print position information in the printing image data, and then the process proceeds to step S706.

In step S706, the print position information modification unit 18 determines whether the print position information modification process through all types of modification processing methods has been completed. When the modification process has been completed (Yes), the process proceeds to step S708. When a negative determination is made (No), a series of processes ends and the process proceeds to the original process. When the process proceeds to step S708, the print position information modification unit 18 records that the print position information modification process through all types of modification processing methods has been completed, and then a series of processes ends and the process returns to the original process.

On the other hand, in step S702, when an instruction to modify print position information of character images is not issued and the process then proceeds to step S710, the print position information modification unit 18 modifies the print position information for a graphic image in the printing image data. Then, the process proceeds to step S712. In step S712, the print position information modification unit 18 determines whether the amount of modification in print position information for a graphic image has reached the maximum amount. When it is determined that the amount of modification in print position information has reached the maximum amount (Yes), the process proceeds to step S714. When a negative determination is made (No), a series of processes ends and the process proceeds to the original process.

When the process proceeds to step S714, the print position information modification unit 18 records that the amount of modification in print position information for a graphic image has reached the maximum amount, and then a series of processes ends and the process returns to the original process. On the other hand, in step S700, when the modification mode 1 is not set and the process then proceeds to step S716, the print position information modification unit 18 determines whether the modification mode 2 is set. When it is determined that the modification mode 2 is set (Yes), the process proceeds to step S718. When a negative determination is made (No), the process proceeds to step S704.

When the process proceeds to step S718, the print position information modification unit 18 determines whether an instruction to modify the print position information of a graphic image is issued. When it is determined that the modification instruction is issued (Yes), the process proceeds to step S710. When a negative determination is made (No), the process proceeds to step S704. Moreover, the flow of the process to modify print position information, executed using the first print position information modification method, (hereinafter, referred to as first print position information modification process) will be described with reference to FIG. 11. Here, FIG. 11 is a flowchart that shows the first print position information modification process.

Figure 11:
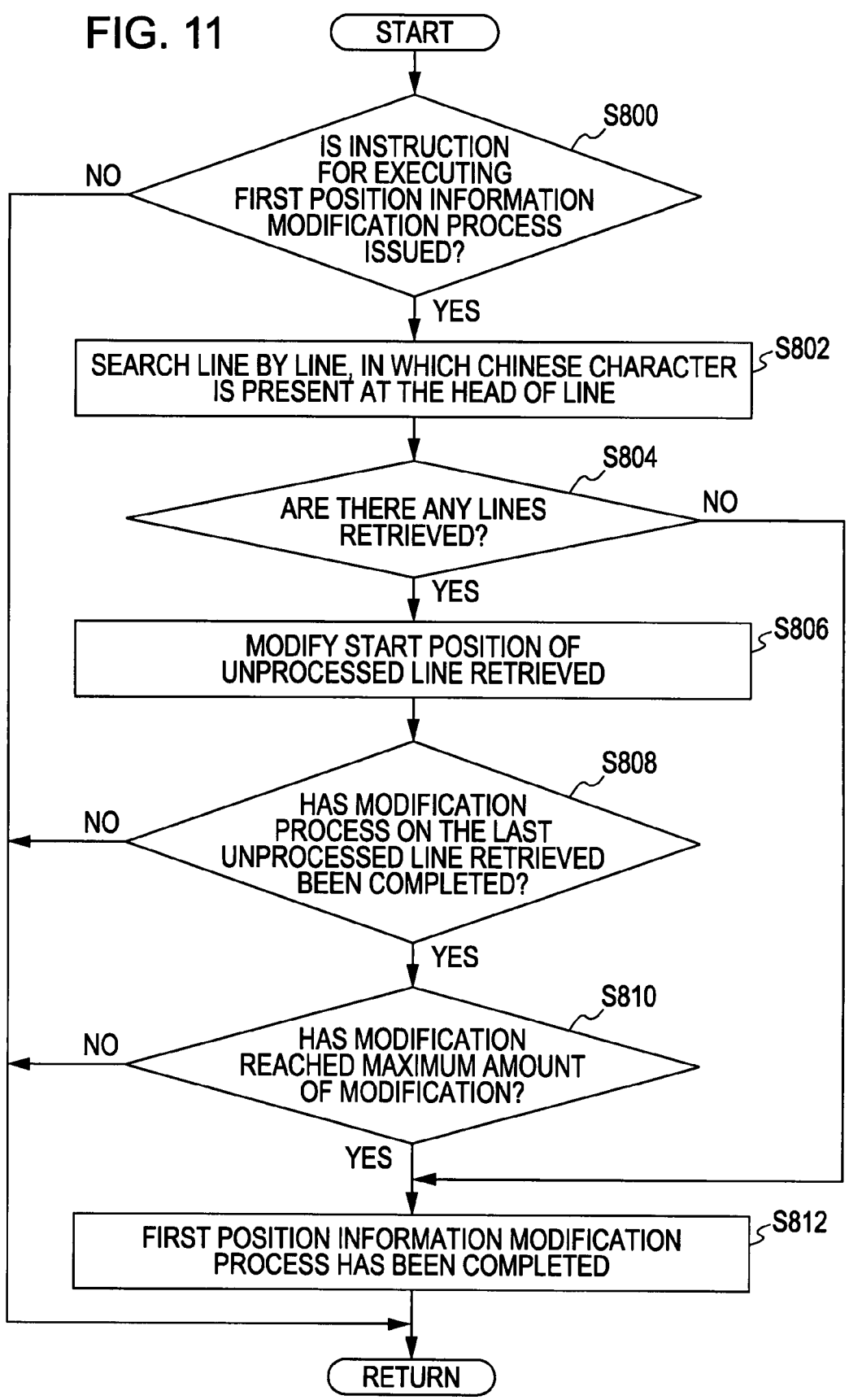
FIG. 11 is a flowchart that shows a first print position information modification process.

The first print position information modification process, as shown in FIG. 11, first proceeds to step S800, and the print position information modification unit 18 determines whether an instruction to execute the first print position information modification process is issued. When it is determined that the execution instruction is issued (Yes), the process proceeds to step S802. When a negative determination is made (No), the process repeats the determination process until the execution instruction is issued. When the process proceeds to step S802, the print position information modification unit 18 searches line by line (character strings) the document image of the processing target printing image data, in which Chinese character is present at the head, and then the process proceeds to step S804.

In step S804, the print position information modification unit 18 determines whether lines in which Chinese character is present at the head are retrieved. When it is determined that the lines are retrieved (Yes), the process proceeds to step S806. When a negative determination is made (No), the process proceeds to step S812. When the process proceeds to step S806, the print position information modification unit 18 modifies print position information in the printing image data so as to change the start positions of unprocessed lines in which Chinese character is present at the head and which have been retrieved in step S804, and then the process proceeds to step S808.

Here, changing of the start position is performed by moving the entire line in the nozzle array direction (right-hand direction). The amount of shift of the start position is a preset minimum amount of shift (for example, one dot, or the like). That is, until the frequencies of use of all the nozzles satisfy a prescribed amount or the amount of shift reaches the largest possible amount of shift (maximum amount of shift), the modification process is executed on the print position information to shift the entire line in the nozzle array direction in units of minimum amount of shift. In addition, the entire line may be simply shifted in the nozzle array direction. However, an appearance after shifting, or the like, may be considered: for example, shifting is performed after reducing the character spacing in the entire line.

In step S808, the print position information modification unit 18 determines whether the process to modify print position information on the last unprocessed line that is retrieved in step S804 has been completed. When it is determined that the modification process has been completed (Yes), the process proceeds to step S810. When a negative determination is made (No), a series of processes ends and the process proceeds to the original process. Here, the unprocessed line means a line that remains unprocessed during a single loop of process, which is executed to modify start positions for the entire document image. That is, even when the modification process has been executed for a line in the previous loop, the line remains unprocessed if the line is not processed in the current loop.

When the process proceeds to step S810, the print position information modification unit 18 determines whether the amount of modification in start position has reached the maximum amount of modification. When it is determined that the amount of modification in start position has reached the maximum amount of modification (Yes), the process proceeds to step S812. When a negative determination is made (No), a series of processes ends and the process proceeds to the original process. When the process proceeds to step S812, the print position information modification unit 18 records that the first print position information modification process has been completed. When this record information is present, the first print position information modification process will not be executed for the corresponding printing image data.

Figure 12:
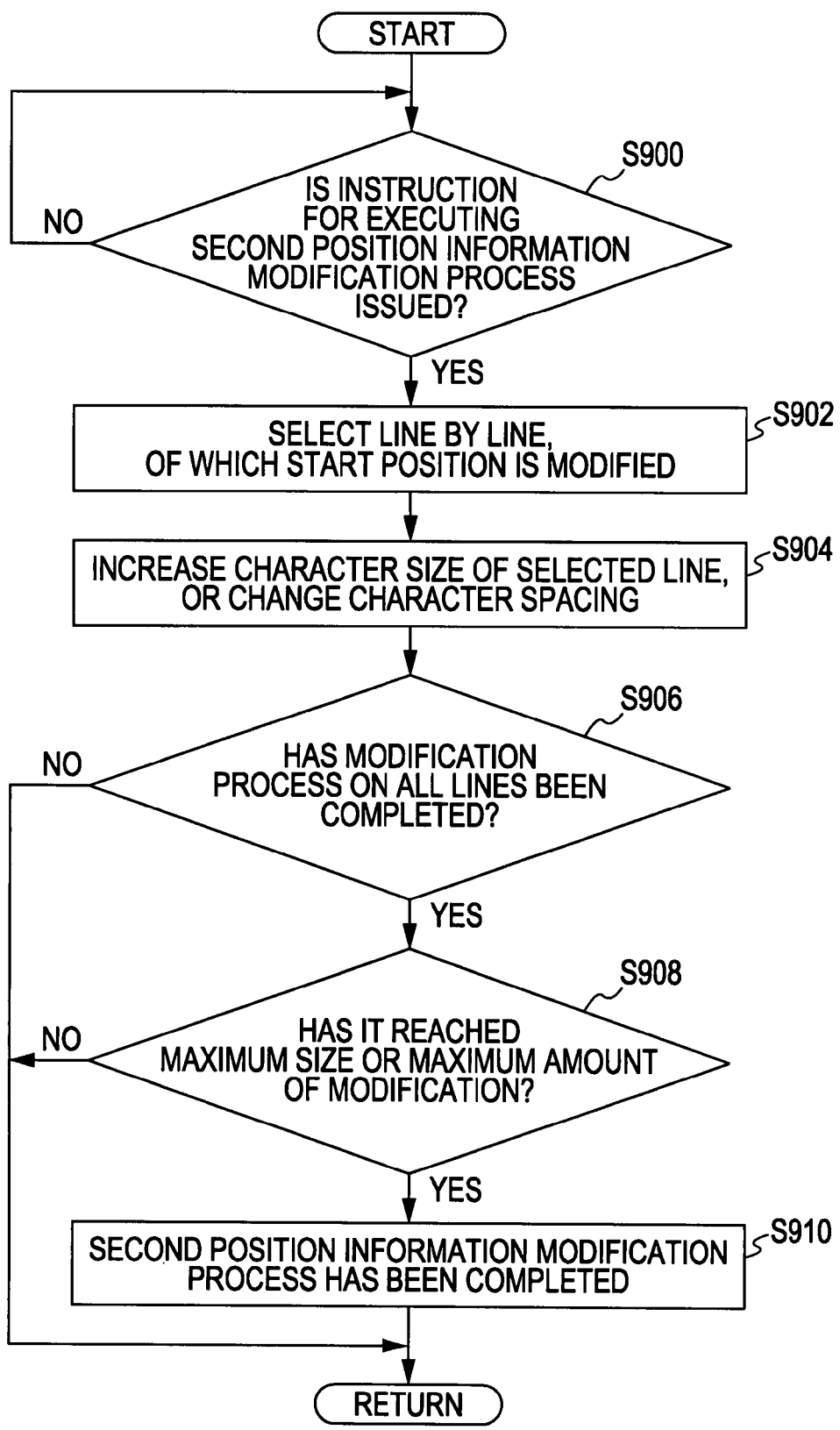
FIG. 12 is a flowchart that shows a second print position information modification process.

Moreover, the flow of the process to modify print position information, executed using the second print position information modification method, (hereinafter, referred to as second print position information modification process) will be described with reference to FIG. 12. FIG. 12 is a flowchart that shows the second print position information modification process. The second print position information modification process, as shown in FIG. 12, first proceeds to step S900, and the print position information modification unit 18 determines whether an instruction to execute the second print position information modification process is issued. When it is determined that the execution instruction is issued (Yes), the process proceeds to step S902. When a negative determination is made (No), the process repeats the determination process until the execution instruction is issued.

When the process proceeds to step S902, the print position information modification unit 18 selects the lines (character strings), of which the start positions are changed in the document image of the processing target printing image data, line by line, and then the process proceeds to step S904. In step S904, the print position information modification unit 18 modifies print position information of the printing image data so as to increase the character size in the lines selected in step S902 and to modify the character spacing, and then the process proceeds to step S906.

Here, the increase in character size is a process to increase the size of characters in units of preset minimum point (for example, 0.5 point, or the like). That is, until the frequencies of use of all the nozzles satisfy a prescribed amount or the character size reaches the largest possible point (maximum size), the modification process is executed on the print position information to increase character size in units of minimum point. In addition, changing of character spacing is a process to reduce or increase character spacing in the selected line in units of preset minimum amount (for example, one dot, or the like). That is, until the frequencies of use of all the nozzles satisfy a prescribed amount or the character spacing reaches the largest possible amount of modification (maximum amount of modification), the modification process is executed on the print position information to reduce or increase character spacing in units of minimum amount.

In step S906, the print position information modification unit 18 determines whether the process to increase character size has been completed for characters in all the lines of the character images. When it is determined that the modification process has been completed (Yes), the process proceeds to step S908. When a negative determination is made (No), a series of processes ends and the process proceeds to the original process. In step S908, the print position information modification unit 18 determines whether the changed character size has reached the maximum size. When it is determined that the changed character size has reached the maximum size (Yes), the process proceeds to step S910. When a negative determination is made (No), a series of processes ends and the process proceeds to the original process.

When the process proceeds to step S910, the print position information modification unit 18 records that the second print position information modification process has been completed. When this record information is present, the second print position information modification process will not be executed for the corresponding printing image data. Further, the flow of the process to modify print position information, executed using the third print position information modification method, (hereinafter, referred to as third print position information modification process) will be described with reference to FIG. 13. Here, FIG. 13 is a flowchart that shows the third print position information modification process.

Figure 13:
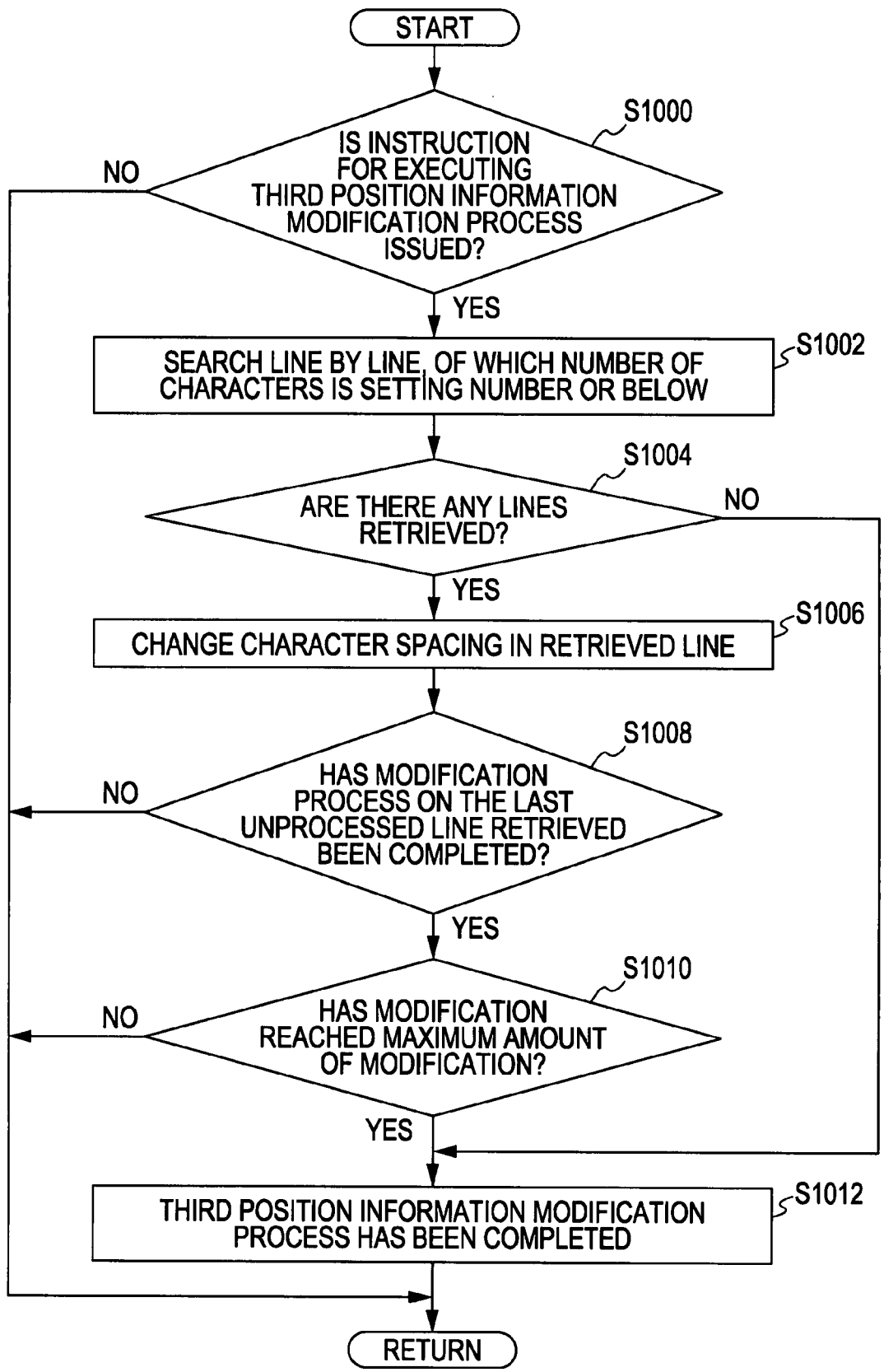
FIG. 13 is a flowchart that shows a third print position information modification process.

The third print position information modification process, as shown in FIG. 13, first proceeds to step S1000, and the print position information modification unit 18 determines whether an instruction to execute the third print position information modification process is issued. When it is determined that the execution instruction is issued (Yes), the process proceeds to step S1002. When a negative determination is made (No), the process repeats the determination process until the execution instruction is issued. When the process proceeds to step S1002, the print position information modification unit 18 searches lines (character strings), in which the number of characters is a setting number or below in the document image of the processing target printing image data, line by line, and then the process proceeds to step S1004.

In step S1004, the print position information modification unit 18 determines whether lines in which the number of characters is a setting number or below are retrieved. When it is determined that the lines are retrieved (Yes), the process proceeds to step S1006. When a negative determination is made (No), the process proceeds to step S1012. When the process proceeds to step S1006, the print position information modification unit 18 modifies the print position information in the printing image data so as to reduce or increase character spacing in the lines on which the process to modify character spacing has not been executed and which have been retrieved in step S1004, and then the process proceeds to step S1008.

In step S1008, the print position information modification unit 18 determines whether the process to modify the print position information on the last unprocessed line that is retrieved in step S1004 has been completed. When it is determined that the modification process has been completed (Yes), the process proceeds to step S1010. When a negative determination is made (No), a series of processes ends and the process proceeds to the original process. Here, the unprocessed line means a line that remains unprocessed during a single loop of process, which is executed to modify character spacing for the entire document image. That is, even when the modification process has been executed for a line in the previous loop, the line is unprocessed if the line is not processed during the current loop.

When the process proceeds to step S1010, the print position information modification unit 18 determines whether the amount of modification in character spacing has reached the maximum amount of modification. When it is determined that the amount of modification in character spacing has reached the maximum amount of modification (Yes), the process proceeds to step S1012. When a negative determination is made (No), a series of processes ends and the process proceeds to the original process. When the process proceeds to step S1012, the print position information modification unit 18 records that the third print position information modification process has been completed. When this record information is present, the third print position information modification process will not be executed for the corresponding printing image data.

Figure 14:
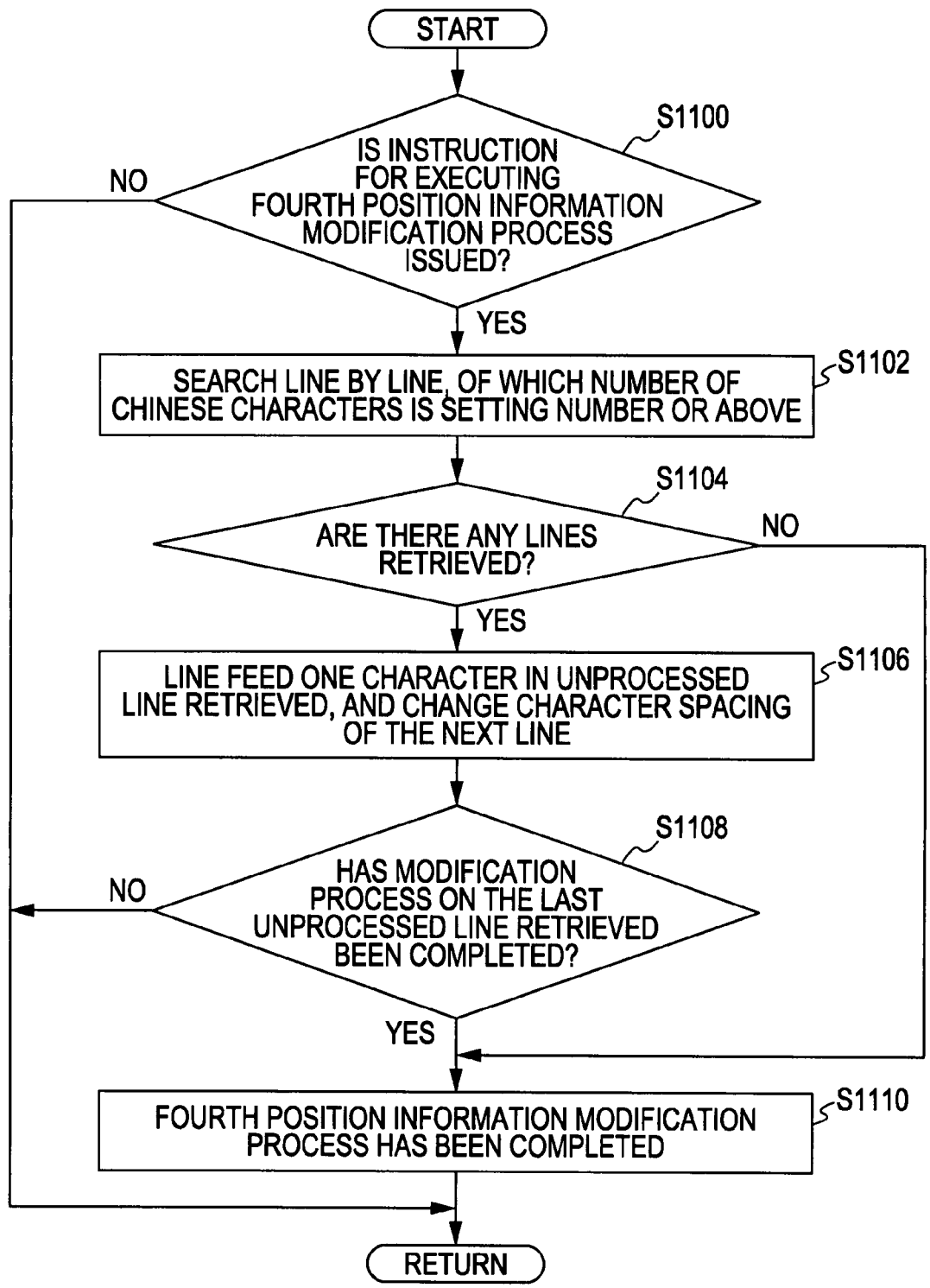
FIG. 14 is a flowchart that shows a fourth print position information modification process.

Yet furthermore, the flow of the process to modify print position information, executed using the fourth print position information modification method, (hereinafter, referred to as fourth print position information modification process) will be described with reference to FIG. 14. Here, FIG. 14 is a flowchart that shows the fourth print position information modification process. The fourth print position information modification process, as shown in FIG. 14, first proceeds to step S1100, and the print position information modification unit 18 determines whether an instruction to execute the fourth print position information modification process is issued. When it is determined that the execution instruction is issued (Yes), the process proceeds to step S1102. When a negative determination is made (No), the process repeats the determination process until the execution instruction is issued.

When the process proceeds to step S1102, the print position information modification unit 18 searches lines (character strings), in which the number of Chinese characters is a setting number or above in the document image of the processing target printing image data, line by line, and then the process proceeds to step S1104. In step S1104, the print position information modification unit 18 determines whether lines in which the number of Chinese characters is a setting number or above are retrieved. When it is determined the lines are retrieved (Yes), the process proceeds to step S1106. When a negative determination is made (No), the process proceeds to step S1110.

When the process proceeds to step S1106, the print position information modification unit 18 modifies the print position information in the printing image data so as to perform preceding line feed the lines, on which the modification process has not been executed, that have been retrieved in step S1104 and, after that, to increase character spacing of the lines that are reduced in one character by line feed while reducing character spacing of the lines that are increased in one character by line feed, and then the process proceeds to step S1108.

In step S1108, the print position information modification unit 18 determines whether the process to modify print position information on the last unprocessed line that is retrieved in step S1104 has been completed. When it is determined that the modification process has been completed (Yes), the process proceeds to step S1110. When a negative determination is made (No), a series of processes ends and the process proceeds to the original process. In step S1110, the print position information modification unit 18 records that the fourth print position information modification process has been completed. When this record information is present, the fourth print position information modification process will not be executed for the corresponding printing image data.

Figure 15A:
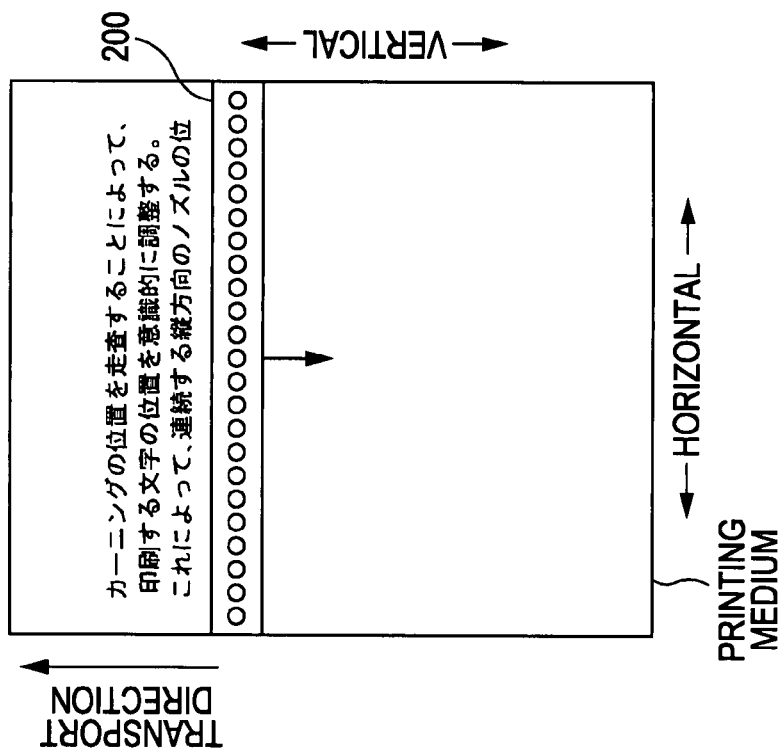
FIG. 15A and FIG. 15B are schematic views that show the relationship between a print head and a printing medium.
Figure 15B:
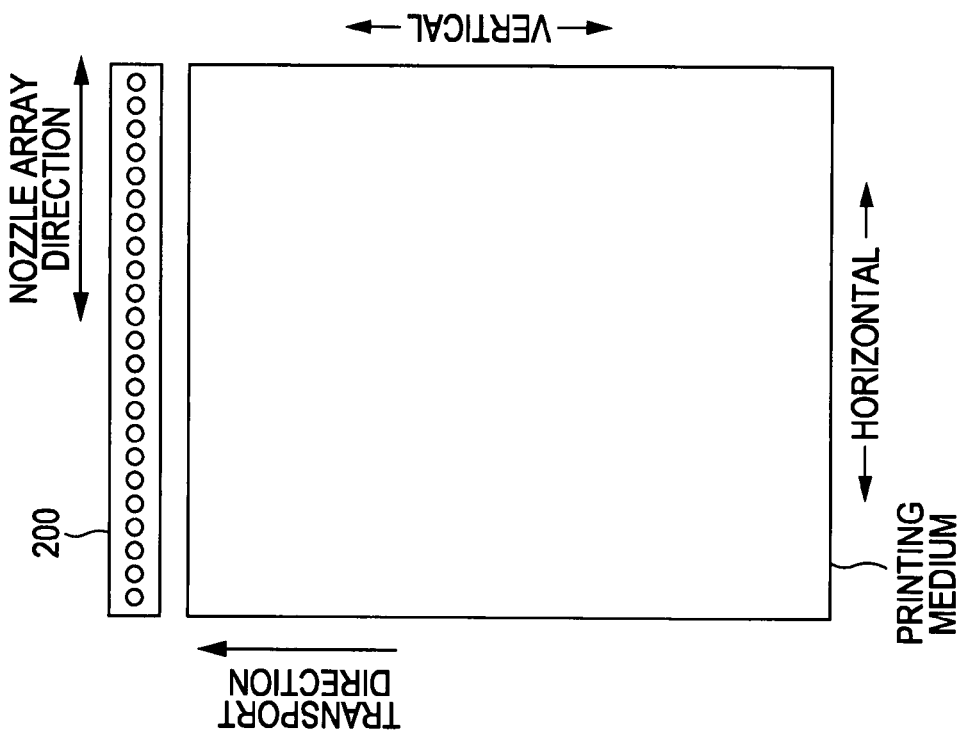
Figure 17:
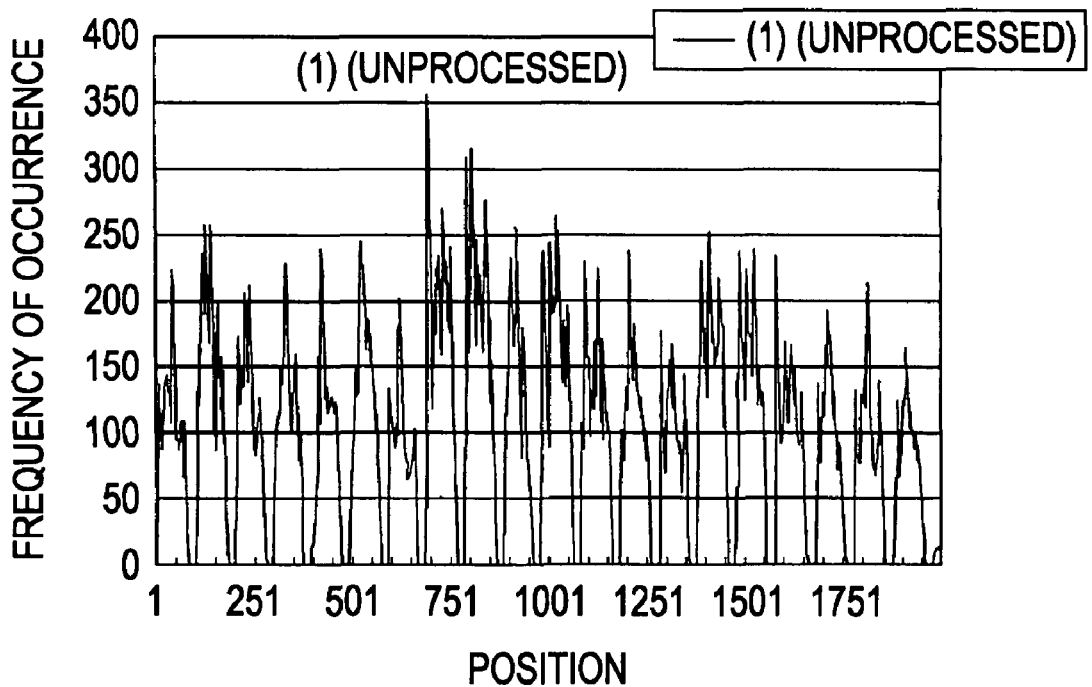
FIG. 17 is a view that shows projection information with respect to the printed result shown in FIG. 16A.
Figure 18A:
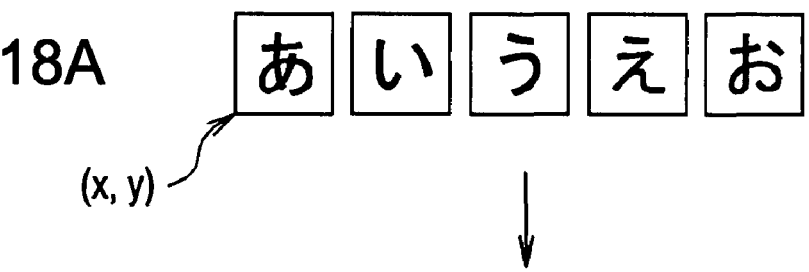
Figure 19A:
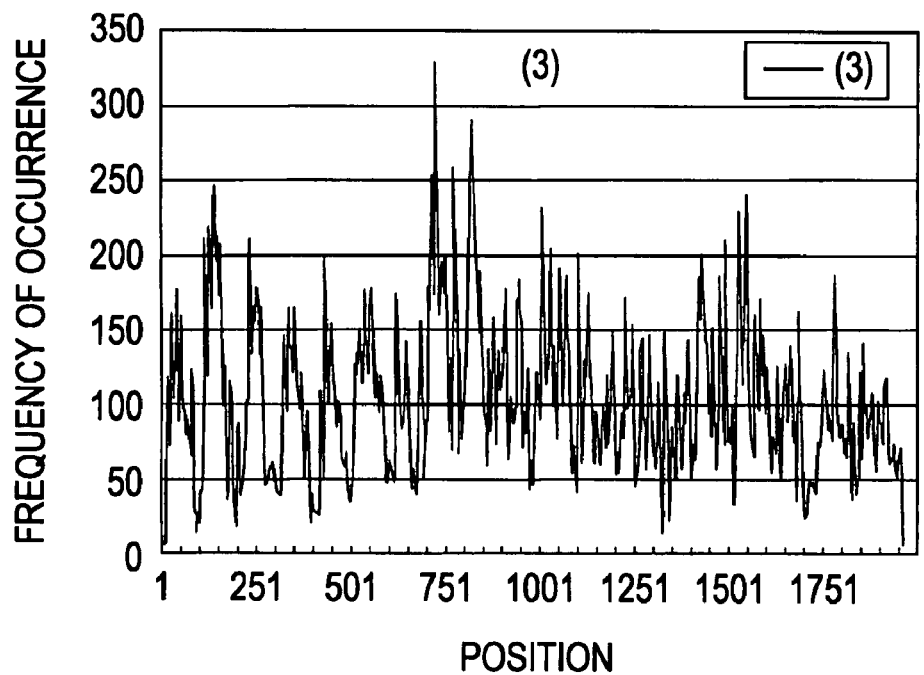
FIG. 19A is a view that shows projection information with respect to the printed result shown in FIG. 16B.
Figure 19B:
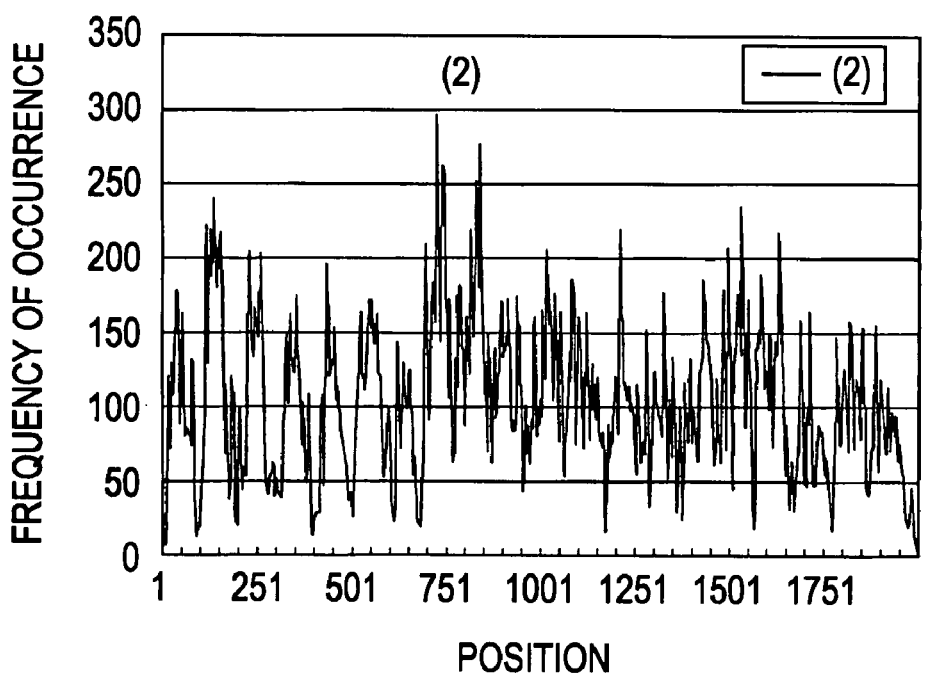
FIG. 19B is a view that shows projection information with respect to the printed result shown in FIG. 16C.
Figure 21A:
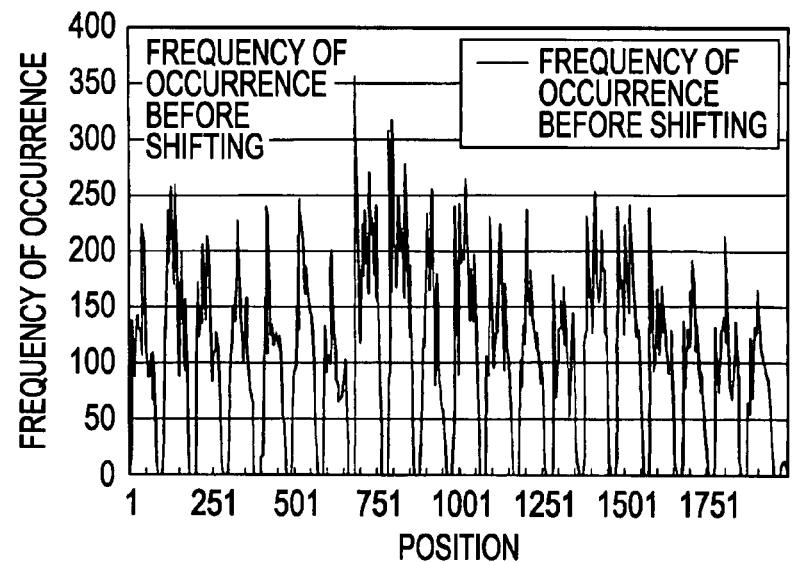
FIG. 21A is a view that shows projection information with respect to the document image before shifting shown in FIG. 20.
Figure 21B:
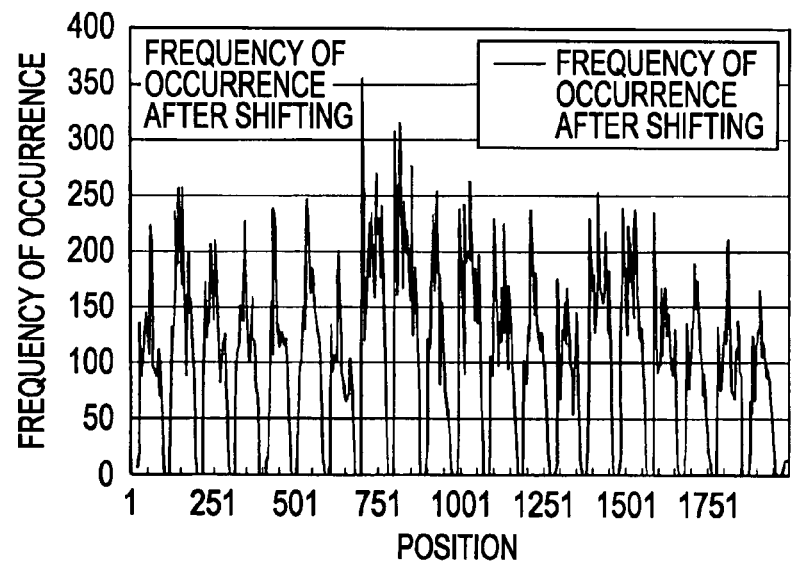
FIG. 21B is a view that shows projection information with respect to the document image after shifting shown in FIG. 20.
Figure 21C:
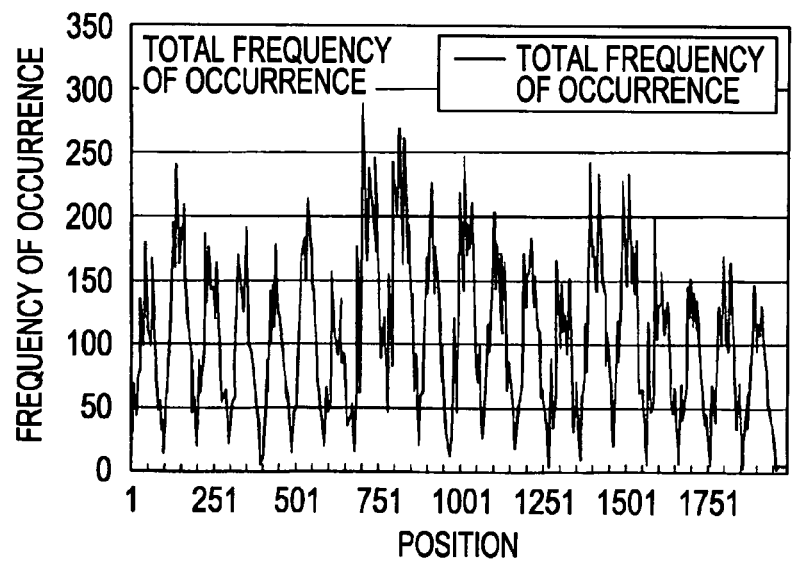
FIG. 21C is a view that shows the result of total of the projection information shown in FIG. 21A and FIG. 21B in each nozzle.
Figure 22:
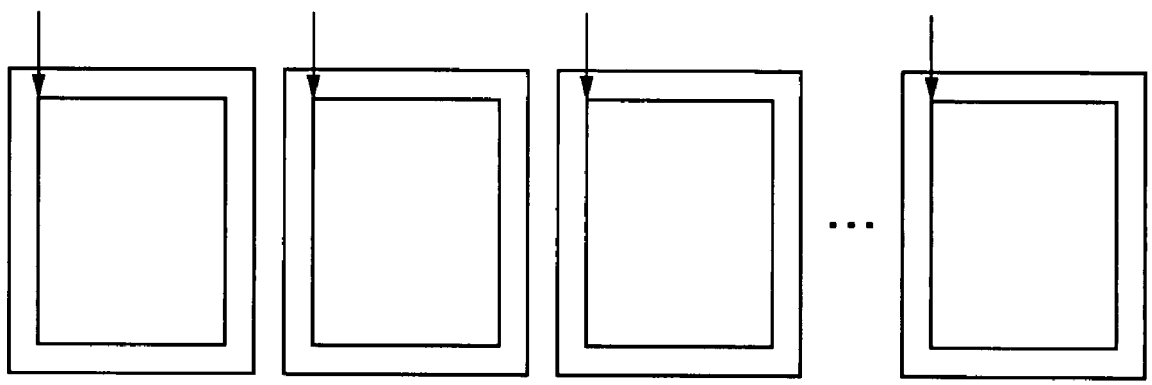
FIG. 22 is a view that shows one example of a printed result with respect to printing image data on which a print position modification process is executed over a plurality of pages.
Figure 23A:
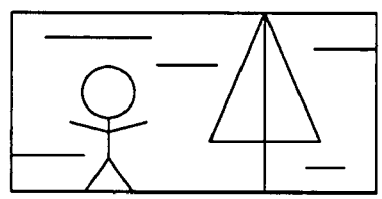
FIG. 23A is a view that shows one example of the printed result of a document image that includes a graphic image.
Figure 23B:
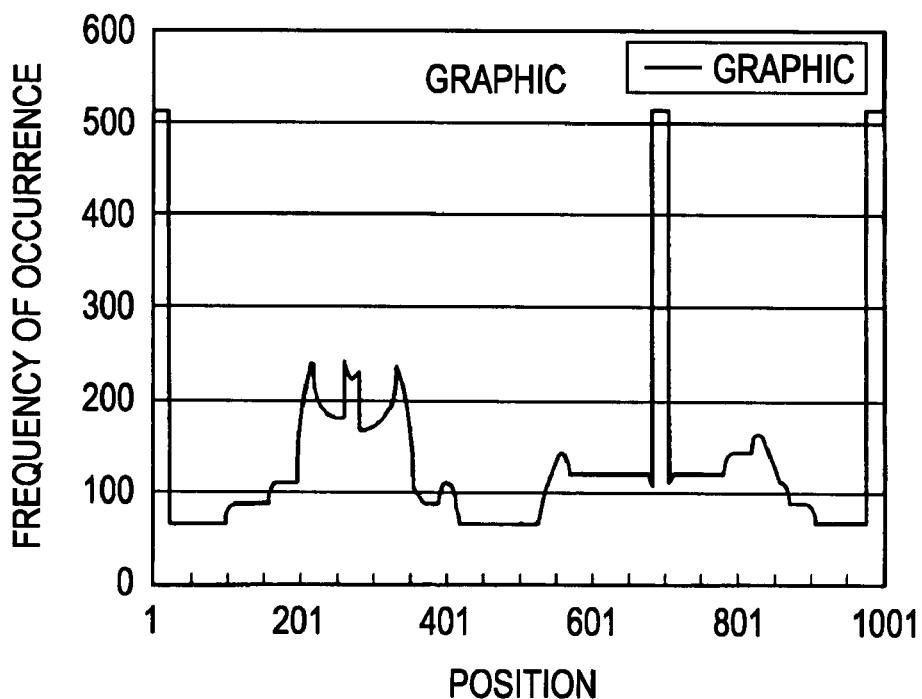
FIG. 23B is a view that shows projection information with respect to the graphic image shown in FIG. 23A.
Figure 24A:
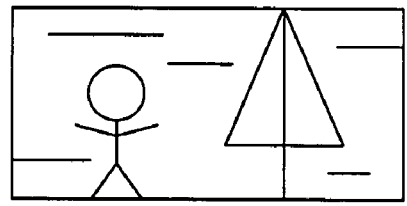
FIG. 24A and FIG. 24B are views that show the printed results before and after shifting of a graphic image in the document image that includes the graphic image.
Figure 24B:
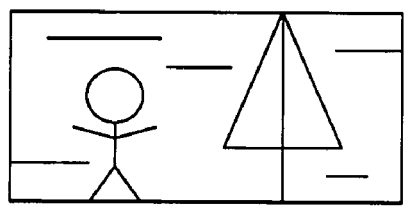
Figure 25A:
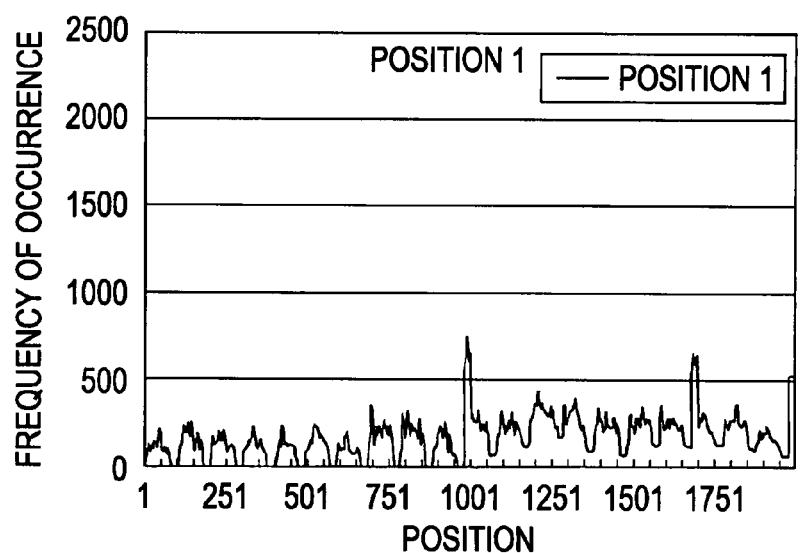
FIG. 25A is a view that shows projection information with respect to the document image shown in FIG. 24A.
Figure 25B:
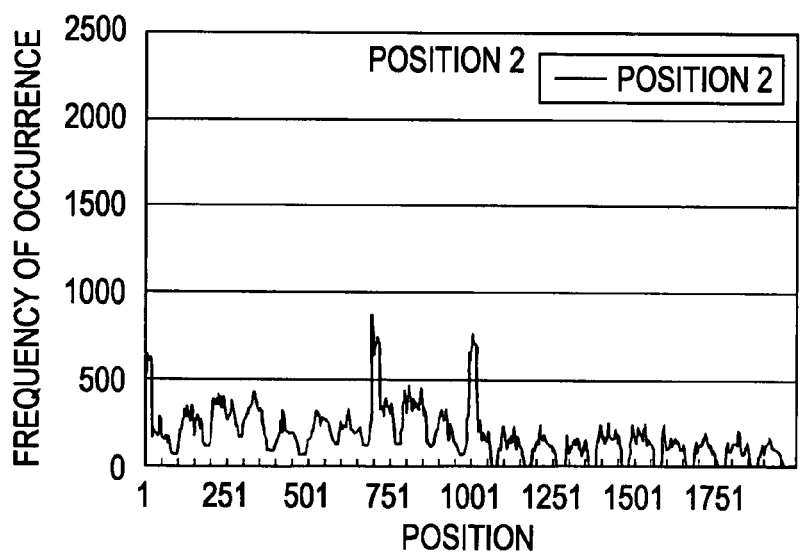
FIG. 25B is a view that shows projection information with respect to the document image after shifting of the graphic image shown in FIG. 24B.
Figure 25C:
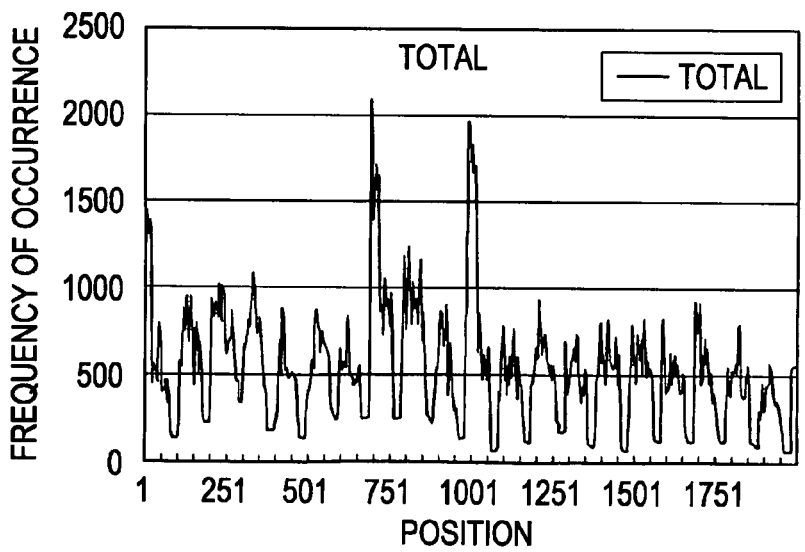
Figure 26:
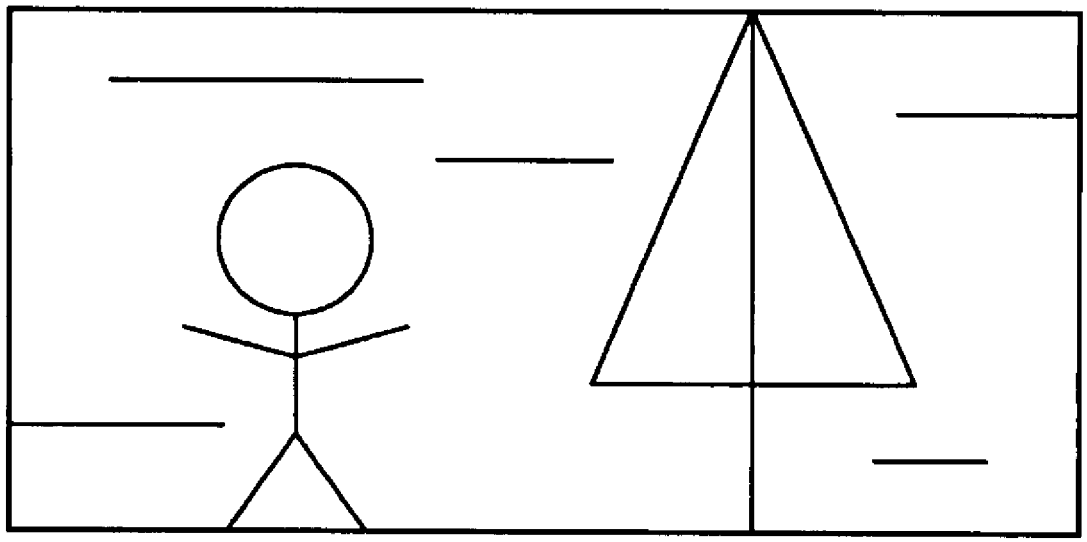
FIG. 26 is a view that shows a printed result when a modification process is executed to enlarge the graphic image in the document image shown in FIG. 23A.
Figure 27A:
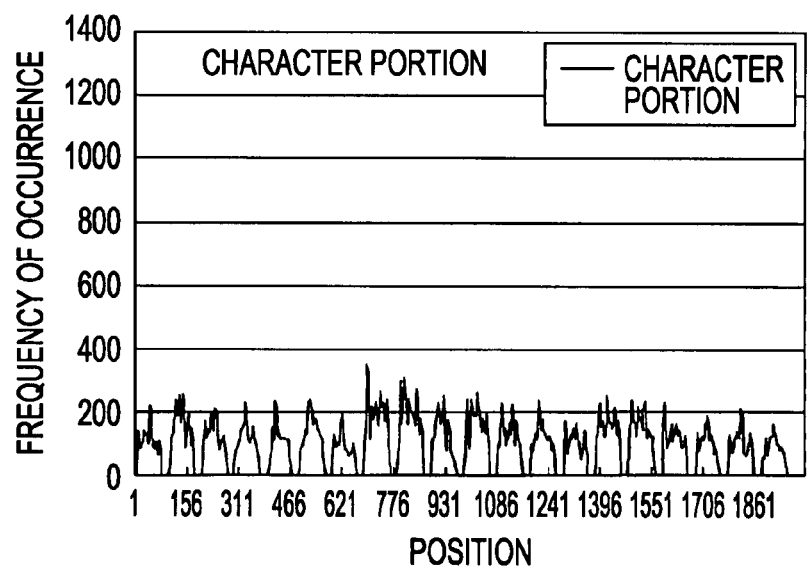
FIG. 27A is a view that shows projection information with respect to the image of a character image portion in the document image shown in FIG. 26.
Figure 27B:
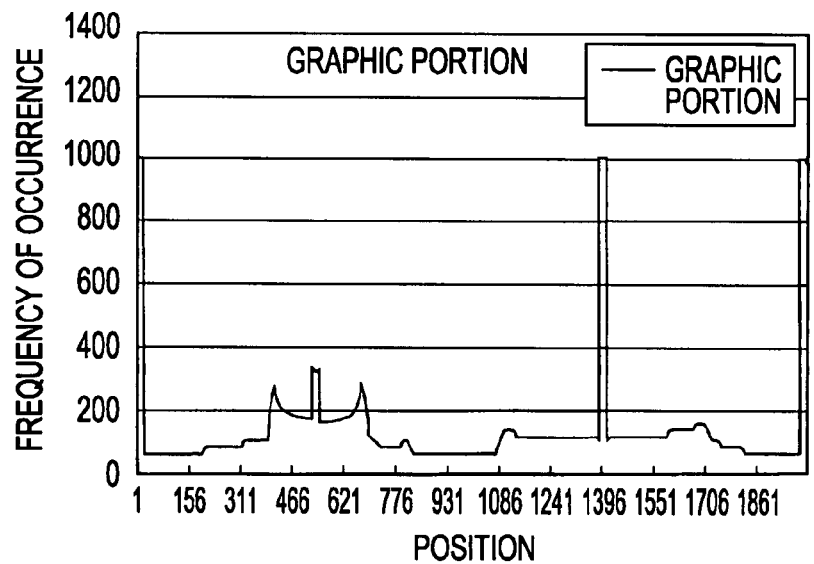
FIG. 27B is a view that shows projection information with respect to a graphic image portion in the document image shown in FIG. 26.
Figure 27C:
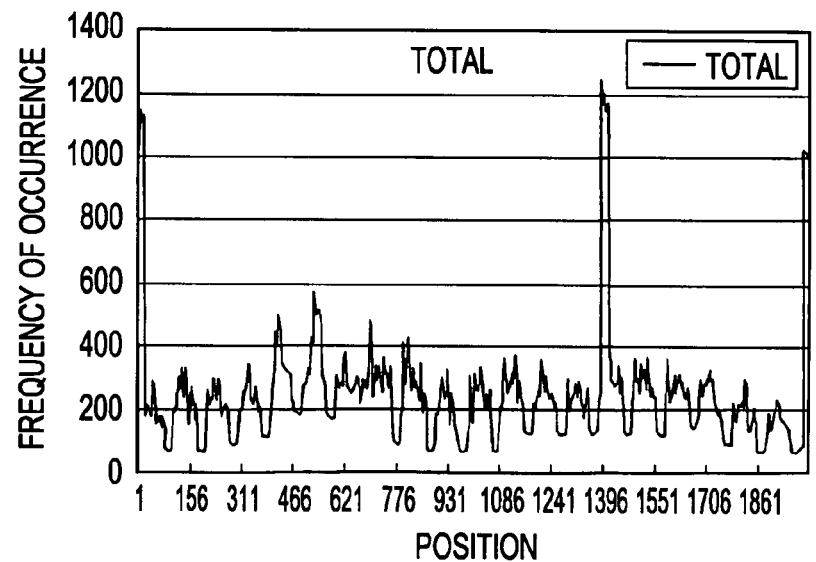
FIG. 27C is a view that shows the result of total of the projection information shown in FIG. 27A and FIG. 27B in each nozzle.

The operation of the present embodiment will now be described with reference to FIG. 15A to FIG. 27C. Here, FIG. 15A and FIG. 15B are schematic views that show the relationship between the print head 200 and a printing medium. FIG. 16A is a view that shows a printed result of original printing image data. FIG. 16B and FIG. 16C are views that show a printed result after the print position information of FIG. 16A is modified. FIG. 17 is a view that shows projection information with respect to the printed result shown in FIG. 16A. FIG. 18A and FIG. 18B are views that illustrate a print position modification method for a document image. FIG. 19A is a view that shows projection information with respect to the printed result shown in FIG. 16B. FIG. 19B is a view that shows projection information with respect to the printed result shown in FIG. 16C. FIG. 20 is a view that shows printed results before and after a modification process is executed to shift a start position of each line in a document image. FIG. 21A is a view that shows projection information with respect to the document image before shifting shown in FIG. 20. FIG. 21B is a view that shows projection information with respect to the document image after shifting shown in FIG. 20. FIG. 21C is a view that shows the result of total of the projection information shown in FIG. 21A and FIG. 21B in each nozzle. FIG. 22 is a view that shows one example of a printed result with respect to printing image data on which a print position modification process is executed over a plurality of pages. FIG. 23A is a view that shows one example of the printed result of a document image that includes a graphic image. FIG. 23B is a view that shows projection information with respect to the graphic image shown in FIG. 23A. FIG. 24A and FIG. 24B are views that show the printed results before and after shifting of a graphic image in the document image that includes the graphic image. FIG. 25A is a view that shows projection information with respect to the document image shown in FIG. 24A. FIG. 25B is a view that shows projection information with respect to the document image after shifting of the graphic image shown in FIG. 24B. FIG. 24C is a view that shows the result of total of the projection information shown in FIG. 25A and FIG. 25B in each nozzle. FIG. 26 is a view that shows a printed result when a modification process is executed to enlarge the graphic image in the document image shown in FIG. 23A. FIG. 27A is a view that shows projection information with respect to the image of a character image portion in the document image shown in FIG. 26. FIG. 27B is a view that shows projection information with respect to a graphic image portion in the document image shown in FIG. 26. FIG. 27C is a view that shows the result of total of the projection information shown in FIG. 27A and FIG. 27B in each nozzle.

First, the relationship between the print head 200 and the printing medium in the printer 100 according to the present embodiment will be described. As shown in FIG. 15A, the print head 200 has nozzles that are arranged in the same direction as the width direction of the printing medium. Then, as shown in FIG. 15B, the print head 200 discharges ink to form dots while the print head 200 and the printing medium move relative to each other. Thus, an image is printed on the printing medium through a single scanning operation.

The operation of the printer 100 will now be described. When the printer 100 receives a printing instruction from a printing instruction device, or the like (not shown) ("Yes" in step S100), the printing image data acquisition unit 10 acquires printing image data corresponding to the received printing instruction (step S102). In addition, the printing image data acquisition unit 10, when the acquired printing image data are document image data, transmits the data to the rendering processing unit 12 ("Yes" in step S104) and, when the acquired printing image data are image data other than document image data, transmits the data to the N-level processing unit 14 ("No" in step S104).

At first, the operation of the printer 100, when the printing image data are document image data that do not include a graphic image, will be described. In this case, because the printing image data are document image data that are generated using page description language, such as PostScript, the rendering processing unit 12 executes rendering process on the printing image data to convert the data into bitmap image data (step S106).

The converted image data have image information of the number of addressable luminance levels M ($M \geq 2$). Thus, the image data, on which rendering process has been executed, are output to the N-level processing unit and the N-level process (halftone process) is then executed on the image data, and, as a result, the image data having the number of addressable luminance levels M are converted into the image data having the number of addressable luminance levels N ($M \geq N \geq 2$) (step S108). The image data, on which N-level process has been executed, are output to the projection information generating unit 16 together with the original printing image data.

Here, the printed result of an image of the image data on which N-level process has been executed is regarded as the document image shown in FIG. 16A. The projection information generating unit 16 executes a process to generate projection information on the basis of the image data on which N-level process has been executed and which will be the printed result shown in FIG. 16A (step S110). As the process to generate projection information is initiated, the projection information generating unit 16 selects image data (image data in units of page) on which the projection information generating process is not executed, selects unprocessed image lines from the uppermost image line of the document image in the selected image data line by line (step S202), and then counts the number of dots of the selected image line (step S204). This counting process is executed on all the image lines in the selected image data ("Yes" in step S206), and the projection information that represents the relationship between the position of image line (for example, line number) and the number of counted dots, as shown in FIG. 17, is generated on the basis of the counted result of all the image lines (step S208).

FIG. 17 shows the projection information as a graph. Actually, the projection information is generated as a data table. This projection information generating process is executed on all pieces of image data in the printing image data ("Yes" in step S210), and the generated projection information is output to the print position information modification unit 18. Here, the image data are prepared only for one page, and ten copies of this image are printed. This information is acquired from print setting information included in the printing image data.

On the other hand, the print position information modification unit 18, when acquiring the projection information, executes the process to calculate the frequency of use of each nozzle (nozzle usage frequency calculation process) on the basis of the projection information and information of the print position of each nozzle of the print head 200 (step S112). As the nozzle usage frequency calculation process is initiated, the print position information modification unit 18 selects projection information on which the nozzle usage frequency calculation process is not executed (step S300), and calculates the number of dots formed (printed) by each nozzle by associating the selected projection information (the total number of dots in each image line) with nozzles that handle the printing of each image line (step S302).

Here, because the print position information is not modified and the processing target image data are prepared only for one page, the frequencies of use have been calculated for all pieces of projection information at this moment ("Yes" in step S304). Here, the amount of ink discharged to prevent ink from clogging in nozzles will be described. Generally, a minimum reference amount of discharged ink that is required in order to prevent nozzle clogging is determined. This minimum reference is determined as a criterion such that m or more number of dots need to be printed in n seconds. Thus, taking printing on print paper into consideration, it is not particularly necessary to make the number of dots printed per one sheet of printed result be m or above. For example, when the printer 100 can print p sheets per n seconds, it is only necessary for all the nozzles to print m or more number of dots per p sheets. Particularly, a line head printer, which completes printing by a single scanning operation, has a head arranged in a line above a sheet of paper in order to print out at high speed, so that multiple sheets of paper may be printed per one second. In addition, n seconds range from a few seconds to several tens of seconds, so that it is sufficient to perform printing of reference m or more number of dots in units of multiple sheets of paper.

The frequency of nozzle usage is the total number of dots formed by each nozzle in printing of p sheets (in n seconds). At this moment, because the print position information is not modified, in the present embodiment, the total value of frequency of use of each nozzle is calculated by multiplying the result calculated in step S302 by p (step S306). The print position information modification unit 18, after the frequency of nozzle usage has been calculated, executes the process to determine whether the frequency of nozzle usage satisfies the frequency of use prescribed as the above described minimum reference (condition determination process) (step S114).

As the condition determination process is initiated, because the print position information has not been modified yet ("No" in step S400), the print position information modification unit 18 compares the calculated frequency of nozzle usage with the frequency of use prescribed as minimum reference. Here, as is apparent from the graph of the projection information shown in FIG. 17, nozzles that never form dots appear with respect to the printed result of FIG. 16A. Further, multiple number of nozzles that are never used appear at substantially constant intervals. This is a characteristic that appears in an image, such as a document image, in which character images having the same size are arranged in a regular format (in a grid). Thus, even when the projection information shown in FIG. 17 is multiplied by p, the numbers of dots formed by the nozzles that have never formed dots remain "0". Therefore, even when ten copies of such an image are continuously printed, it is difficult to prevent unused nozzles from being clogged with ink. When the unused nozzles are present as described above, the print position information modification unit 18 determines that the calculated frequency of nozzle usage does not satisfy the condition (step S406).

Because the condition is not satisfied, the print position information modification unit 18 executes the process to modify the print position information on the original printing image data on which no rendering process has been executed (step S118). As the print position information modification process is initiated, because the printing image data are document image data ("Yes" in step S600) and do not include a graphic image ("No" in step S602), the print position information modification unit 18 executes the first to fourth print position information modification processes in order of priority (step S606).

First, because the first print position information modification process has the highest priority, the first print position information modification process is executed (an execution instruction is issued) on the document image data that give the printed result shown in FIG. 16A. As the instruction to execute the first print position information modification process is issued ("Yes" in step S800), the print position information modification unit 18 searches lines, in which a Chinese character is present at the head, line by line (step S802). In the example of FIG. 16A, the lines having a Chinese character at the head are the second line and the fourth line, so that the second line is initially retrieved ("Yes" in step S804). Then, the print position information in the printing image data is modified so that the start position of the retrieved second line is shifted in the nozzle array direction (right-hand direction) by predetermined minimum units of shift (for example, 4 dots).

Specifically, because document image data are given the coordinate information (x, y) of characters as shown in FIG. 18A, the coordinate information is modified so that all the character images in the selected line are shifted in the nozzle array direction by the minimum units of shift. That is, where the minimum unit is d [dot], the coordinates of all the characters in the selected line are changed to (x+d, y) using the d as an offset value of x-coordinate.

For example, where the respective coordinates of "あ, い, う, え, お" shown in FIG. 18A are changed to (x1, y1), ..., (x5, y5), when the offset is performed in the x direction, the positions of the above characters will be shifted to the coordinates (x1+offset, y1), (x2+offset, y2), ..., (x5+offset, y5). Note that, because the above example uses the characters in the same line, y1=y2= ... =y5.

Generally, in a rendering module (RIP module), because the process is executed by reading the positional information of characters and other images, when the positional information is modified before rendering, the modified positions are maintained after the rendering (FIG. 18B). When the process to modify the print position information on the selected second line has been completed, because the fourth line remains unprocessed ("No" in step S808), the print position information modification unit 18 outputs the printing image data, in which the start position of the second line is changed, to the printing image data acquisition unit 10. Because the printing image data is document image data, the rendering processing unit 12 executes rendering process on the image data again (step S106), and the N-level processing unit 14 executes N-level process on the image data on which the rendering process has been executed (step S108), and then the projection information generating unit 16 generates projection information on the basis of the image data on which the N-level process has been executed (step S110). The projection information at this moment differs from the original one (initial print position) as shown in FIG. 17, so that the frequency of nozzle usage is calculated on the basis of that projection information again (step S112). Then, it is determined whether the condition is satisfied on the basis of the frequency of nozzle usage (step S114).

At this moment, the print position information is modified ("No" in step S400) and the image data are document image data that do not include a graphic image ("Yes" in step S408), so that it is determined whether the frequency of nozzle usage satisfies the prescribed frequency of use (step S410). Here, for example, the condition is not satisfied ("No" in step S410). Because the first loop modification process in the first print position information modification process is not completed, and there is still a room for modifying the position information of character images ("No" in step S414), the determination result that the condition is not satisfied is fixed (step S418).

In this manner, the process is executed from the midway of the first loop in the first print position information modification process (step S118). That is, the fourth line is retrieved from the document image of FIG. 16A as the line that has a Chinese character at the head ("Yes" in step S804), and then the print position information in the printing image data is modified so that the start position of the characters in the retrieved fourth line is shifted by minimum units of shift (step S806). In addition, the fourth line is the last line to be retrieved ("Yes" in step S808). However, because the shift is performed by minimum unit of shift, the amount of shift has not reached the maximum amount of shift ("No" in step S810), for example.

The printing image data on which the print position information has been modified are output to the printing image data acquisition unit 10, and the frequency of nozzle usage is calculated on the printing image data, as in the case of the series of processes executed on the second line after the print position information has been modified. Here, for example, the frequency of nozzle usage does not satisfy the condition even with several times of execution of the first print position information modification process, and the second print position information modification process is then executed (an execution instruction is issued).

When the instruction to execute the second print position information modification process is issued ("Yes" in step S900), the print position information modification unit 18 selects the lines of which the start positions have been modified in the first print position information modification process (step S902). Because the second line and the fourth line in the example shown in FIG. 16A are applied, the print position information in the printing image data is modified so as to increase the character size in the second line by a predetermined minimum unit (for example, 0.5 point) and increase the character spacing by a minimum unit (for example, one dot) after increasing the character size.

The printing image data, on which the print position information has been modified, are output to the printing image data acquisition unit 10, and the projection information is generated for the printing image data, as in the case of the second line after the print position information has been modified. This projection information is, for example, shown in FIG. 19A. As shown in the graph of the projection information of FIG. 19A, it appears that substantially all the nozzles are used to form dots through the modifications of print position information up to this moment.

The printed result will be the one shown in FIG. 16B. When a comparison is made between the printed result of the initial position shown in FIG. 16A and the printed result shown in FIG. 16B, it appears that the character size is larger in the characters in the second line of FIG. 16B than in the characters in the second line of FIG. 16A, and the start position of the fourth line shown in FIG. 16B is shifted in the nozzle array direction from the start position in the fourth line shown in FIG. 16A. In addition, the character spacing is also changed.

That is, because the character images are regularly arranged, spaced portions regularly appear in FIG. 16A, while, on the other hand, the characters are irregularly arranged in FIG. 16B because of the increase in character size, the shift in start position, and the like. Owing to this irregular arrangement, almost all the spaced areas disappear, and substantially all the nozzles are used. However, as is apparent from the projection information of FIG. 19A, part of nozzles still remain unused. Thus, it is determined that this frequency of nozzle usage does not satisfy the condition (step S418, "No" in step S114). Thus, the process is further executed to modify the print position information so as to increase the size of part of characters by the second print position information modification process. The projection information corresponding to the printing image data, on which the above process has been executed, is shown in FIG. 19B. As is apparent from FIG. 19B, no unused nozzles are present.

Because ten copies of the image having this print position are continuously printed, for example, when p=4, the frequency of dot usage is obtained by multiplying the number of dots in each image line (each nozzle) by 4. It is determined that this frequency of nozzle usage satisfies the condition (step S416, "Yes" in step S114). In this manner, the print position information modification unit 18 outputs the printing image data, on which the N-level process has been executed and of which the frequency of nozzle usage satisfies the condition, to the printing unit 20.

On the other hand, on the basis of the printing image data on which the print position information modification process has been executed and the N-level process has been executed, the printing unit 20 prints out an image of the printing image data at positions after the modification in a print medium using the print position information modification unit 18.

This printed result is shown in FIG. 16C. As described above, because the number of copies to be printed is 10, printing that gives the printed result shown in FIG. 16C is continuously performed in a series of ten copies. Thus, when the ten copies are being printed, all the nozzles are used in a prescribed frequency of use. Hence, there is no chance to be clogged with ink. In addition, because the print position information modification process is executed in units of line (character string) in a document image, it is possible for the frequency of nozzle usage to satisfy the condition with a necessary minimum modification.

Note that, in the printed result shown in FIG. 16C, the modification of print position information is executed so that all the nozzles are used in printing of one sheet, but it is not limited. The modification of print position information may be configured so that all the nozzles satisfy a prescribed frequency of use in printing of two or more sheets. In this case, two or more pieces of image data having different print positions are created. For example, as shown in FIG. 20, image data, in which the start positions of all the lines in a document image are shifted in the nozzle array direction (right-hand direction), are created for the printing image data that have one page per copy. Note that the number of copies printed is ten.

In addition, the projection information of an image, before shifting (initial print position), corresponding to the original printing image data, shown in FIG. 20, is shown in FIG. 21A. As shown in FIG. 21A, unused nozzles appear at substantially constant intervals. On the other hand, the projection information after shifting is shown in FIG. 21B. As is apparent from FIG. 21B, the projection information shown in FIG. 21A is shifted in the nozzle array direction (right-hand direction) by the amount of shift. That is, when the process is executed to modify the print position information so as to shift the entire character images, the projection information after shifting may be easily calculated by shifting the entire projection information before shifting by the amount of shift. Thus, when only a simple modification of print position, such as shifting of character images in units of line or shifting of all the character images, is executed, it is possible to generate projection information after the print position has been modified by modifying the projection information of the original printing image data. In this case, after modifying the print position information, it is possible to immediately execute the projection information generating process without executing a rendering process and an N-level process, and, hence, it is possible to reduce a processing load.

As shown in the example of FIG. 20, it is configured to satisfy the condition by printing two pieces of image data, that is, before shifting and after shifting, so that two pieces of printing image data are present and the unit of position changing page is two pages. Thus, the projection information generating unit 16 generates the projection information for these two pieces of printing image data, and the print position information modification unit 18 totals the frequency of nozzle usage of these two pieces of printing image data in each nozzle and calculates the final frequency of nozzle usage. The total of the projection information before shifting and after shifting is shown in FIG. 21C. As seen from FIG. 21C, it appears that no unused nozzles are present.

Note that, in the example shown in FIG. 20, the unit of position changing page is two pages; however, as shown in FIG. 22, the unit of position changing page may be increased and shifting by the amount of shift that satisfies the condition may be performed over more number of pages. For example, when 63 dots are shifted over eight pages, the print position information is modified so that the print position remains at an initial position on the first page and is shifted in the x direction (nozzle array direction (right-hand direction)) by nine dots relative to the preceding page on each page from the second page and the following pages. That is, it is configured to perform printing at the initial position on the first page and, on the eighth page, printing at a print position, which is shifted by 63 dots as compared to the first page.

In this manner, nozzles, which are not used when printing is performed only at the initial position, are all used by the time when printing is performed on the eighth page. In addition, because shifting of the print position is not executed at one time by the amount of shift but is executed separately over a plurality of pages, a change in appearance between the adjacent pages is minute. Thus, in comparison with an appearance when shifting is performed at one time by one page, it is possible to perform shifting of print position with an appearance maintained.

Next, the operation performed when the printing image data are document image data that include a graphic image and the modification mode 1 is set will be described. In this case as well, because the printing image data are document image data that are generated using page description language, such as PostScript, the rendering processing unit 12 executes rendering process on the printing image data to convert the data into bitmap image data (step S106). The image data on which the rendering process has been executed are output to the N-level processing unit 14 and the N-level process is then executed on the image data, and, as a result, the image data having the number of addressable luminance levels M are converted into the image data having the number of addressable luminance levels N (M≧N≧2) (step S108). The image data on which the N-level process has been executed are output to the projection information generating unit 16 together with the original printing image data. Here, the printed result of an image of the image data on which the N-level process has been executed is, for example, regarded as the document image shown in FIG. 23A.

The projection information generating unit 16 executes the process to generate projection information, as in the case of the above, and generates projection information on the basis of the image data on which the N-level process has been executed and which will be the printed result shown in FIG. 23A (step S110). The projection information for the printed result shown in FIG. 23A is shown in FIG. 25A. The generated projection information is output to the print position information modification unit 18. Here, the image data are prepared only for one page, and ten copies of this image are printed.

On the other hand, the print position information modification unit 18, when acquiring the projection information, executes the process to calculate the frequency of use of each nozzle (nozzle usage frequency calculation process) and generates the frequency of nozzle usage on the basis of the projection information and information of the print position of each nozzle of the print head 200 (step S112). Here, as is apparent from the graph of the projection information shown in FIG. 25A, nozzles that never form dots appear with respect to the printed result of FIG. 23A. Further, on the substantially left half of the projection information, multiple number of nozzles that are never used appear at substantially constant intervals. This is because only the character images are present on the substantially left half in the print area. Thus, even when the projection information shown in FIG. 25A is multiplied by p, the number of dots formed by the nozzles that never form dots remains "0". Hence, the print position information modification unit 18 determines that the calculated frequency of nozzle usage does not satisfy the condition (step S406).

Because the condition is not satisfied, the print position information modification unit 18 executes the process to modify the print position information on the printing image data (step S118). As the print position information modification process is initiated, because the printing image data are document image data ("Yes" in step S600) and include a graphic image ("Yes" in step S602), the print position information modification process is executed in accordance with the setting mode from among the modification modes 1 to 3 (step S604).

Here, because the modification mode 1, in which the print position of a graphic image is modified prior to character images, is set ("Yes" in step S700) and an instruction to shift positions of character images is not issued ("No" in step S702), the print position information modification process is executed on the graphic image (step S710). Shifting of the print position of the graphic image may be performed by modifying the coordinate information of the graphic image as in the case of the character image.

Here, the projection information of the graphic image portion is shown in FIG. 23B. As shown in FIG. 23B, all the nozzles are used for the graphic image portion. Thus, as shown in FIG. 25A, all the nozzles are also used on substantially the right half of the projection information. Thus, it appears that, when the image of the initial print position shown in FIG. 24A and the image shown in FIG. 24B in which only the graphic image in the image of the initial print position is shifted to the left side are alternately printed, all the nozzles may be used.

In an actual process, the print position information (coordinate information) of the graphic image is repeatedly modified, for example, the entire graphic image is gradually shifted to a spaced area by minimum units of shift, and finally the printing image data that can obtain the printed result shown in FIG. 24B are created. The projection information for the image shown in FIG. 24B is shown in FIG. 25B, so that, when it is combined with the projection information shown in FIG. 25A, the projection information shown in FIG. 25C is obtained.

In this case, because all the nozzles satisfy the prescribed frequency of use ("Yes" in step S502), it is determined that the condition is satisfied (step S504). On the other hand, there is another way to modify the print position information, without shifting a graphic image. The size of the graphic image is increased as shown in FIG. 26. The projection information of the document image portion in the document image shown in FIG. 26 appears that unused nozzles are present at substantially constant intervals as shown in FIG. 27A. On the other hand, the projection information of the graphic image portion after the size of the graphic image is increased is shown in FIG. 27B. As shown in FIG. 27B, all the nozzles are used for printing the graphic image portion. Thus, by printing the image shown in FIG. 26, it is possible to use all the nozzles.

In an actual process, the print position information (graphic image size) of the graphic image is, for example, repeatedly modified by minimum multiplying factor, and the size of the graphic image is increased by minimum multiplying factor until the condition is satisfied or the maximum multiplying factor is reached. The projection information for the printed result shown in FIG. 26 is shown in FIG. 27C, and it appears that all the nozzles are used. Because ten copies of this image are continuously printed, the frequency of nozzle usage satisfies a prescribed frequency of use ("Yes" in step S502), so that it is determined that the condition is satisfied (step S504).

Note that, when only the modification of the position of the graphic image does not satisfy the condition ("Yes" in step S506), the instruction to modify the print position information of character images (step S512) is issued, and subsequently the print position information modification process is executed on the character images through the first to fourth print position information modification processes, as in the case of the above (steps S704 to S708). Furthermore, in an alternative example of the present embodiment, the operation performed when a nozzle array direction is perpendicular to the nozzle array direction of FIG. 15 will be described with reference to FIG. 28A to FIG. 31B.

Figures 28A, 28B:
FIG. 28A is a view that shows the relationship between the printed result of an image before the print position information is changed and the print head.
FIG. 28B is a view that shows the printed result after changing of the print position information is executed to reduce line spacing on the character image shown in FIG. 28A.
Figure 29:
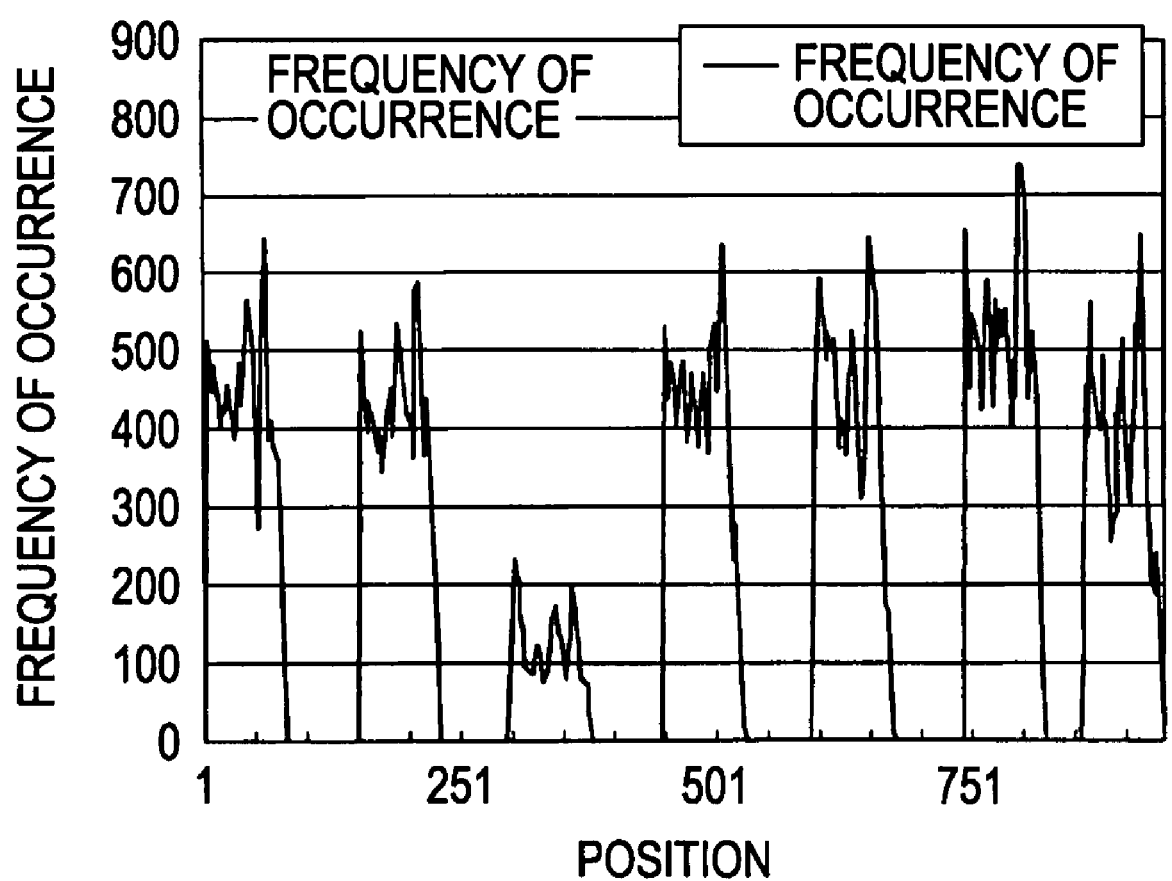
FIG. 29 is a view that shows projection information with respect to the printed result shown in FIG. 28A.
Figure 30A:
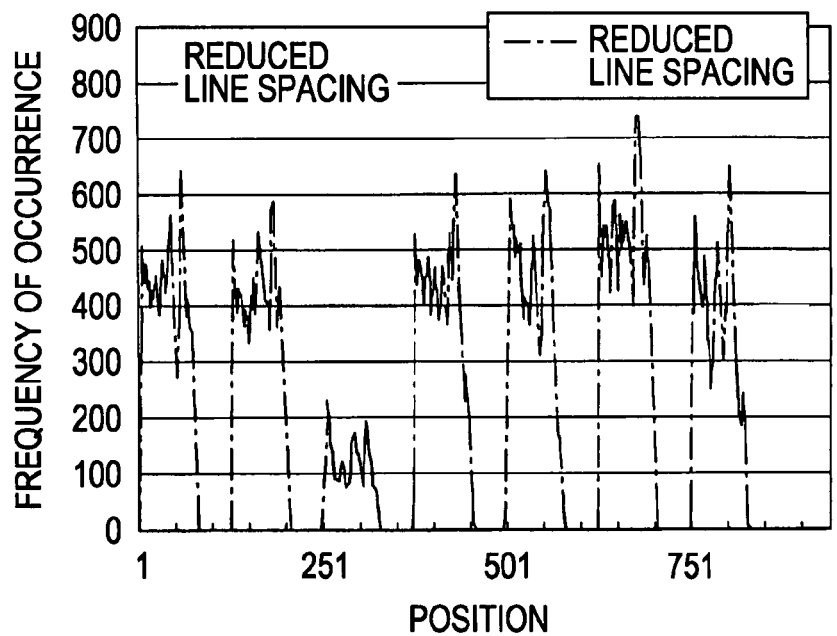
FIG. 30A is a view that shows projection information with respect to the printed result shown in FIG. 28B.
Figure 30B:
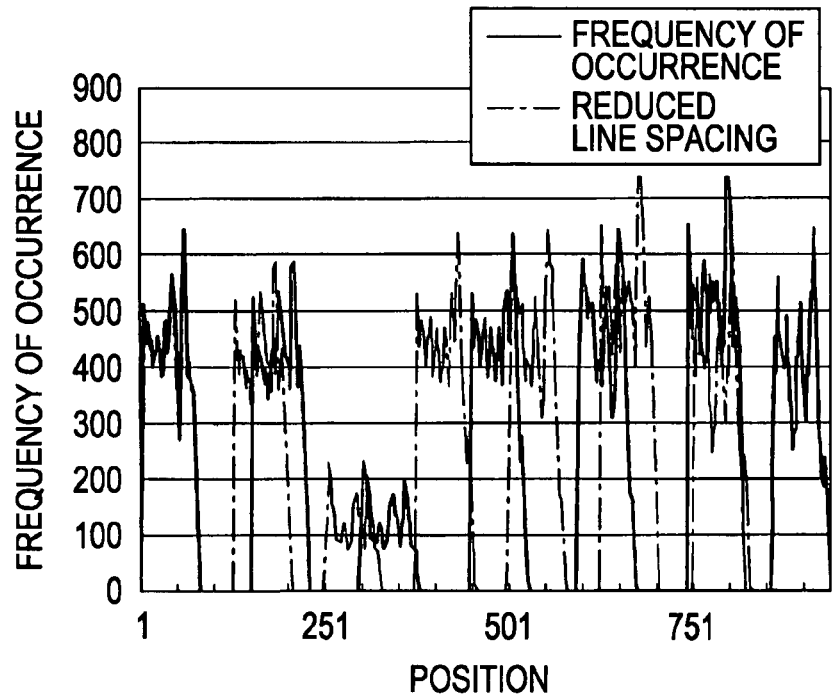
FIG. 30B is a view that shows the result of total of the projection information shown in FIG. 30A and the projection information shown in FIG. 29 in each nozzle.
Figure 31A:
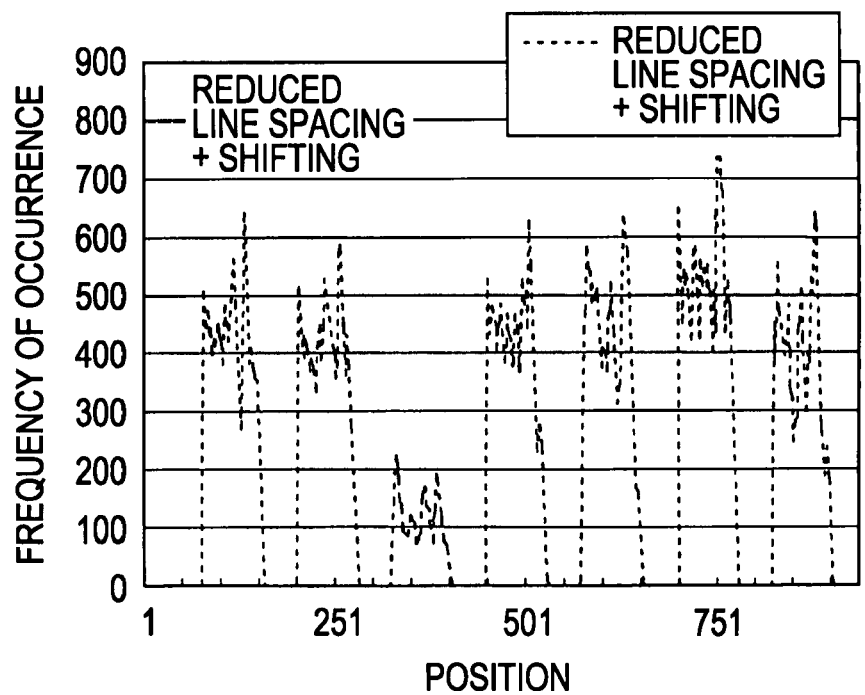
FIG. 31A is a view that shows projection information when the entire image is shifted in a nozzle array direction (downward or upward) after line spacing is reduced.
Figure 31B:
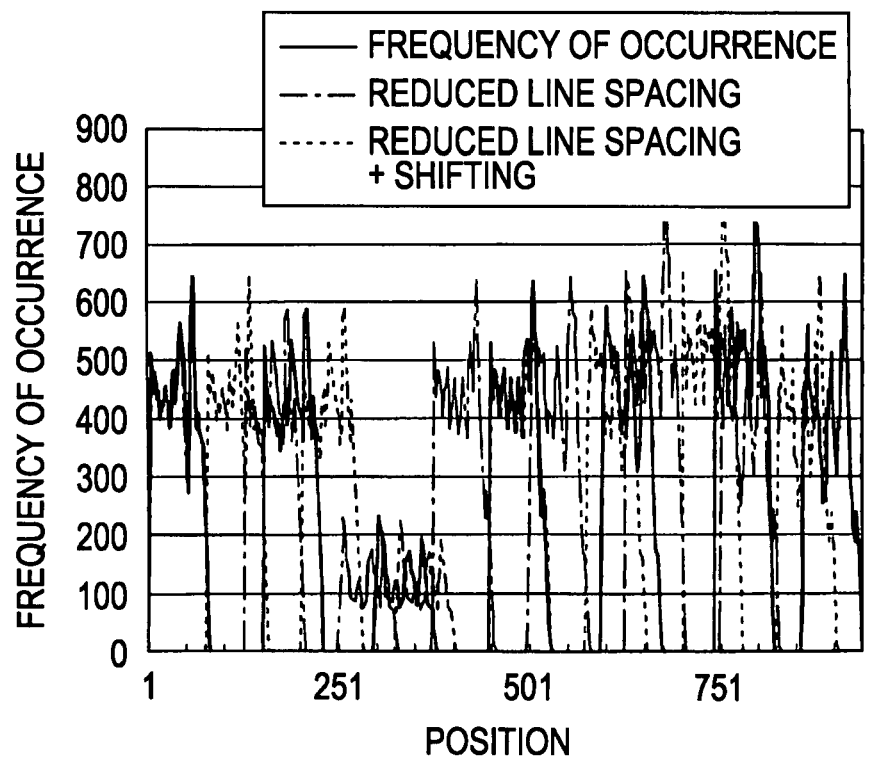
FIG. 31B is a view that shows the result of total of the projection information shown in FIG. 31A and the projection information shown in FIG. 30B in each nozzle.

FIG. 28A is a view that shows the relationship between the printed result of an image, before the print position information is modified, and the print head 200. FIG. 28B is a view that shows the printed result after modification of the print position information is executed to reduce line spacing on the character images shown in FIG. 28A. FIG. 29 is a view that shows projection information with respect to the printed result shown in FIG. 28A. FIG. 30A is a view that shows projection information with respect to the printed result shown in FIG. 28B. FIG. 30B is a view that shows the result of total of the projection information shown in FIG. 30A and the projection information shown in FIG. 29 in each nozzle. FIG. 31A is a view that shows projection information when the entire image is shifted in a nozzle array direction (downward or upward) after line spacing is reduced. FIG. 31B is a view that shows the result of total of the projection information shown in FIG. 31A and the projection information shown in FIG. 30B in each nozzle.

Here, the print position information modification process is executed on the document image shown in FIG. 28 A to reduce line spacing (reduced line spacing), and, as shown in FIG. 28B, line spacing is reduced by approximately one line in the entire document image. In the example shown in FIG. 28B, because the number of lines is small, it seems that the line spacing is extremely changed. However, when the number of lines is increased, for example, 30 lines, 40 lines, or the like, the change is hardly recognized from the appearance. In addition, because only line spacing is changed, it is possible to easily generate the projection information after the line spacing has been changed.

FIG. 29 shows the projection information, in the line direction, of the original printing image data before line spacing is reduced; however, the document image shown in FIG. 28A has a relatively wide line spacing, so that the number of unused nozzles is increased by that much. For example, when the line spacing is reduced by one line as a whole as shown in FIG. 28B, the projection information in the line direction is shown in FIG. 30A. When the projection information shown in FIG. 30A is compared with the projection information shown in FIG. 29, the projection information shown in FIG. 30A is obtained by shifting the projection information, shown in FIG. 29, in the direction in which the line spacing is reduced.

By continuously printing the image shown in FIG. 28A and the image shown in FIG. 28B, it is possible to perform printing so as to be able to obtain the projection information shown in FIG. 30B. However, as shown in FIG. 30B, when the image shown in FIG. 28A and the image shown in FIG. 28B are continuously printed only, some of the nozzles still remain unused. Therefore, the print position information modification is further executed to shift the entire image of which line spacing has been reduced in the nozzle array direction (downward). The projection information for the printed result after this shifting is shown in FIG. 31A. Then, the projection information for the printed results of these three images, that is, the image shown in FIG. 28A, the image shown in FIG. 28B, and the image after shifting the entire image in the nozzle array direction, is shown in FIG. 31B.

Thus, by continuously printing the above three images, as shown in FIG. 31B, it is possible to perform printing using all the nozzles. That is, when these three images are being repeatedly printed, it is possible to prevent the nozzles from being clogged with ink. Note that this method is effective, for example, when the image data has a width equivalent to the print area of the print head 200, and shifting of the entire image cannot be performed. In addition, in regard to reduced line spacing, because the line spacing is just slightly changed, it hardly influences the appearance of document as a whole.

In addition, even without using the image for which line spacing is not reduced, the print position information modification may be executed so as to use all the nozzles by printing only two images, that is, the image, for which line spacing is reduced, shown in FIG. 28B and the image that is shifted in the nozzle array direction from the image with reduced line spacing. Furthermore, not only the modification of line spacing but also the modification of character size may be used in combination. Actually, even when the character size is increased only, line spacing is reduced, so that unused nozzles tend to be reduced.

Figure 32A:
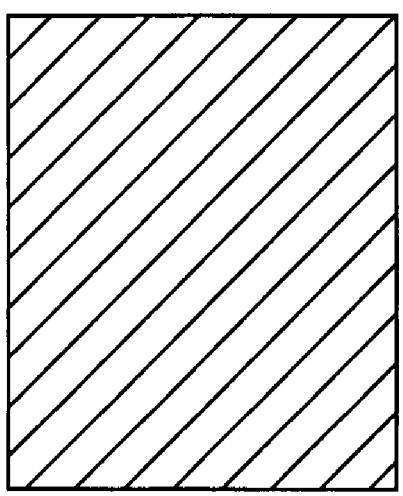
FIG. 32A and FIG. 32B are views that illustrate a print position modification method executed on image data on which N-level process has been executed.
Figure 32B:
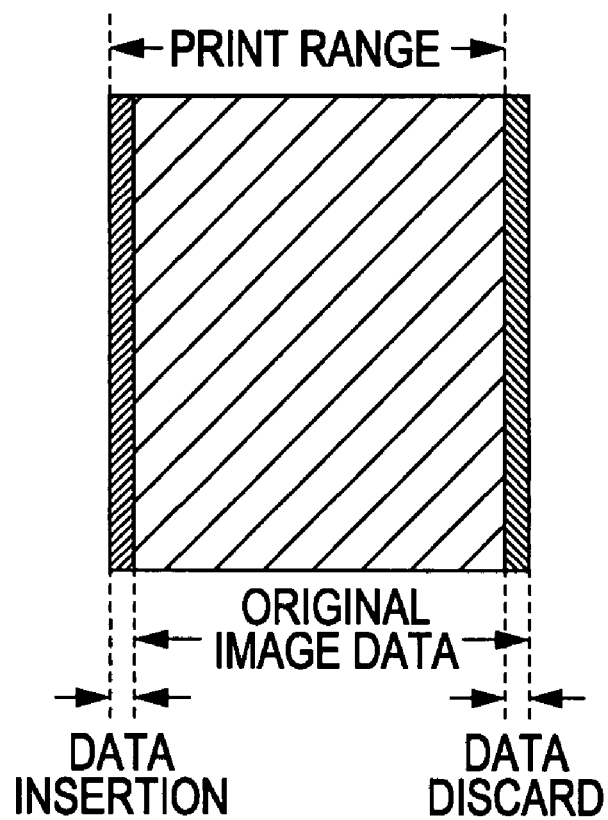

Further, the print position information modification method executed when the image information included in the printing image data is not document image data ("No" in step S204) but image data on which the N-level process has been executed (halftone process has been executed) will be described with reference to FIG. 32A and FIG. 32B. FIG. 32A and FIG. 32B are views that illustrate the print position modification method executed on image data on which the N-level process has been executed. In this case, shifting of print position is achieved by shifting the entire image. That is, a required shifting direction and amount of shift are estimated on the basis of the projection information and the frequency of nozzle usage, and then the coordinate information of the entire image is shifted in the required direction by the required amount of shift.

As shown in FIG. 32A, the original image, on which the N-level process has been executed, has printing positions (positions at which dots are formed) and positions of image data (coordinate positions of pixels), which are completely accordant with each other. For example, as shown in FIG. 32B, the image shown in FIG. 32A is shifted for the print area entirely in the right-hand direction by the amount to be shifted. In this case, right side data that run out of the print area due to the shifting will be discarded, and blank data are inserted into the left end portion that will be a blank space due to the shifting. In addition, because the entire image data are shifted, it is assumed that left and right sides both include blank data. However, when the image data are constituted of only an area in which document image data are present, it is only necessary to simply shift the entire document image data by the amount of shift within the print area.

Note that the examples in which the frequency of nozzle usage satisfies the prescribed condition by modifying the print position information so as to use all the nozzles so far; however, for example, when all the nozzles cannot be used even when the first to fourth print position information modification processes are executed to the limit on document data that include only a document image, it is determined that the condition is satisfied at that moment, and then printing is performed using the printing image data that have the print position at which most number of nozzles are used. Therefore, in the present embodiment, the printing image data that use the most number of nozzles are saved until the process ends.

Figure 33A:
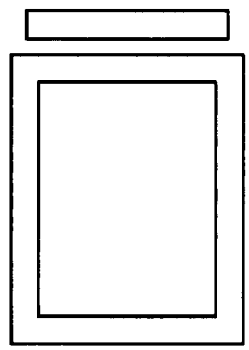
FIG. 33A to FIG. 33C are views that show a processing example when the printing width and the print area width are the same width.

The operation performed when the print area width of an image is equal to or greater than the printing width of the print head 200 will now be described with reference to FIG. 33A to FIG. 34. Here, FIG. 33A to FIG. 33C are views that show a processing example when the printing width and the print area width are the same width. FIG. 34 is a view that illustrates a reduction process of an image when BiCubic method is used. For example, as shown in FIG. 33A, the print area width of the image is equal to the printing width of the print head 200, it is not allowed to change the print position of the image. The printer 100 according to the present embodiment is able to make the print area width of the image be smaller than the printing width of the print head 200 by reducing the size of the original image.

The printer 100 according to the present embodiment is able to reduce the print area width of the image by using one of the following two methods. As a first reduction method, the size of the image may be reduced by simply thinning the image in units of line. For example, when the image is reduced in the width direction (nozzle array direction) by one character, for a 12 point character, it is only necessary to reduce 120 [dot] when it is printed with a resolution of 720 [dpi]. For example, when the print area is formed by a sentence having a width of 17.5 [cm] with horizontal 5000 [dot], the process is executed to thin the dots to "5000−120=4880 [dot]".

Here, when the thinning process is executed at equal intervals or at substantially equal intervals, in this example, the process is executed to omit one line per 41.7 lines. That is, in 5000 lines, thinning interval is one line per 41.7 lines, so that the process is executed to thin the data of one line from every 41 line or every 42 line. In this method, because the data are deleted in units of line, character data may be partly discarded. However, the data are not so deleted that characters are largely deformed, so that it is possible to realize reduction to a degree with no substantial problem for the entire document.

The second reduction method is able to reduce the size of an image using a known BiCubic method. In the BiCubic method, the process is executed by not deleting a portion of lines but reducing the entire image, so that the process becomes complex in comparison with the above described simple thinning process. However, more natural compressed image is obtained. Even when the BiCubic method is used as well, position variation does not occur in the same line, it is possible to execute the process by only referring to the data of one line.

FIG. 34A to FIG. 34C show a change in column width of the image columns when the reduction process using the BiCubic method is applied to one line that has an image. Note that "O" in FIG. 34A to FIG. 34C represents a pixel. For example, when the compression of one pixel is performed, the pixel columns shown in FIG. 34A are compressed by one pixel to be a state shown in FIG. 34C. Here, the data of the pixel columns shown in FIG. 34C are generated from the data of the pixel columns shown in FIG. 34B in which the pixel columns shown in FIG. 34A are compressed to have the same width as the width of the pixel columns shown in FIG. 34C. For example, taking the pixel array shown in FIG. 34B into consideration, the value of the pixel S shown in FIG. 34C is calculated from the peripheral four pixels A, B, C, D of the pixel S on the basis of the distance relationship between the pixel S and the pixels A, B, C, D using the BiCubic method.

Figure 33B:
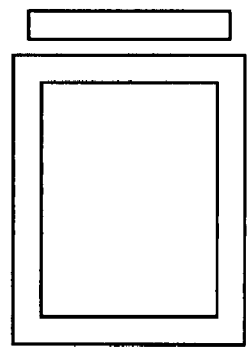
Figure 33C:
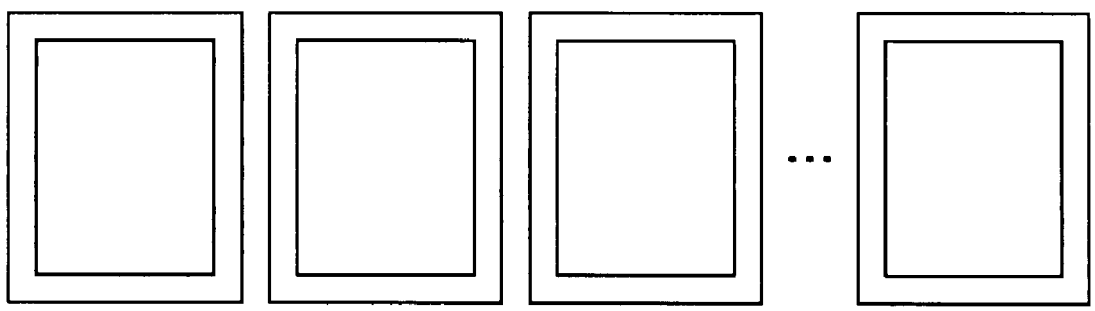

When the print area width of the image is equal to the printing width of the print head 200, as shown in FIG. 33B, by reducing the width of the image using one of two reduction methods described above, the width of the image is reduced. Thus, it is possible to change the print position of the image as shown in FIG. 33C. As described above, according to the printer 100 of the present embodiment, when multiple sheets of paper are continuously printed, by modifying the print position information of the image in the printing image data on the basis of the projection information, printing can be performed using all the nozzles in a prescribed period of time (number of copies printed).

In this manner, while printing is continuously being performed, it is possible to prevent the nozzles from being clogged with ink. In addition, because the print position information may be modified on the basis of the projection information, it is possible to generate the printing image data that make printing use all the nozzles with accuracy and minimum modification. Moreover, the change in print position may be performed over multiple pages little by little, so that the change in preceding and following pages may be made minute. Thus, it is possible to reduce deterioration in appearance of the printed result.

In the above described embodiment, the printing image data acquisition unit 10 may be regarded as the printing image data acquisition device according to the first aspect or thirty-fifth aspect, the N-level processing unit 14 may be regarded as the N-level device according to the first aspect or thirty-fifth aspect, the projection information generating unit 16 may be regarded as the dot forming information generating device according to any one of the first, third, fifth, thirty-fifth, thirty-seventh and thirty-ninth aspects, the projection information and the frequency of nozzle usage may be regarded as the dot forming information according to any one of the first, third, fifth, twelfth, fourteenth, sixteenth, twenty-fourth, twenty-sixth, twenty-eighth, thirty-fifth, thirty-seventh, thirty-ninth, forty-sixth, forty-eighth, fiftieth, fifty-eighth, sixtieth and sixty-second aspects, the print position information modification unit 18 may be regarded as the print position information modification device according to any one of the first, fourth, fifth, sixth, seventh, eighth, ninth, tenth, eleventh, thirty-fifth, thirty-eighth, thirty-ninth, fortieth, forty-first, forty-second, forty-third, forty-fourth and forty-fifth aspects, and the printing unit 20 may be regarded as the printing device according to the first aspect.

Furthermore, in the above described embodiment, the steps S100 to S104 may be regarded as acquiring printing image data according to any one of the twelfth, twenty-fourth, forty-sixth and fifty-eighth aspects, the step S110 may be regarded as executing N-level processing according to any one of the twelfth, twenty-fourth, forty-sixth and fifty-eighth aspects, the step S118 may be regarded as modifying print position information according to any one of the twelfth, fifteenth to twenty-second, twenty-fourth, twenty-seventh to thirty-fourth, forty-sixth, forty-ninth to fifty-sixth, fifty-eighth, and sixty-first to sixty-eighth, and the step S116 may be regarded as performing printing according to the twelfth and twenty-fourth aspects.

Note that the printer 100 in the above described embodiment has such a feature that, by modifying the print position information in the printing image data with almost no change being made to the existing printer, all or substantially all the nozzles are used. Thus, it is not necessary to prepare an exclusive unit as the printing unit 20, and it is possible to use the existing ink jet printer as it is. Moreover, when the N-level processing unit 14 and the printing unit 20 are separated from the printer 100 of the above described embodiment, those functions may be implemented by a general purpose printing instruction terminal, such as a personal computer, a printer server (these may be regarded as the image processing device), or the like.

Furthermore, in the above described embodiment, the character images or the graphic image is modified by minimum unit up to the maximum amount of modification, and it is determined each time whether the frequency of nozzle usage satisfies the condition. However, it is not limited to the above configuration. It is also applicable that the amount of shift, with which all the nozzles can be used, is predicted on the basis of the projection information or the frequency of nozzle usage, and the modification of print position information by the amount of shift predicted is executed all at once.

What is claimed is:

1. A printer including a print head having nozzles that are arranged in a plurality of lines and that form dots by discharging ink onto a medium used for printing, wherein the printer prints out an image on the medium by one scanning operation using the print head, the printer comprising:
a printing image data acquisition device that acquires printing image data that include image information of the image and information regarding a print position of the image;
an N-level processing device that converts the printing image data that include image information having the number of addressable luminance levels M (M is natural number and M≧2) into printing image data that include image information having the number of addressable luminance levels N (N is natural number, and M≧N≧2);
a dot forming information generating device that generates, on the basis of the printing image data, dot forming information that is information indicating a state of dots, formed by nozzles that constitute the print head, with respect to the printing image data;
a print position information modification device that modifies, on the basis of the dot forming information, print position information that is information regarding the print position in the printing image data so that all or substantially all the nozzles that constitute the print head form a predetermined number of dots or more at every predetermined print timing during a period when printing is continuously performed; and
a printing device that prints out an image on the medium using the print head on the basis of the printing image data having the number of addressable luminance levels N.

2. The printer according to claim 1, wherein the predetermined print timing is timing at which nozzles that constitute the print head do not produce clogging of ink.

3. The printer according to claim 1, wherein the dot forming information generating device calculates the number of dots formed by the nozzles that constitute the print head on the basis of the printing image data on which rendering has been executed, and generates the dot forming information on the basis of the calculated result.

4. The printer according to claim 1, wherein, when the printing image data have image information having the number of addressable luminance levels N, the print position information modification device modifies coordinate position information of the dots, as the print position information, in the image information having the number of addressable luminance levels N.

5. The printer according to claim 1, wherein, when the printing image data include information of a document image, the dot forming information generation device generates dot forming information of nozzles that print out character images of character string among the nozzles used for printing for each character string that constitutes the document image, and the print position information modification device modifies the print position information for each character string on the basis of the dot forming information of each character string.

6. The printer according to claim 1, wherein, when the printing image data include information of a document image, the print position information modification device modifies at least one of coordinate position information, size information and character spacing information, as the print position information, of character images that constitute the document image.

7. The printer according to claim 1, wherein the print position information modification device modifies the print position information so that the print position of the image is changed in the nozzle array direction of the print head.

8. The printer according to claim 1, wherein, when the printing image data include a document image and image information other than the document image, the print position information modification device modifies print position information of the image information other than the document image, prior to the document image.

9. The printer according to claim 1, wherein, when the image is continuously printed on the multiple media, the print position information modification device modifies the print position information in the printing image data in units of printing operation, that is, in units of printing operation on the single medium or in units of printing operation on the multiple media.

10. The printer according to claim 1, wherein, when the image is continuously printed on the multiple media, the print position information modification device modifies the print position information in the printing image data corresponding to the multiple media so that modification of the multiple media is performed over the multiple media by the amount of modification required for all or substantially all the nozzles that constitute the print head to form a predetermined number of dots at every predetermined print timing during a period when printing is continuously printed.

11. The printer according to claim 1, wherein, the print position information modification device modifies image size of the printing image data on the basis of the printing width of the print head and the print area width on the medium, and modifies the print position information in the modified printing image data.

12. An image processing device that executes image processing on printing image data used in a printer including a print head having nozzles that are arranged in a plurality of lines and that form dots by discharging ink onto a medium used for printing, wherein the printer prints out an image on the medium using the print head, the image processing device comprising:

a printing image data acquisition device that acquires printing image data that include image information of the image and information regarding a print position of the image;

an N-level processing device that converts the printing image data that include image information having the number of addressable luminance levels M (M is natural number and M≧2) into printing image data that include image information having the number of addressable luminance levels N (N is natural number, and M≧N≧2);

a dot forming information generating device that generates, on the basis of the printing image data, dot forming information that is information indicating a state of dots, formed by nozzles that constitute the print head, with respect to the printing image data; and a print position information modification device that modifies, on the basis of the dot forming information, print position information that is information regarding the print position in the printing image data so that all or substantially all the nozzles that constitute the print head form a predetermined number of dots or more at every predetermined print timing during a period when printing is continuously performed.

13. An image processing method that executes image processing on printing image data used in a printer including a print head having nozzles that are arranged in a plurality of lines and that form dots by discharging ink onto a medium used for printing, wherein the printer prints out an image on the medium using the print head, the image processing method comprising:

acquiring printing image data include image information of the image and information regarding a print position of the image;

executing N-level process to convert the printing image data that include image information having the number of addressable luminance levels M (M is natural number and M≧2) into printing image data that include image information having the number of addressable luminance levels N (N is natural number, and M≧N≧2);

generating dot forming information, on the basis of the printing image data, that is information indicating a state of dots, formed by nozzles that constitute the print head, with respect to the printing image data; and modifying print position information, on the basis of the dot forming information, that is information regarding the print position in the printing image data so that all or substantially all the nozzles that constitute the print head form a predetermined number of dots or more at every predetermined print timing during a period when printing is continuously performed.

* * * * *